US012608720B2

(12) United States Patent
Papakostas et al.

(10) Patent No.: US 12,608,720 B2
(45) Date of Patent: *Apr. 21, 2026

(54) METHODS AND APPARATUS TO CREDIT MEDIA PRESENTATIONS FOR ONLINE MEDIA DISTRIBUTIONS

(71) Applicant: The Nielsen Company (US), LLC, New York, NY (US)

(72) Inventors: Achilleas Papakostas, Dallas, TX (US); Susan Cimino, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,087

(22) Filed: Aug. 22, 2022

(65) Prior Publication Data

US 2023/0127341 A1    Apr. 27, 2023

Related U.S. Application Data

(63) Continuation of application No. 14/928,741, filed on Oct. 30, 2015, now Pat. No. 11,423,420.

(Continued)

(51) Int. Cl.
*G06Q 30/0201* (2023.01)
*G06F 16/28* (2019.01)
(Continued)

(52) U.S. Cl.
CPC ....... *G06Q 30/0201* (2013.01); *G06F 16/285* (2019.01); *G06F 16/48* (2019.01);
(Continued)

(58) Field of Classification Search
CPC ............ G06Q 30/0201; G06Q 30/0246; G06F 16/285; G06F 16/48; G06F 16/9566;
(Continued)

(56) References Cited

U.S. PATENT DOCUMENTS

| | | | |
|---|---|---|---|
| 4,355,372 A | 10/1982 | Johnson et al. | |
| RE31,951 E | 7/1985 | Johnson et al. | |

(Continued)

FOREIGN PATENT DOCUMENTS

| | | |
|---|---|---|
| AU | 2011211443 | 3/2012 |
| AU | 2011211444 | 3/2012 |

(Continued)

OTHER PUBLICATIONS

United States Patent and Trademark Office, "Corrected Notice of Allowability," issued in connection with U.S. Appl. No. 17/850,910 , dated Feb. 1, 2023, 2 pages.

(Continued)

*Primary Examiner* — Beth V Boswell

(57) ABSTRACT

Methods and apparatus to credit media presentations for online media distributions are disclosed. Example methods and apparatus determine a presenter of a media session based on a user agent identifier extracted from a proxy record associated with the media session, and in response to determining that the user agent identifier does not identify a publisher, identify a first domain referenced by a URL associated with the media session, and, in response to determining that the first domain matches a domain pattern associated with a publisher and does not match a domain in a list of hosting domains, classify the media of the media session as being published by the publisher associated with the matching domain pattern, the publisher being different from the presenter.

24 Claims, 21 Drawing Sheets

Related U.S. Application Data

(60) Provisional application No. 62/113,177, filed on Feb. 6, 2015.

(51) Int. Cl.

| | |
|---|---|
| *G06F 16/48* | (2019.01) |
| *G06F 16/955* | (2019.01) |
| *G06Q 30/0242* | (2023.01) |
| *H04L 67/02* | (2022.01) |

(52) U.S. Cl.
CPC ..... *G06F 16/9566* (2019.01); *G06Q 30/0246* (2013.01); *H04L 67/02* (2013.01)

(58) Field of Classification Search
CPC .............. H04L 67/02; H04N 21/44222; H04N 21/44224; H04N 21/44204
See application file for complete search history.

(56) References Cited

U.S. PATENT DOCUMENTS

| | | | |
|---|---|---|---|
| 4,603,232 A | 7/1986 | Kurland et al. |
| 4,954,699 A | 9/1990 | Coffey et al. |
| 4,958,284 A | 9/1990 | Bishop et al. |
| 5,023,929 A | 6/1991 | Call |
| 5,060,140 A | 10/1991 | Brown et al. |
| 5,481,294 A | 1/1996 | Thomas et al. |
| 5,488,408 A | 1/1996 | Maduzia et al. |
| 5,497,185 A | 3/1996 | Dufresne et al. |
| 5,526,427 A | 6/1996 | Thomas et al. |
| 5,550,928 A | 8/1996 | Lu et al. |
| 5,557,686 A | 9/1996 | Brown et al. |
| 5,584,050 A | 12/1996 | Lyons |
| 5,594,934 A | 1/1997 | Lu et al. |
| 5,659,469 A | 8/1997 | Deaton et al. |
| 5,675,510 A | 10/1997 | Coffey et al. |
| 5,689,799 A | 11/1997 | Dougherty et al. |
| 5,710,887 A | 1/1998 | Chelliah et al. |
| 5,715,399 A | 2/1998 | Bezos |
| 5,732,218 A | 3/1998 | Bland et al. |
| 5,737,025 A | 4/1998 | Dougherty et al. |
| 5,737,026 A | 4/1998 | Lu et al. |
| 5,751,450 A | 5/1998 | Robinson |
| 5,771,307 A | 6/1998 | Lu et al. |
| 5,781,913 A | 7/1998 | Felsenstein et al. |
| 5,790,875 A | 8/1998 | Andersin et al. |
| 5,848,396 A | 12/1998 | Gerace |
| 5,850,249 A | 12/1998 | Massetti et al. |
| 5,862,325 A | 1/1999 | Reed et al. |
| 5,872,850 A | 2/1999 | Klein et al. |
| 5,887,140 A | 3/1999 | Itsumi et al. |
| 5,889,548 A | 3/1999 | Chan |
| 5,961,593 A | 10/1999 | Gabber et al. |
| 5,970,469 A | 10/1999 | Scroggie et al. |
| 5,991,735 A | 11/1999 | Gerace |
| 6,006,260 A | 12/1999 | Barrick, Jr. et al. |
| 6,026,367 A | 2/2000 | Hjelmvik |
| 6,026,368 A | 2/2000 | Brown et al. |
| 6,052,730 A | 4/2000 | Felciano et al. |
| 6,055,573 A | 4/2000 | Gardenswartz et al. |
| 6,058,381 A | 5/2000 | Nelson |
| 6,070,145 A | 5/2000 | Pinsley et al. |
| 6,070,148 A | 5/2000 | Mori et al. |
| 6,081,900 A | 6/2000 | Subramaniam et al. |
| 6,115,680 A | 9/2000 | Coffee et al. |
| 6,128,624 A | 10/2000 | Papierniak et al. |
| 6,138,162 A | 10/2000 | Pistriotto et al. |
| 6,138,165 A | 10/2000 | Nakatsugawa |
| 6,141,686 A | 10/2000 | Jackowski et al. |
| 6,151,593 A | 11/2000 | Cho et al. |
| 6,286,043 B1 | 9/2001 | Cuomo et al. |
| 6,286,046 B1 | 9/2001 | Bryant |
| 6,321,336 B1 | 11/2001 | Applegate et al. |
| 6,351,467 B1 | 2/2002 | Dillon |
| 6,381,632 B1 | 4/2002 | Lowell |
| 6,421,733 B1 | 7/2002 | Tso et al. |
| 6,449,251 B1 | 9/2002 | Awadallah et al. |
| 6,487,538 B1 | 11/2002 | Gupta et al. |
| 6,507,589 B1 | 1/2003 | Ramasubramani et al. |
| 6,567,857 B1 | 5/2003 | Gupta et al. |
| 6,606,581 B1 | 8/2003 | Nickerson et al. |
| 6,658,414 B2 | 12/2003 | Bryan et al. |
| 6,704,787 B1 | 3/2004 | Umbreit |
| 6,822,955 B1 | 11/2004 | Brothers et al. |
| 6,839,680 B1 | 1/2005 | Liu et al. |
| 6,856,963 B1 | 2/2005 | Hurwitz |
| 6,865,613 B1 | 3/2005 | Miller et al. |
| 6,993,590 B1 | 1/2006 | Gauthier et al. |
| 7,003,555 B1 | 2/2006 | Jungck |
| 7,039,599 B2 | 5/2006 | Merriman et al. |
| 7,065,505 B2 | 6/2006 | Stefik et al. |
| 7,080,077 B2 | 7/2006 | Ramamurthy et al. |
| 7,092,926 B2 | 8/2006 | Cerrato |
| 7,092,942 B2 | 8/2006 | Frieden et al. |
| 7,159,023 B2 | 1/2007 | Tufts |
| 7,181,412 B1 | 2/2007 | Fulgoni et al. |
| 7,200,632 B1 | 4/2007 | Greschler et al. |
| 7,216,149 B1 | 5/2007 | Briscoe et al. |
| 7,260,837 B2 | 8/2007 | Abraham et al. |
| 7,277,915 B2 | 10/2007 | De Boor et al. |
| 7,366,724 B2 | 4/2008 | Frieden et al. |
| 7,375,641 B2 | 5/2008 | Kiel et al. |
| 7,376,722 B1 | 5/2008 | Sim et al. |
| 7,526,538 B2 | 4/2009 | Wilson |
| 7,584,423 B2 | 9/2009 | Rohrabaugh et al. |
| 7,606,897 B2 | 10/2009 | Izrailevsky et al. |
| 7,609,711 B2 | 10/2009 | Kyung et al. |
| 7,613,809 B2 | 11/2009 | Jackson et al. |
| 7,688,813 B2 | 3/2010 | Shin et al. |
| 7,695,879 B2 | 4/2010 | Vanbesien et al. |
| 7,814,483 B2 | 10/2010 | Li et al. |
| 7,849,502 B1 | 12/2010 | Bloch |
| 7,925,515 B2 | 4/2011 | Xu et al. |
| 8,018,666 B2 | 9/2011 | Kakuta |
| 8,086,219 B2 | 12/2011 | O'Neil et al. |
| 8,285,218 B2 | 10/2012 | Papakostas et al. |
| 8,307,006 B2 | 11/2012 | Hannan et al. |
| 8,340,711 B1 | 12/2012 | Glass et al. |
| 8,483,765 B2 | 7/2013 | Cho |
| 8,594,617 B2 | 11/2013 | Papakostas et al. |
| 8,635,129 B2 | 1/2014 | Story et al. |
| 8,649,292 B2 | 2/2014 | Zheng |
| 8,755,511 B2 | 6/2014 | Duva et al. |
| 8,774,214 B1 | 7/2014 | Madhavarapu et al. |
| 8,775,571 B2 | 7/2014 | Srinivasan et al. |
| 8,886,773 B2 | 11/2014 | Papakostas et al. |
| 8,910,259 B2 | 12/2014 | Papakostas et al. |
| 9,112,919 B1 | 8/2015 | Vinapamula Venkata et al. |
| 9,301,173 B2 | 3/2016 | Papakostas |
| 9,307,418 B2 | 4/2016 | Papakostas |
| 9,736,136 B2 | 8/2017 | Papakostas et al. |
| 9,762,688 B2 | 9/2017 | Papakostas et al. |
| 10,257,297 B2 | 4/2019 | Papakostas et al. |
| 10,320,925 B2 | 6/2019 | Papakostas et al. |
| 10,356,579 B2 | 7/2019 | Papakostas et al. |
| 10,798,192 B2 | 10/2020 | Papakostas et al. |
| 10,965,765 B2 | 3/2021 | Papakostas et al. |
| 11,418,610 B2 | 8/2022 | Papakostas et al. |
| 11,423,420 B2 | 8/2022 | Papakostas et al. |
| 11,438,429 B2 | 9/2022 | Papakostas et al. |
| 11,510,037 B2 | 11/2022 | Papakostas et al. |
| 2001/0014915 A1 | 8/2001 | Blumenau |
| 2001/0020242 A1 | 9/2001 | Gupta et al. |
| 2002/0069368 A1 | 6/2002 | Hines |
| 2002/0077903 A1 | 6/2002 | Feldman et al. |
| 2002/0116523 A1 | 8/2002 | Warrier et al. |
| 2002/0128803 A1 | 9/2002 | Skinner et al. |
| 2002/0144156 A1 | 10/2002 | Copeland, III |
| 2002/0165928 A1 | 11/2002 | Landfeldt et al. |
| 2002/0169830 A1 | 11/2002 | Mild et al. |
| 2002/0178257 A1 | 11/2002 | Cerrato |
| 2003/0009762 A1 | 1/2003 | Hooper et al. |
| 2003/0018778 A1 | 1/2003 | Martin et al. |
| 2003/0033432 A1 | 2/2003 | Simpson et al. |

(56)　　　　　References Cited

U.S. PATENT DOCUMENTS

| | | |
|---|---|---|
| 2003/0035409 A1 | 2/2003 | Wang et al. |
| 2003/0051052 A1 | 3/2003 | Shteyn et al. |
| 2003/0065595 A1 | 4/2003 | Anglum |
| 2003/0076305 A1 | 4/2003 | Allen |
| 2003/0091025 A1 | 5/2003 | Celi, Jr. et al. |
| 2003/0154306 A1 | 8/2003 | Perry |
| 2003/0195884 A1 | 10/2003 | Boyd et al. |
| 2004/0133687 A1 | 7/2004 | Yamaguchi et al. |
| 2004/0205159 A1 | 10/2004 | Johnson et al. |
| 2005/0021603 A1 | 1/2005 | Yokomitsu et al. |
| 2005/0108539 A1 | 5/2005 | Skog et al. |
| 2005/0138192 A1 | 6/2005 | Encarnacion et al. |
| 2005/0198261 A1 | 9/2005 | Durvasula et al. |
| 2005/0201357 A1 | 9/2005 | Poyhonen |
| 2006/0133332 A1 | 6/2006 | Achanta |
| 2006/0258341 A1 | 11/2006 | Miller et al. |
| 2006/0264202 A1 | 11/2006 | Hagmeier et al. |
| 2006/0274774 A1 | 12/2006 | Srinivasan |
| 2006/0274775 A1 | 12/2006 | Kyung et al. |
| 2007/0073625 A1 | 3/2007 | Shelton |
| 2007/0089110 A1 | 4/2007 | Li |
| 2007/0123760 A1 | 5/2007 | Scholler et al. |
| 2007/0186228 A1* | 8/2007 | Ramaswamy ... H04N 21/25891 |
| | | 725/135 |
| 2007/0214501 A1 | 9/2007 | Muramoto et al. |
| 2007/0222598 A1 | 9/2007 | Kiel et al. |
| 2007/0274211 A1 | 11/2007 | Tsubota |
| 2008/0005736 A1 | 1/2008 | Apacible et al. |
| 2008/0056261 A1 | 3/2008 | Osborn et al. |
| 2008/0126420 A1* | 5/2008 | Wright ............ H04N 21/42684 |
| | | 348/E7.071 |
| 2008/0209050 A1 | 8/2008 | Li |
| 2008/0289010 A1 | 11/2008 | Frieden et al. |
| 2009/0034536 A1 | 2/2009 | Morand |
| 2009/0036108 A1 | 2/2009 | Cho |
| 2009/0089356 A1 | 4/2009 | Murray et al. |
| 2009/0106035 A1 | 4/2009 | Xu et al. |
| 2009/0233633 A1 | 9/2009 | Morrison |
| 2009/0282471 A1 | 11/2009 | Green et al. |
| 2009/0285118 A1 | 11/2009 | Yoshikawa et al. |
| 2009/0290852 A1* | 11/2009 | Wright ................... H04H 60/31 |
| | | 386/241 |
| 2009/0296917 A1 | 12/2009 | Nogawa |
| 2009/0320123 A1 | 12/2009 | Yu et al. |
| 2010/0036969 A1 | 2/2010 | Perry et al. |
| 2010/0095215 A1 | 4/2010 | Elven |
| 2010/0191947 A1 | 7/2010 | Shin |
| 2010/0205029 A1 | 8/2010 | Asherman et al. |
| 2010/0205617 A1 | 8/2010 | Hogan et al. |
| 2010/0216434 A1 | 8/2010 | Marcellino |
| 2010/0238837 A1 | 9/2010 | Zheng |
| 2010/0293610 A1 | 11/2010 | Beachem et al. |
| 2011/0029988 A1 | 2/2011 | Mittal et al. |
| 2011/0047254 A1 | 2/2011 | Vainionpää et al. |
| 2011/0252430 A1 | 10/2011 | Chapman et al. |
| 2011/0296416 A1 | 12/2011 | Kim et al. |
| 2012/0007932 A1 | 1/2012 | Yokoyama et al. |
| 2012/0042005 A1 | 2/2012 | Papakostas et al. |
| 2012/0042367 A1 | 2/2012 | Papakostas et al. |
| 2012/0158908 A1 | 6/2012 | Luna et al. |
| 2012/0210321 A1 | 8/2012 | Silva et al. |
| 2012/0215903 A1* | 8/2012 | Fleischman ............ G06Q 50/01 |
| | | 709/224 |
| 2012/0216063 A1 | 8/2012 | Ogata |
| 2012/0235930 A1 | 9/2012 | Lazaridis et al. |
| 2012/0271719 A1 | 10/2012 | Straley et al. |
| 2012/0295581 A1 | 11/2012 | Agarwal |
| 2012/0324060 A1 | 12/2012 | Afergan et al. |
| 2013/0005296 A1 | 1/2013 | Papakostas et al. |
| 2013/0006708 A1 | 1/2013 | Lee |
| 2013/0031599 A1 | 1/2013 | Luna et al. |
| 2013/0035059 A1 | 2/2013 | Liu et al. |
| 2013/0054402 A1 | 2/2013 | Asherman et al. |
| 2013/0064109 A1 | 3/2013 | Combet et al. |
| 2013/0066875 A1 | 3/2013 | Combet et al. |
| 2013/0183926 A1 | 7/2013 | Lindberg et al. |
| 2013/0276129 A1 | 10/2013 | Nelson et al. |
| 2013/0281050 A1 | 10/2013 | Agarwal et al. |
| 2013/0291001 A1* | 10/2013 | Besehanic ........ H04N 21/25891 |
| | | 725/20 |
| 2013/0314491 A1 | 11/2013 | Vivekanandan et al. |
| 2014/0036687 A1 | 2/2014 | Papakostas et al. |
| 2014/0204816 A1 | 7/2014 | Ismail et al. |
| 2014/0229970 A1* | 8/2014 | Besehanic .......... H04N 21/6175 |
| | | 725/20 |
| 2014/0273923 A1 | 9/2014 | Papakostas |
| 2014/0280896 A1 | 9/2014 | Papakostas et al. |
| 2014/0297719 A1 | 10/2014 | Laasik et al. |
| 2014/0324545 A1* | 10/2014 | Splaine .............. G06Q 30/0204 |
| | | 705/7.33 |
| 2015/0007256 A1* | 1/2015 | Kirkeby .................. G06F 21/10 |
| | | 726/1 |
| 2015/0058958 A1 | 2/2015 | Papakostas et al. |
| 2015/0067162 A1 | 3/2015 | Papakostas et al. |
| 2015/0088890 A1* | 3/2015 | Hoffert ............... G06F 16/1744 |
| | | 707/737 |
| 2016/0127488 A1 | 5/2016 | Papakostas et al. |
| 2016/0232538 A1 | 8/2016 | Papakostas et al. |
| 2016/0285976 A1 | 9/2016 | Chan et al. |
| 2017/0374169 A1 | 12/2017 | Papakostas et al. |
| 2021/0021683 A1 | 1/2021 | Papakostas et al. |
| 2021/0218820 A1 | 7/2021 | Papakostas et al. |
| 2022/0329667 A1 | 10/2022 | Papakostas et al. |
| 2023/0097078 A1 | 3/2023 | Papakostas et al. |

FOREIGN PATENT DOCUMENTS

| | | | | |
|---|---|---|---|---|
| AU | 2012203829 | 1/2013 | | |
| AU | 2014210640 | 8/2014 | | |
| CA | 2748997 | 2/2012 | | |
| CA | 2749013 | 2/2012 | | |
| CA | 2781018 | 12/2012 | | |
| CN | 1909739 | 2/2007 | | |
| CN | 101594443 | 12/2009 | | |
| CN | 101605030 | 12/2009 | | |
| CN | 102377616 | 3/2012 | | |
| CN | 102377617 | 3/2012 | | |
| CN | 102917003 | 2/2013 | | |
| CN | 104219108 | 12/2014 | | |
| CN | 105025081 | 11/2015 | | |
| EP | 1980950 | 10/2008 | | |
| EP | 2079256 | 7/2009 | | |
| EP | 2341437 | 7/2011 | | |
| EP | 2418820 | 2/2012 | | |
| EP | 2418826 | 2/2012 | | |
| EP | 2549713 | 1/2013 | | |
| EP | 3771183 | 1/2021 | | |
| FR | 2874779 | 3/2006 | | |
| GB | 2437842 | 11/2007 | | |
| HK | 1205386 | 1/2020 | | |
| JP | 2003219467 | 7/2003 | | |
| JP | 2004342080 | 12/2004 | | |
| JP | 2005115473 | 4/2005 | | |
| JP | 2007200209 | 8/2007 | | |
| JP | 2008511229 | 4/2008 | | |
| JP | 2009514050 | 4/2009 | | |
| JP | 2010079831 | 4/2010 | | |
| JP | 2012053870 | 3/2012 | | |
| JP | 2012053871 | 3/2012 | | |
| JP | 2013016169 | 1/2013 | | |
| JP | 5404714 | 11/2013 | | |
| KR | 102005008068 | 10/2005 | | |
| WO | 199641495 | 12/1996 | | |
| WO | 199831155 | 7/1998 | | |
| WO | 2000055783 | 9/2000 | | |
| WO | 200111506 | 2/2001 | | |
| WO | 200144975 | 6/2001 | | |
| WO | 2001052462 | 7/2001 | | |
| WO | 2002050694 | 6/2002 | | |
| WO | 2003067376 | 8/2003 | | |
| WO | 2005006703 | 1/2005 | | |
| WO | WO-2006007929 A1 * | 1/2006 | ............. | H04L 29/06 |
| WO | 2006044820 | 4/2006 | | |

(56)                  References Cited

FOREIGN PATENT DOCUMENTS

WO           2007123760         11/2007
WO     WO-2008072093 A2 *   6/2008    ...........   G06F 16/437
WO           2014143969         9/2014

OTHER PUBLICATIONS

United States Patent and Trademark Office, "Non-Final Office Action, " issued in connection with U.S. Appl. No. 17/850,910 , dated Oct. 13, 2022, 15 pages.
United States Patent and Trademark Office, "Non-Final Office Action," issued in connection with U.S. Appl. No. 17/902,640, dated Mar. 16, 2013, 13 pages.
United States Patent and Trademark Office, "Notice of Allowance and Fee(s) Due," issued in connection with U.S. Appl. No. 17/850,910 , dated Jan. 23, 2023, 7 pages.
"HTTP Proxy Authentication and iPhone Apps", XP55009373, https://discussions.apple.com/message/8018666#8018666, Jan. 15, 2009, (4 pages).
Australian Patent Office, "Examination Report", issued in connection with Australian Application No. 2012203829, dated May 21, 2013 (3 pages).
Australian Patent Office, "Notice of Grant", issued in connection with Australian Application No. 2012203829, dated Oct. 9, 2014 (2 pages).
Boyan, J. "The Anonymizer—Protecting User Privacy on the Web," Computer-Mediated Communication Magazine, Online 1997, XP002231197, http://www.december.com/cmc/mag/1997/sep/toc. html, retrieved on 1997.
Canadian Intellectual Property Office, "Notice of Allowance", issued in connection with Canadian Patent Application No. 2,748,997, Mar. 16, 2015, 1 page.
Canadian Intellectual Property Office, "Notice of Allowance", issued in connection with Canadian Patent Application No. 2,749,013, dated Nov. 4, 2014 (1 page).
Canadian Intellectual Property Office, "Notice of Allowance", issued in connection with Canadian Patent Application No. 2,781,018, Apr. 16, 2015, 1 page.
Canadian Intellectual Property Office, "Notice of Allowance," issued in connection with application No. 2,749,013, Sep. 9, 2020, (1 page).
Canadian Intellectual Property Office, "Office Action," issued in connection with application No. 2749013, on Jul. 24, 2017, 3 pages.
Canadian Intellectual Property Office, "Office Action," issued in connection with application No. 2,749,013, Aug. 1, 2016, 5 pages.
Canadian Intellectual Property Office, "Office Action," issued in connection with application No. 2,749,013, Jun. 17, 2019, 4 pages.
Canadian Patent Office, "Office Action" issued in connection with Canadian Patent Application No. 2,748,997, dated Nov. 21, 2013 (2 pages).
Canadian Patent Office, "Office Action" issued in connection with Canadian Patent Application No. 2,748,997, dated Nov. 24, 2015 (5 pages).
Canadian Patent Office, "Office Action" issued in connection with Canadian Patent Application No. 2,749,013, dated Oct. 6, 2015 (4 pages).
Canadian Patent Office, "Office Action" issued in connection with Canadian Patent Application No. 2,749,013, dated Sep. 10, 2013 (2 pages).
Canadian Patent Office, "Office Action" issued in connection with Canadian Patent Application No. 2,781,018, dated Apr. 7, 2014 (3 pages).
China National Intellectual Property Administration, "Notice of Allowance", issued in connection with Chinese Patent Application No. 2014103432742.1, dated Oct. 9, 2018, 5 pages.
Chinese Patent Office, "Notice of Allowance" in application No. 201110294045.0, dated Jul. 4, 2014 (5 pages, English translation included).

Chinese Patent Office, "Office Action" in application No. 201110294045. 0, dated Apr. 3, 2014 (5 pages, English translation included).
Chinese Patent Office, "Office Action" in application No. 201110294045. 0, dated Sep. 26, 2013 (26 pages, English translation included).
Chinese Patent Office, "Office Action" in application No. 201110305485. 1, dated Sep. 22, 2013 (22 pages, English translation included).
Choo, C.,et al. "A Behavioral Model of Information Seeking on the web—Preliminary Results of a Study of How Managers and IT Specialists Use the Web" Oct. 1998 ( 16 pages).
Diffie W. et al., "Privacy and Authentication: An introduction to Cryptography" Proceedings of the IEEE, IEEE. New York, US, vol. 67, No. 3, Mar. 1979 (Mar. 1979), pp. 397-426, SP000575227.
Dossick, S.E. et al., "WWW access to legacy clienUserver applications," Fifth International World Wide Web Conference, May 6-10, 1996, Paris, FR, http://iw3c2.cs.ust.hk/WWW5/www5conf. inria.fr/fich_html/papers/P4/Overview.html.
European Patent Office "Office Action," issued in connection with European Patent Application No. 11006705.5, Mar. 14, 2019 (4 pages).
European Patent Office, "Communication pursuant to Article 94(3)", issued in connection with European Patent Application No. 11006705. 5-1870, on Nov. 6, 2017, (4 pages).
European Patent Office, "Communication under Rule 71(3) EPC", issued in connection with European Patent Application No. 12004911. 9-2413, Feb. 2, 2016, (74 pages).
European Patent Office, Decision to Grant, issued in connection with European Patent Application No. 11006705.5-1218, Sep. 10, 2020, (2 pages).
European Patent Office, "Examination Report", issued in connection with European Patent Application No. 11006705.5, issued Mar. 21, 2016, (7 pages).
European Patent Office, "Examination Report," issued in connection with application No. 11006705.5, on Aug. 24, 2018, 5 pages.
European Patent Office, "Extended European Search Report and European Search Opinion", issued in connection with European Patent Application No. 11006705.5-2413, Oct. 14, 2011, (7 pages).
European Patent Office, "Extended European Search Report and European Search Opinion", issued in connection with European Patent Application No. 11006706.3-2413, Apr. 5, 2012, (15 pages).
European Patent Office, "Extended European Search Report and European Search Opinion", issued in connection with European Patent Application No. 12004911.9-2413, Dec. 13, 2012, (8 pages).
European Patent Office, "Extended European Search Report", issued in connection with EP patent application No. 12004911.9, mailed Apr. 3, 2013 (11 pages).
European Patent Office, "Extended European Search Report", issued in connection with EP patent application No. 20196396.4, mailed Dec. 18, 2020 (11 pages).
European Patent Office, Intention to Grant, issued in connection with European Patent Application No. 11006705.5-1218, Feb. 26, 2020, (58 pages).
Eurpoean Patent Office, Communication Pursuant to Article 94(3) EPC, Issued in connection with Application No. 11006706.3-1870, Mar. 21, 2016, (9 pages).
Eurpoean Patent Office, Partial European Search Report, Issued in connection with Application No. 11006706.3-2413, Oct. 25, 2011, (7 pages).
Fecheyr-Lippens, "A Review of HTTP Live Streaming," Jan. 2010, 30 pages.
Intellectual Property India, "1st Examination Report," issued in connection with application No. 2320/DEL/2011, on Aug. 29, 2017, 5 pages.
Intellectual Property Office of Canada, "Office Action," issued in connection with application No. 2,749,013, Jun. 4, 2018, 4 pages.
Intellectual Property Office of China, "1st Office Action," issued in connection with application No. 201410432742.1 on Mar. 29, 2017, 16 pages.
IP Australia, "Notice of Acceptance", issued in connection with AU patent application 2012203829, issued Jun. 12, 2014, (2 pages).
IP Australia, "Notice of Acceptance", issued in connection with AU Patent Application No. 2014210640, issued May 2, 2016, (2 pages).

(56)          References Cited

OTHER PUBLICATIONS

IP Australia, "Notice of Acceptance", issued in connection with Australian Patent Application No. 2011211444, dated Apr. 29, 2014 (2 pages).

IP Australia, "Notice of Grant", issued in connection with AU patent application 2011211444, mailed Aug. 21, 2014, (2 pages).

IP Australia, "Notice of Grant", issued in connection with Australian Patent Application No. 2014210640, dated Oct. 20, 2016 (1 page).

IP Australia, "Patent Examination Report No. 1", issued in connection with AU patent application 2011211443, issued Apr. 2, 2013, (3 pages).

IP Australia, "Patent Examination Report No. 1", issued in connection with AU patent application 2011211444, issued Apr. 2, 2013, (3 pages).

IP Australia, "Patent Examination Report No. 1," issued in connection with Application No. 2014210640, May 27, 2015, 4 pages.

IP Australia, "Patent Examination Report No. 1," issued in connection with Australian Patent Application No. 2014218363, mailed Nov. 6, 2015 (3 pages).

Japan Patent Office, "Notice of Reasons for Rejection", issued in connection with JP patent application No. P2012-145685, mailed May 7, 2013 (4 pages).

Japanese Patent Office, "Notice of Reasons for Rejection", issued in connection with Japanese Patent Application No. P2011-177687, dated Jun. 4, 2013 (7 pages).

Japanese Patent Office, "Notice of Reasons for Rejection", issued in Patent application No. P2011-177687, Dated Aug. 21, 2012 (3 pages).

Japanese Patent Office, "Notice of Reasons for Rejection", issued in Patent application No. P2011-177690, Dated Aug. 17, 2012 (4 pages).

Japanese Patent Office, "Notice of Reasons for Rejection", issued in Patent application No. P2011-177690, Dated Aug. 21, 2012 (4 pages).

Japanese Patent Office, "Notice of Reasons for Rejection", issued in Patent application No. P2011-177690, Dated May 29, 2013 (4 pages). (Dispatch date is Jun. 25, 2013).

Papakostas et al., "Systems, Methods, and Apparatus to Monitor Mobile Internet Usage," U.S. Appl. No. 13/840,594, filed Mar. 15, 2013 (74 pages).

Patent Cooperation Treaty, "International Preliminary Report on Patentability," issued in connection with Application No. PCT/US2014/028176, Sep. 15, 2015, 7 pages.

Patent Cooperation Treaty, "International Search Report and Written Opinion," issued in connection with Application No. PCT/US2014/028176, Sep. 1, 2014, 11 pages.

Srivastava, J., et al. "Web Usage Mining: Discovery and Applications of Usage Patterns from Web Data" ACM SIGKDD Explorations Newsletter, vol. 1, Issue 2, pp. 12-33, Jan. 2000.

State Intellectual Preoprty Office of China, "Second Notification of Office Action", issued in connection with Chinese Patent Application No. 201410432742.1, on Nov. 16, 2017, (15 pages).

State Intellectual Property Office of China, "Notice of Allowance," issued in connection with Application No. 201210296506.2, Mar. 18, 2015, 5 pages.

The State Intellectual Property Office of China, "3rd Notification of Office Action", issued in connection with Chinese Patent Application No. 2014103432742.1, dated Apr. 23, 2018, (7 pages).

The State Intellectual Property Office of China, "First Office Action", issued in connection with Chinese Patent Application No. 201210296506.2, dated Sep. 2, 2014 (21 pages).

United States Patent and Trademark Office, "Advisory Action", issued in connection with U.S. Appl. No. 12/856,643, Nov. 4, 2013, (2 pages).

United States Patent and Trademark Office, "Advisory Action", issued in connection with U.S. Appl. No. 12/856,651, Nov. 22, 2013, (2 pages).

United States Patent and Trademark Office, "Advisory Action," issued in connection with U.S. Appl. No. 14/537,488, on Apr. 19, 2018, 8 pages.

United States Patent and Trademark Office, "Corrected Notice of Allowance", issued in connection with U.S. Appl. No. 14/537,488, Feb. 28, 2019, (2 pages).

United States Patent and Trademark Office, "Final Office Action", issued in connection with U.S. Appl. No. 12/856,651, Aug. 28, 2013, (16 pages).

United States Patent and Trademark Office, "Final Office Action", issued in connection with U.S. Appl. No. 13/840,543, Jan. 20, 2016, 57 pages.

United States Patent and Trademark Office, "Final Office Action", issued in connection with U.S. Appl. No. 14/529,784, Jan. 26, 2017, (21 pages).

United States Patent and Trademark Office, "Final Office Action", issued in connection with U.S. Appl. No. 14/537,484, Jan. 27, 2017, (11 pages).

United States Patent and Trademark Office, "Final Office Action", issued in connection with U.S. Appl. No. 14/537,488, Oct. 21, 2016, (18 pages).

United States Patent and Trademark Office, "Final Office Action", issued in connection with U.S. Appl. No. 16/511,780, on Aug. 11, 2021, 14 pages.

United States Patent and Trademark Office, "Final Office Action," issued in connection with U.S. Appl. No. 14/537,488, on Jan. 19, 2018, 19 pages.

United States Patent and Trademark Office, "Non-Final Office Action", issued in connection with U.S. Appl. No. 13/840,543, Jan. 26, 2017, (17 pages).

United States Patent and Trademark Office, "Non-Final Office Action", issued in connection with U.S. Appl. No. 14/041,613, Aug. 6, 2015, (10 pages).

United States Patent and Trademark Office, "Non-Final Office Action", issued in connection with U.S. Appl. No. 14/529,784, filed Aug. 5, 2016, (10 pages).

United States Patent and Trademark Office, "Non-Final Office Action", issued in connection with U.S. Appl. No. 14/537,484, Jul. 12, 2016, (29 pages).

United States Patent and Trademark Office, "Non-Final Office Action", issued in connection with U.S. Appl. No. 16/377,973, Nov. 12, 2019, (10 pages).

United States Patent and Trademark Office, "Non-Final Office Action", issued in connection with U.S. Appl. No. 17/063,652, Apr. 12, 2021, (13 pages).

United States Patent and Trademark Office, "Non-Final Office Action", issued in connection with U.S. Appl. No. 17/063,652, Aug. 2, 2021, (4 pages).

United States Patent and Trademark Office, "Non-Final Office Action," issued in connection with U.S. Appl. No. 13/840,543, on Nov. 17, 2017, 77 pages.

United States Patent and Trademark Office, "Non-Final Office Action," issued in connection with U.S. Appl. No. 14/537,488, Apr. 8, 2016, 14 pages.

United States Patent and Trademark Office, "Non-Final Office Action," issued in connection with U.S. Appl. No. 14/537,488, mailed on Jun. 30, 2017, 30 pages.

United States Patent and Trademark Office, "Non-Final Office Action," issued in connection with U.S. Appl. No. 14/537,488, on Jun. 28, 2018, 35 pages.

United States Patent and Trademark Office, "Non-Final Office Action," issued in connection with U.S. Appl. No. 15/700,883, on Aug. 14, 2018, 16 pages.

United States Patent and Trademark Office, "Notice of Allowance and Fee(s) Due", issued in connection with U.S. Appl. No. 17/063,652, Mar. 23, 2023, 7 pages.

United States Patent and Trademark Office, "Notice of Allowance and Fee(s) Due", issued in connection with U.S. Appl. No. 17/063,652, Mar. 23, 2022, (7 pages).

United States Patent and Trademark Office, "Notice of Allowance", issued in connection with U.S. Appl. No. 12/856,643, Apr. 10, 2014, (14 pages).

United States Patent and Trademark Office, "Notice of Allowance", issued in connection with U.S. Appl. No. 12/856,643, Aug. 5, 2014, (5 pages).

(56)          References Cited

OTHER PUBLICATIONS

United States Patent and Trademark Office, "Notice of Allowance", issued in connection with U.S. Appl. No. 12/856,651, Jul. 7, 2014, (13 pages).

United States Patent and Trademark Office, "Notice of Allowance", issued in connection with U.S. Appl. No. 12/856,651, Sep. 10, 2014, (2 pages).

United States Patent and Trademark Office, "Notice of Allowance", issued in connection with U.S. Appl. No. 13/174,517, Aug. 22, 2013, (19 pages).

United States Patent and Trademark Office, "Notice of Allowance", issued in connection with U.S. Appl. No. 13/174,517, Oct. 25, 2013, (6 pages).

United States Patent and Trademark Office, "Notice of Allowance", issued in connection with U.S. Appl. No. 13/174,517, Sep. 26, 2013, (2 pages).

United States Patent and Trademark Office, "Notice of Allowance", issued in connection with U.S. Appl. No. 13/840,543, Feb. 28, 2019, (8 pages).

United States Patent and Trademark Office, "Notice of Allowance", issued in connection with U.S. Appl. No. 13/840,543, Jun. 13, 2019, (3 pages).

United States Patent and Trademark Office, "Notice of Allowance", issued in connection with U.S. Appl. No. 13/840,594, May 26, 2015, (12 pages).

United States Patent and Trademark Office, "Notice of Allowance", issued in connection with U.S. Appl. No. 14/041,613, Nov. 25, 2015, (9 pages).

United States Patent and Trademark Office, "Notice of Allowance", issued in connection with U.S. Appl. No. 14/529,784, Apr. 26, 2017, (9 pages).

United States Patent and Trademark Office, "Notice of Allowance", issued in connection with U.S. Appl. No. 14/537,484, Apr. 13, 2017, 30 pages.

United States Patent and Trademark Office, "Notice of Allowance", issued in connection with U.S. Appl. No. 14/537,488, Jan. 23, 2019, (8 pages).

United States Patent and Trademark Office, "Notice of Allowance," issued in connection with U.S. Appl. No. 15/700,883, Jan. 4, 2019, 5 pages.

United States Patent and Trademark Office, "Notice of Allowance," issued in connection with U.S. Appl. No. 16/377,973, Jun. 4, 2020, 7 pages.

United States Patent and Trademark Office, "Notice of Allowance," issued in connection with U.S. Appl. No. 13/840,594, dated Nov. 17, 2015, 8 pages.

United States Patent and Trademark Office, "Office Action", issued in connection with U.S. Appl. No. 12/856,643, Jun. 18, 2012, (8 pages).

United States Patent and Trademark Office, "Office Action", issued in connection with U.S. Appl. No. 12/856,643, May 9, 2013, (10 pages).

United States Patent and Trademark Office, "Office Action", issued in connection with U.S. Appl. No. 12/856,651, Mar. 27, 2012, (12 pages).

United States Patent and Trademark Office, "Office Action", issued in connection with U.S. Appl. No. 13/174,517, Aug. 15, 2012, (13 pages).

United States Patent and Trademark Office, "Office Action", issued in connection with U.S. Appl. No. 13/840,543, May 21, 2015, (27 pages).

United States Patent and Trademark Office, "Office Action", issued in connection with U.S. Appl. No. 13/840,594, Mar. 11, 2015, (28 pages).

United States Patent and Trademark Office, "Office Action", issued in connection with U.S. Appl. No. 13/840,594, Sep. 19, 2014, (12 pages).

United States Patent and Trademark Office, "Office Communication," issued in connection with U.S. Appl. No. 12/856,651, mailed Sep. 10, 2014 (2 pages).

United States Patent and Trademark Office, "Pre-Brief Appeal Conference Decision", issued in connection with U.S. Appl. No. 12/856,651, Jan. 13, 2014, (2 pages).

United States Patent and Trademark Office, "Pre-Brief Appeal Conference Decision", issued in connection with U.S. Appl. No. 14/537,488, Jun. 7, 2017, (2 pages).

United States Patent and Trademark Office, "Advisory Action", issued in connection with U.S. Appl. No. 14/928,741, Aug. 18, 2020 (3 pages).

United States Patent and Trademark Office, "Corrected Notice of Allowance", issued in connection with U.S. Appl. No. 16/436,742, Feb. 1, 2021 (2 pages).

United States Patent and Trademark Office, "Corrected Notice of Allowance", issued in connection with U.S. Appl. No. 16/436,742, dated Feb. 12, 2021, (2 pages).

United States Patent and Trademark Office, "Final Office Action", issued in connection with U.S. Appl. No. 14/928,741, May 6, 2020, (11 pages).

United States Patent and Trademark Office, "Final Office Action", issued in connection with U.S. Appl. No. 14/928,741, Oct. 28, 2021, (17 pages).

United States Patent and Trademark Office, "Non-Final Office Action", issued in connection with U.S. Appl. No. 14/928,741, Mar. 8, 2021 (13 pages).

United States Patent and Trademark Office, "Non-Final Office Action", issued in connection with U.S. Appl. No. 14/928,741, Sep. 20, 2019 (14 pages).

United States Patent and Trademark Office, "Non-Final Office Action", issued in connection with U.S. Appl. No. 16/511,780, dated Jan. 29, 2021, (14 pages).

United States Patent and Trademark Office, "Notice of Allowance and Fee(s) Due", issued in connection with U.S. Appl. No. 14/928,741, Apr. 13, 2022 (24 pages).

United States Patent and Trademark Office, "Notice of Allowance and Fee(s) Due", issued in connection with U.S. Appl. No. 16/511,780, dated Jul. 20, 2022, 10 pages.

United States Patent and Trademark Office, "Notice of Allowance and Fee(s) Due", issued in connection with U.S. Appl. No. 16/511,780, dated Mar. 2, 2022, (8 pages).

United States Patent and Trademark Office, "Notice of Allowance", issued in connection with U.S. Appl. No. 16/436,742, Nov. 18, 2020, (9 pages).

User Identification and Authentication Vital Security 9.2, XP55009307, http://www.m86security.com/software/secure_web_gateway/manuals.9.2.0/User_Identification_and_Authentication.pdf, Apr. 25, 2010, (27 pages).

Wavecrest Computing, Cyfin Proxy, User Manual for Version 8.2.x, pp. 1-140, Apr. 9, 2010 (147 pages).

Zenel, B., "A general Purpose Proxy Filtering Mechanism Applied to the Mobile Environment," Wireless Networks, ACM, US, vol. 5, No. 5, Oct. 1999 (Oct. 1999), pp. 391-409, XP000902494.

\* cited by examiner

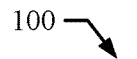
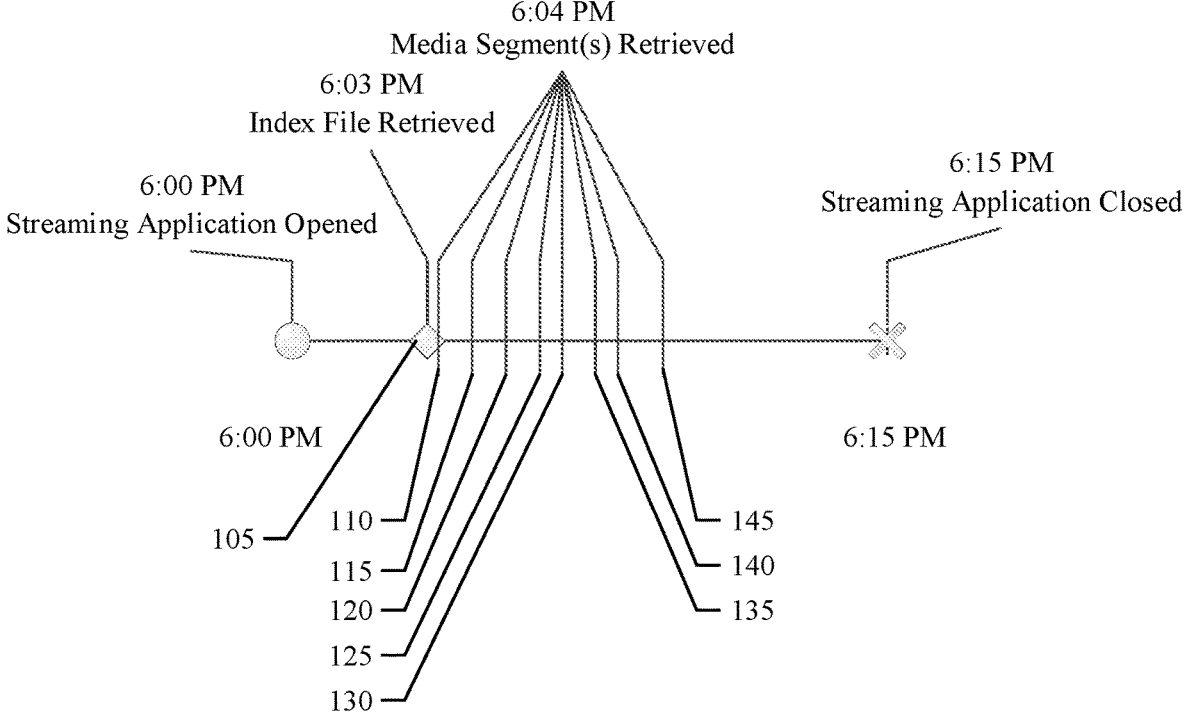
FIG. 1

700

START

RECEIVE PROXY RECORDS — 710

ANALYZE PROXY RECORDS TO IDENTIFY MEDIA SESSION(S) — 720

CALCULATE PARENT AND CHILD MEDIA SESSION DURATIONS — 730

CLASSIFY IDENTIFIED CHILD MEDIA SESSION(S) AS ASSOCIATED WITH RESPECTIVE PUBLISHER(S) — 740

PREPARE REPORT INDICATING USAGE OF STREAMING MEDIA BY PUBLISHER — 750

END

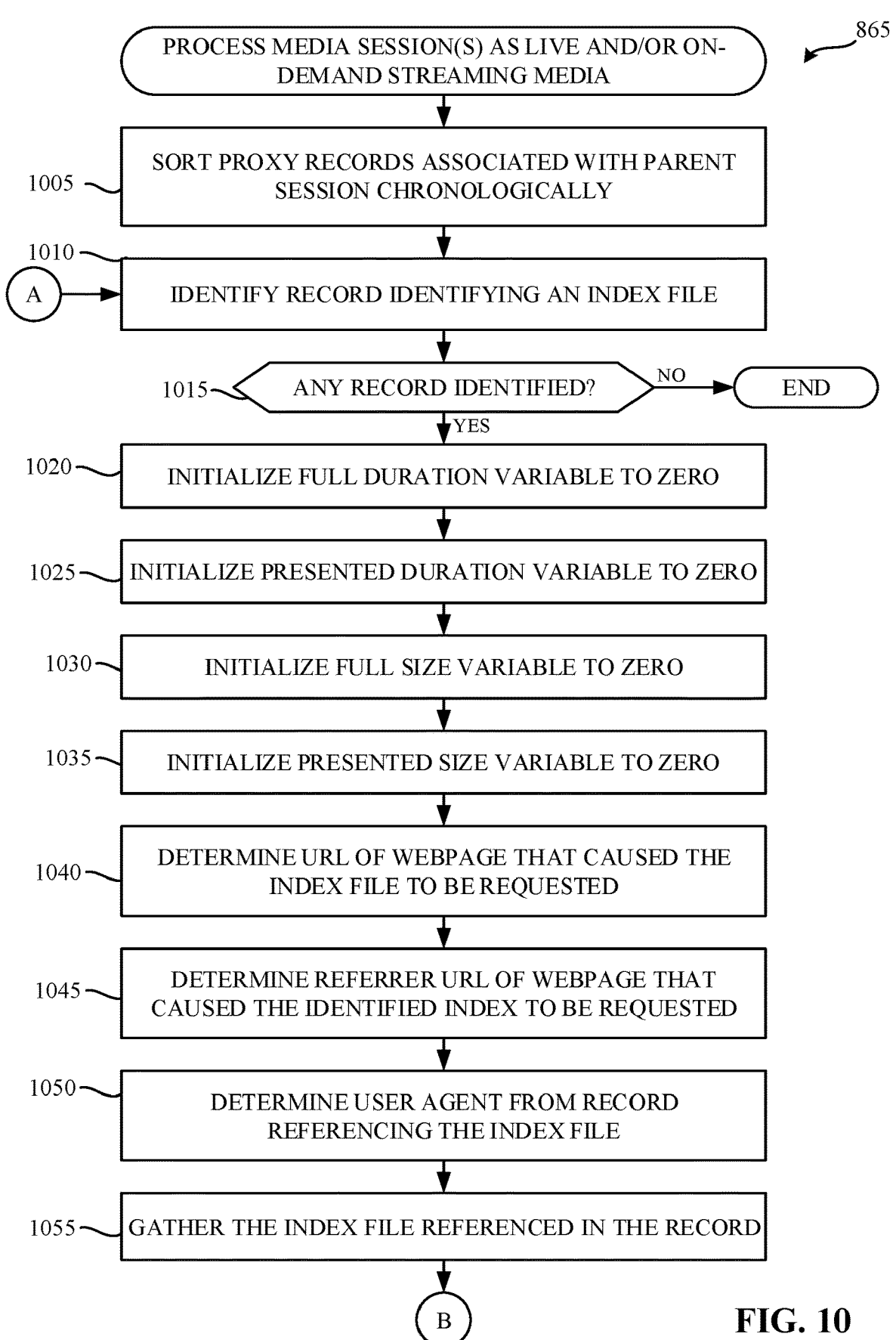

865

PROCESS MEDIA SESSION(S) AS LIVE AND/OR ON-DEMAND STREAMING MEDIA

1005 — SORT PROXY RECORDS ASSOCIATED WITH PARENT SESSION CHRONOLOGICALLY

1010

A → IDENTIFY RECORD IDENTIFYING AN INDEX FILE

1015 — ANY RECORD IDENTIFIED? — NO → END

YES

1020 — INITIALIZE FULL DURATION VARIABLE TO ZERO

1025 — INITIALIZE PRESENTED DURATION VARIABLE TO ZERO

1030 — INITIALIZE FULL SIZE VARIABLE TO ZERO

1035 — INITIALIZE PRESENTED SIZE VARIABLE TO ZERO

1040 — DETERMINE URL OF WEBPAGE THAT CAUSED THE INDEX FILE TO BE REQUESTED

1045 — DETERMINE REFERRER URL OF WEBPAGE THAT CAUSED THE IDENTIFIED INDEX TO BE REQUESTED

1050 — DETERMINE USER AGENT FROM RECORD REFERENCING THE INDEX FILE

1055 — GATHER THE INDEX FILE REFERENCED IN THE RECORD

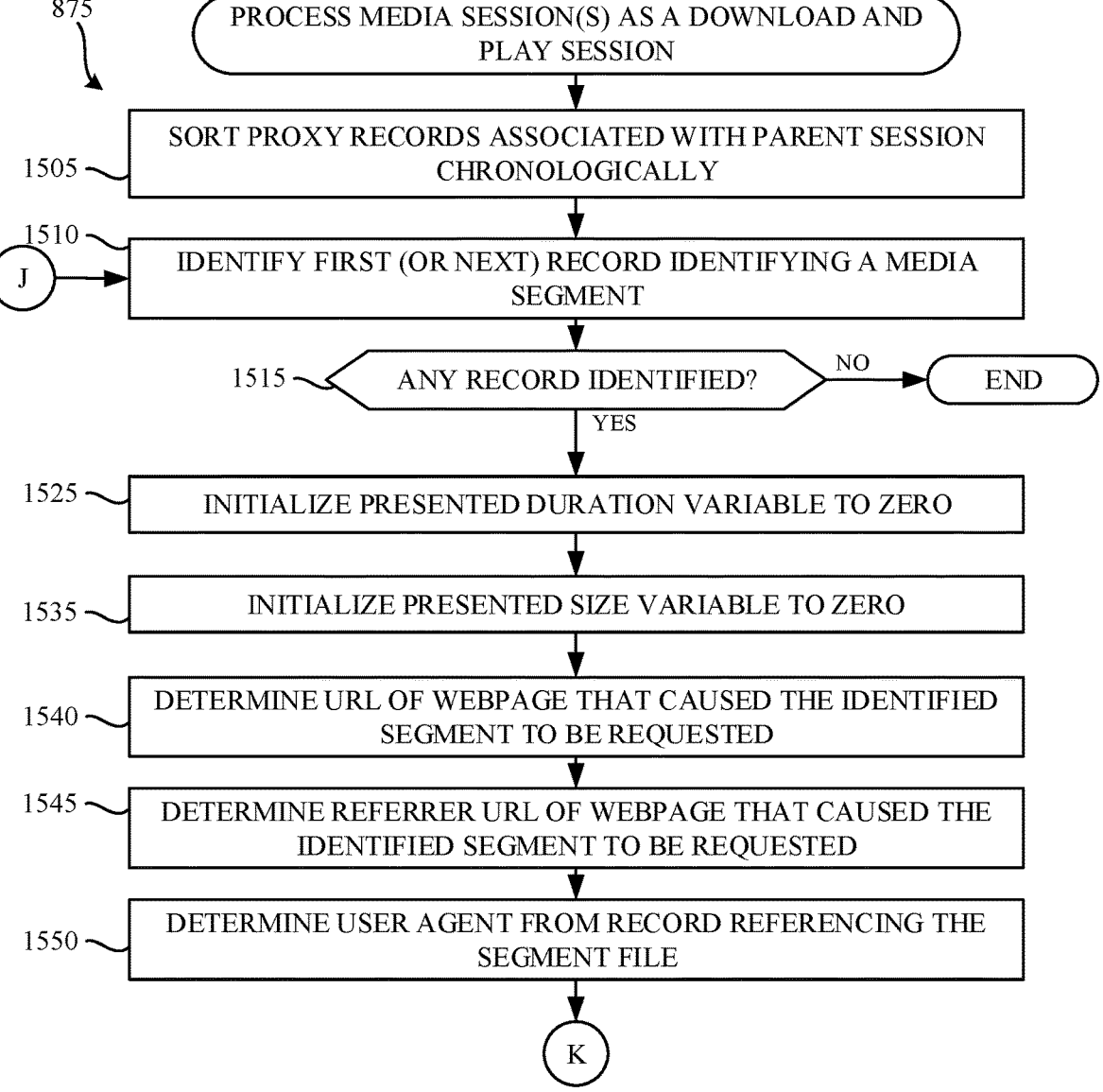

875

PROCESS MEDIA SESSION(S) AS A DOWNLOAD AND PLAY SESSION

1505 — SORT PROXY RECORDS ASSOCIATED WITH PARENT SESSION CHRONOLOGICALLY

1510 — J — IDENTIFY FIRST (OR NEXT) RECORD IDENTIFYING A MEDIA SEGMENT

1515 — ANY RECORD IDENTIFIED? — NO — END

YES

1525 — INITIALIZE PRESENTED DURATION VARIABLE TO ZERO

1535 — INITIALIZE PRESENTED SIZE VARIABLE TO ZERO

1540 — DETERMINE URL OF WEBPAGE THAT CAUSED THE IDENTIFIED SEGMENT TO BE REQUESTED

1545 — DETERMINE REFERRER URL OF WEBPAGE THAT CAUSED THE IDENTIFIED SEGMENT TO BE REQUESTED

1550 — DETERMINE USER AGENT FROM RECORD REFERENCING THE SEGMENT FILE

METHODS AND APPARATUS TO CREDIT MEDIA PRESENTATIONS FOR ONLINE MEDIA DISTRIBUTIONS

CROSS REFERENCE TO RELATED APPLICATIONS

This patent application is a continuation of U.S. Patent Application No. 14,928,741, filed Oct. 30, 2015, now U.S. Pat. No. 11,423,420, which claims the benefit under 35 U.S.C. § 119 (e), of U.S. Provisional Patent Application Ser. No. 62/113,177 entitled "METHODS AND APPARATUS TO MONITOR A MEDIA PRESENTATION," which was filed on Feb. 6, 2015 and is hereby incorporated by reference in its entirety.

FIELD OF THE DISCLOSURE

This disclosure relates generally to media monitoring and, more particularly, to methods and apparatus to credit media presentations for online media distributions.

BACKGROUND

In recent years, media has been presented via a number of mediums including, without limitation, web browsers, media players, and media applications. Information relating to such media presentations is important to many parties, including audience measurement entities. An audience measurement entity ("AME") collects records of media presentations to analyze viewing and/or listening behaviors of audiences, which can be used by publishers and/or presenters to better allocate media (e.g., content, advertisement, etc.) expenditures and/or market products. An AME may be a ratings provider, or any other entity interested in measuring the distribution, presentation, and/or consumption of media.

One type of media presentation measured by an AME or other interested parties is media distributed via computer networks (e.g., Internet media, Internet protocol television ("IPTV") media, etc.). Media distributed via computer networks can be streamed (live or on-demand) and downloaded-and-played.

BRIEF DESCRIPTION OF THE DRAWINGS

FIG. 1 is a diagram illustrating an example media session.

FIGS. 10-14 illustrate a flowchart representative of example machine readable instructions that may be executed to implement the example session classifier of FIG. 6 to process live and/or on-demand streaming media sessions.

FIGS. 15-17 illustrate a flowchart representative of example machine readable instructions that may be executed to implement the example session classifier of FIG. 6 to process "download-and-play" media sessions.

DETAILED DESCRIPTION

Figure 2:
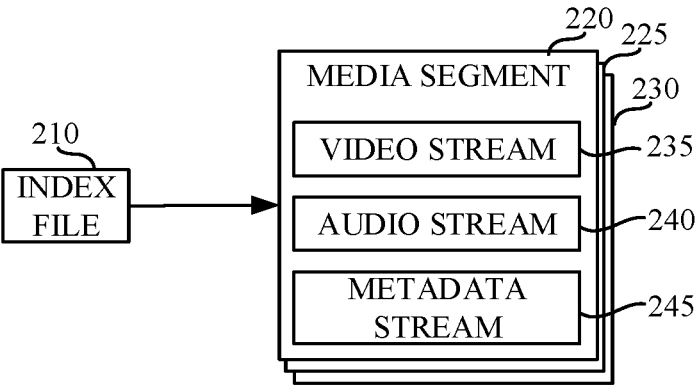
FIG. 2 is a block diagram of an example index file and example media segments received by a media device.

Media is often presented through media devices (e.g., mobile devices, set top boxes, over-the-top devices, etc.), media players (e.g., web based media players (e.g., YouTube™, Hulu™, etc.)), and/or applications (e.g., on device software applications (e.g., Netflix™, WindowsMedia-Player™, etc.)) by a media presenter.

A presenter of media is a party who makes media available to an end user (e.g., a company controlling media devices, media players, and/or applications through which media is presented). The presenter of media makes the media available through a parent session. A parent session is a duration of time through which the presenter of media is presenting media or providing the capability of media presentation (e.g., the time a user accesses YouTube™).

In contrast, a publisher of media is one who owns, uploads, creates, or otherwise directs the creation and/or production of the media (e.g., creator, author, copyright holder, producer, etc.), which is ultimately presented by the media presenter. The media presenter may present a number of different media from a number of different publishers during a parent session. Therefore, the duration of time through which a particular media from a particular publisher is being presented is referred to as a child session.

In some examples, the publisher of media is the same as the presenter of media (e.g., Netflix™ commissioned original production of the series House of Cards™, which is also presented through Netflix™ streaming media service). A child session may also be a parent session, in some examples, with respect to advertisements presented between breaks in the media associated with the child session (e.g., Comcast™ may be the parent session through which the child session Gotham™ is presented, wherein a Coca-Cola™ advertisement is presented during presentation of Gotham™ (e.g., a child session within a child session)).

In examples disclosed herein, example apparatus and methods identify child sessions within parent sessions (e.g., media presented within an application or webpage media player), determine a length of time for which the child sessions were presented, credit the publishers of the child sessions for the time presented (e.g., a publisher is credited for presentation of a media session established by the publisher), and credit presenters of the parent session (e.g., a presenter is credited for aggregate plurality of child sessions presented within the parent session).

As used herein, the term "media" includes any type of content and/or advertisement delivered via any type of distribution medium. Thus, media includes television programming or advertisements, radio programming or advertisements, movies, web sites, streaming media, etc. Media can be pre-recorded and of a known and fixed length (media on demand), or live media.

As used herein, the term "media device" includes any device that retrieves and/or receives media from a media provider for presentation. In some examples, a media device is capable of directly presenting media (e.g., via a display). In some examples, the media device presents the media on separate media presentation equipment (e.g., speakers, a display, etc.). Thus, as used herein, "media devices" may or may not be able to present media without assistance from a second device. Media devices are typically consumer electronics. In some examples, a media device is a personal computer such as a laptop computer, and thus, is capable of directly presenting media (e.g., via an integrated and/or connected display and speakers). Any other type(s) and/or number(s) of media device(s) may additionally or alternatively be used. For example, media devices may be Internet-enabled mobile handsets (e.g., a smartphone, an iPod®, etc.), media game consoles (e.g., Xbox®, PlayStation 3, etc.), tablet computers (e.g., an iPad®, a Motorola™ Xoom™, etc.), digital media players (e.g., a Roku® media player, a Sling Box®, a Tivo®, etc.), smart televisions, desktop computers, laptop computers, servers, etc.

HyperText Markup Language, or HTML, refers to a markup language for creating web media that defines a set of rules for encoding information inside a document so that a client application (e.g., a browser can interpret the markups to present the document).

Hypertext Transfer Protocol, or HTTP, is a digital, request-response protocol for information exchange based in a client-server computing model. The client submits an HTTP request message to the server. The server, which provides resources and other media on behalf of the client, returns a response message to the client. The response contains completion status information about the request.

HTTP Live Streaming, or HLS, refers to an HTTP-based media streaming communications protocol implemented by Apple Inc., as part of their iOS software.

Multipurpose Internet Mail Extensions, or MIME, refers to an internet standard which started with adding the ability for email to carry rich content and has now extended to include and describe all web media in general.

Streaming media, as used herein, refers to media that is presented to a user by a media device at least partially in parallel with the media being transmitted (e.g., via a network) to the media device (or a device associated with the media device) from a media-providing server of a media provider (e.g., Netflix™, Hulu™, etc.). Often times, streaming media is used to present live events. However, streaming media may also be used for non-live events (e.g., a time-shifted media presentation and/or media on demand presentation). Typically, time-adjacent portions of a streaming media file are delivered to and stored in a buffer, or temporary memory cache, of a media device while the streaming media is presented to the user. The buffer releases stored streaming media for presentation while continuing to fill with un-played portions of the streaming media. This process continues until the user terminates presentation of the streaming media and/or the complete streaming media file has been delivered (e.g., downloaded). In situations where the complete streaming media file has been delivered, the media device typically continues releasing the buffered streaming media for presentation until the buffer is emptied.

In some examples, media is presented to a particular user, such as a panelist of an audience measurement entity. As used herein, the term "panelist" refers to users registered on a panel maintained by a ratings entity (e.g., an audience measurement entity such as the Nielsen Company, LLC) that owns and/or operates the ratings entity subsystem or another entity that maintains a subset of users for any monitoring purpose. Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People become panelists via, for example, a user interface presented on a media device (e.g., via a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

Monitoring companies desire to gain knowledge regarding how users or panelists interact with media devices. In some examples, monitoring companies want to monitor Internet traffic to and/or from the media devices to, among other things, monitor exposure to advertisements, determine advertisement effectiveness, determine user behavior, identify purchasing behavior associated with various demographics, credit application usage, monitor usage of streaming medias, etc. Monitoring streaming media sessions is difficult because, for example, hundreds or even thousands of messages may be involved in the streaming session. In some examples, identification and/or grouping of messages into a streaming media session may present difficulties.

Example approaches for identifying media sessions and/or durations of those media sessions involve adding monitoring functionality to the media devices themselves by, for example, instrumenting a media application displaying the streaming media with monitoring functionality, providing executable instructions on a web page that report session and/or session duration information to a central facility, etc. Such approaches enable monitoring of media that is presented via those instrumented applications and/or websites with executable instructions but, in some examples, do not enable monitoring and/or reporting of media that is presented outside of those instrumented applications and/or websites. For example, monitoring systems implemented on an Apple iOS media device are restricted from interacting with and/or otherwise monitoring other applications executed by the media device.

Moreover, such instrumented applications and/or websites with executable instructions consume media device resources when operating the monitoring functionality and, as a result, can affect performance of the media device. Affecting performance of a media device as a result of a monitoring effort is undesirable because it may, in turn, influence how a user interacts with their media device. Influencing how a user interacts with their media device is undesirable because it reduces the reliability of statistics created as a result of the monitoring effort.

Properly classifying and/or crediting the streaming session as associated with a particular publisher is difficult because, for example, the streaming media may be hosted by a party other than the publisher of the media (e.g., a third party media host such as, for example, YouTube™, Netflix™, Hulu™, etc.). As described above, a media presenter hosts the presentation of media to a user, whereas a media publisher is one who owns, uploads, creates, or otherwise directs the creation of the media (e.g., creator, author, copyright holder, etc.). For example, Netflix™ presents media published by FOX™ Broadcasting Company (e.g., Gotham is a FOX™ media presented by Netflix™). In some examples, the media presenter is the media publisher. For example, Netflix™ presents media published by Netflix™ (e.g., House of Cards™ is published by Netflix™). In such instances, audience measurement entities or others monitoring the media presentation will credit the media presenters for the media of the media session (e.g., credited in audience measurement records kept by an audience measurement entity) instead of the publisher.

In some known systems, streaming media is not credited separately from application and/or website usage. Instead, durations of the streaming media (e.g., child sessions) are simply encapsulated inside the duration of the parent website or application from where the streaming media was launched. As such, the time that an application was used (e.g., how long a user had a Netflix application open) is indistinguishable from the amount of time that streaming media was presented. For example, a user may have a streaming application open (on the user's media device) for thirty minutes, but only actually stream media for ten of those minutes. In another example, while the streaming application was open (on the user's media device) for thirty minutes, two different media presentations may have been streamed during that time (e.g., ten minutes of a first media and fifteen minutes of a second media).

Prior systems identify that a streaming application was open without identifying the streaming media presented within the streaming application and/or how long the identified streaming media was presented (e.g., the Netflix application may be open for an hour, but a user has only streamed a particular publisher's media for forty minutes). It is desirable for media crediting to reflect the particular viewed duration of a corresponding media session. The publisher should be credited separately from the media presenter (e.g., it is desired to credit the publisher for the forty minutes that media from the publisher was presented and to credit the presenter for the entire hour that media was presented by the presenter).

Additionally, media sessions are presented as a live stream, an on-demand stream, and/or a "download-and-play" media to be played via a device. Each media presentation type may have alternate configurations and crediting procedures. Additionally, techniques for determining the duration and usage of a media session may vary for each presentation type.

FIG. 1 is a diagram illustrating an example media session 100. The example media of FIG. 1 is broken into multiple files, which are called segments. An example media device begins the example media session 100 by requesting and/or receiving an example index file 105 for user-requested media, based on a URL identifying the stream. The example index file 105 identifies a sequence of the segments 110, 115, 120, 125, 130, 135, 140, 145 (e.g., those segments that make up the entire media), a location (URL) for each example segment 110, 115, 120, 125, 130, 135, 140, 145, and information regarding the length of each segment 110, 115, 120, 125, 130, 135, 140, 145 (in seconds). The example index file 105 identifies locations of the available media files, decryption keys, and/or any alternate streams available. For a selected stream, a media device requests and/or downloads each available media file (e.g., example segments 110, 115, 120, 125, 130, 135, 140, 145) in sequence. In the illustrated example of FIG. 1, the example media session 100 begins at 6:00 PM, and ends at 6:15 PM. Within the example media session 100, a proxy log indicates that the example index file 105 was retrieved at 6:03 PM. Subsequent to the retrieval of the example index file 105, the media device requests the example segments 110, 115, 120, 125, 130, 135, 140, 145.

An example media-providing server (e.g., servers owned by example media providers) may include a stream segmenter to produce the example segments 110, 115, 120, 125, 130, 135, 140, 145. In some examples, the streaming media includes a series of files with extension .ts containing segments of an MPEG-2 transport stream carrying H.264 media and AAC audio. In some examples, the media-providing server segments the media prior to receiving a request for the stream. However, in some examples, the media-providing server segments the requested media as the example segments 110, 115, 120, 125, 130, 135, 140, 145 are requested. In some examples, HLS is used for audio-only broadcasts. In such examples, the stream segmenter produces MPEG elementary audio streams containing either AAC or MP3 audio. For media streaming over HLS, both media and the associated audio are contained in the same segment.

An example protocol natively supported for streaming by iOS devices is HLS, which is based on index and segment files. Media providers use the HLS protocol in both live broadcast sessions and media on demand sessions. For live sessions, as new media files are created and/or made available, the index file is updated. This means that the segment files with the media are periodically created and the index files pointing to these segment files are periodically updated through the course of the live event being broadcast. This periodic generation and update of these files happens frequently, typically every few seconds depending on the type of event. For example, anywhere from 3 to 15 seconds has been observed in tests. Each time, the new index file lists the new media files. In some examples, older media (segment) files are removed from the index altogether each time and discarded. In some examples, the index file adds new media files to an existing list, thus keeping new and old segments. In such examples, live media sessions can be converted to on-demand after a live streaming event is completed.

FIG. 2 is a block diagram of an example index file 210 and example media segments 220, 225, 230 received by a media device. Each example media segment 220, 225, 230 includes example video stream data 235, example audio stream data 240, and example metadata stream data 245. Other alternate data may be included within the example media segment 220, 225, 230. In some examples, the example index file 210 identifies other index file(s) (as opposed to identifying media segments) and, operates as a master index file.

Individual segments found inside the example index file 210 contain duration information encoded as described below. In some examples, the tag EXTINF is a record marker that describes the segment file identified by the URL that follows it. An EXTINF tag, per the M3U standard, precedes each such segment file URL. Its format is:

EXTINF:<duration>,<title> where "duration" is an integer or floating-point number in decimal positional notation that specifies the duration of the particular media segment file in seconds. In some examples, the title is optional. Example 1 shows index files with EXTINF tags.

Example 1

Example of an index file with media segments:

```
#EXTM3U
#EXT-X-MEDIA-SEQUENCE:1
#EXT-X-TARGETDURATION:10
#EXTINF:9.5,
[scheme]://media.example.com/segment1.ts
#EXTINF:10.0,
[scheme]://media.example.com/segment2.ts
#EXTINF:10.0,
[scheme]://media.example.com/segment3.ts
#EXT-X-ENDLIST
```

[scheme]—http
Bold—tag indicating beginning of index file.
Italics—path to segment file,
Underline—tag indicating end of index file.
EXTINF: length in seconds of the segment that follows (can be decimal).
EXT-X-TARGETDURATION: max segment duration.

In some examples, an example media device downloads the example segments 220, 225, 230 (e.g., by requesting the respective segments), in the correct order, one after the other. In some examples, buffering occurs in the beginning of an example media presentation while the example media device gathers sufficient information to present the requested media. Once the example media device has a sufficient amount of streaming media downloaded, the example media device presents the reassembled stream to the user (e.g., streaming media is presented) through a browser application or application. During the presentation, the example media device receives additional media, buffers the same if necessary, and presents the additional media when the previously presented media is complete.

A continuous sequence of records with index and segment files in the proxy logs is indicative of a live streaming session over HLS. For example, a media device receives records with index files every few seconds (e.g., every 10 to 15 seconds depending on the type of the live event). Each record with an index file is followed by at least one record with a segment file. The number of segment files following the index file varies even within the same stream. In some examples, each segment and/or index records are associated with a known user agent ID (e.g., AppleCoreMedia). In some examples, each segment and/or index files of the same live stream have the same eligible URL.

The type of live event affects the frequency of the index files and, in some examples, the frequency of the segment files. For example, a sporting event has continuous movement (e.g., the media presentation is constantly changing focus on a play-by-play basis) and thus, a media provider generates index files approximately every 5 seconds. Similarly, a live debate from a parliament has less movement and change (e.g., the media presentation has a more stationary focus on the members of debate) and thus, a media provider generates index files approximately every 10 seconds. In some examples, a weather or nature web cam has even less movement and change (e.g., the media presentation doesn't change very frequently) and thus, a media provider generates index files approximately every 15 seconds. Example 2 shows records from a live streaming session. In the illustrated example, [scheme] is substituted for "http". Additionally or alternatively, other schemes may be used (e.g., https, ftp, mailto, file, data, etc.).

Example 2

Example messages sent in an example session with index and segment files during a live stream from a city web cam:

```
2014-01-19 16:38:21 +0000                    GET
[scheme]://media2.earthcam.com:1935/fecnetwork/4931.flv/playlist.m3u8?wowzases
sionid=1694040126 HTTP/1.1            200     237      AppleCoreMedia/1.0.0.11A501
(iPhone; U; CPU OS 7_0_2 like Mac OS X; en_us)          -          -          -
                     application/vnd.apple.mpegurl    508     31350
2014-01-19 16:38:21 +0000                    GET
[scheme]://media2.earthcam.com:1935/fecnetwork/4931.flv/media_3828.ts?wowzase
ssionid=1694040126 HTTP/1.1            200     498388
                     AppleCoreMedia/1.0.0.11A501 (iPhone; U; CPU OS 7_0_2 like Mac OS X;
en_us)          -          -          -      media/MP2T 498643            532812
2014-01-19 16:38:22 +0000                    GET
[scheme]://media2.earthcam.com:1935/fecnetwork/4931.flv/media_3829.ts?wowzase
ssionid=1694040126 HTTP/1.1            200     495192
                     AppleCoreMedia/1.0.0.11A501 (iPhone; U; CPU OS 7_0_2 like Mac OS X;
en_us)          -          -          -      media/MP2T 495448            5351586
2014-01-19 16:38:27 +0000                    GET
[scheme]://media2.earthcam.com:1935/fecnetwork/4931.flv/media_3830.ts?wowzase
ssionid=1694040126 HTTP/1.1            200     400440
                     AppleCoreMedia/1.0.0.11A501 (iPhone; U; CPU OS 7_0_2 like Mac OS X;
en_us)          -          -          -      media/MP2T 400696            383569
2014-01-19 16:38:36 +0000                    GET
[scheme]://media2.earthcam.com:1935/fecnetwork/4931.flv/playlist.m3u8?wowzases
sionid=1694040126 HTTP/1.1            200     237      AppleCoreMedia/1.0.0.11A501
(iPhone; U; CPU OS 7_0_2 like Mac OS X; en_us)          -          -          -
                     application/vnd.apple.mpegurl    509     247333
2014-01-19 16:38:36 +0000                    GET
[scheme]://media2.earthcam.com:1935/fecnetwork/4931.flv/media_3831.ts?wowzase
ssionid=1694040126 HTTP/1.1            200     491432
                     AppleCoreMedia/1.0.0.11A501 (iPhone; U; CPU OS 7_0_2 like Mac OS X;
en_us)          -          -          -      media/MP2T 491687            873046
2014-01-19 16:38:51 +0000                    GET
[scheme]://media2.earthcam.com:1935/fecnetwork/4931.flv/playlist.m3u8?wowzases
```

-continued

```
sionid=1694040126 HTTP/1.1                200    237    AppleCoreMedia/1.0.0.11A501
(iPhone; U; CPU OS 7_0_2 like Mac OS X; en_us)                    -       -       -
                       application/vnd.apple.mpegurl    509    246951       -
2014-01-19 16:38:51 +0000              GET
[scheme]://media2.earthcam.com:1935/fecnetwork/4931.flv/media_3832.ts?wowzase
ssionid=1694040126 HTTP/1.1               200    495568
                AppleCoreMedia/1.0.0.11A501 (iPhone; U; CPU OS 7_0_2 like Mac OS X;
en_us)                 -     -     -    media/MP2T 495823              832138
2014-01-19 16:38:52 +0000              GET
[scheme]://media2.earthcam.com:1935/fecnetwork/4931.flv/media_3833.ts?wowzase
ssionid=1694040126 HTTP/1.1               200    398748
                AppleCoreMedia/1.0.0.11A501 (iPhone; U; CPU OS 7_0_2 like Mac OS X;
en_us)                 -     -     -    media/MP2T 399004              546378
2014-01-19 16:39:06 +0000              GET
[scheme]://media2.earthcam.com:1935/fecnetwork/4931.flv/playlist.m3u8?wowzases
sionid=1694040126 HTTP/1.1                200    237    AppleCoreMedia/1.0.0.11A501
(iPhone; U; CPU OS_7_0_2 like Mac OS X; en_us)                   -       -       -
                       application/vnd.apple.mpegurl    509    4233129       -
2014-01-19 16:39:10 +0000              GET
[scheme]://media2.earthcam.com:1935/fecnetwork/4931.flv/media_3834.ts?wowzase
ssionid=1694040126 HTTP/1.1               200    494252
                AppleCoreMedia/1.0.0.11A501 (iPhone; U; CPU OS 7_0_2 like Mac OS X;
en_us)                 -     -     -    media/MP2T 494507              820760
2014-01-19 16:39:21 +0000              GET
[scheme]://media2.earthcam.com:1935/fecnetwork/4931.flv/playlist.m3u8?wowzases
sionid=1694040126 HTTP/1.1                200    237    AppleCoreMedia/1.0.0.11A501
(iPhone; U; CPU OS 7_0_2 like Mac OS X; en_us)                   -       -       -
                       application/vnd.apple.mpegurl    509    29822
2014-01-19 16:39:21 +0000              GET
[scheme]://media2.earthcam.com:1935/fecnetwork/4931.flv/media_3835.ts?wowzase
ssionid=1694040126 HTTP/1.1               200    500456
                AppleCoreMedia/1.0.0.11A501 (iPhone; U; CPU OS 7_0_2 like Mac OS X;
en_us)                 -     -     -    media/MP2T 500711              769663
2014-01-19 16:39:22 +0000              GET
[scheme]://media2.earthcam.com:1935/fecnetwork/4931.flv/media_3836.ts?wowzase
ssionid=1694040126 HTTP/1.1               200    399124
                AppleCoreMedia/1.0.0.11A501 (iPhone; U; CPU OS 7_0_2 like Mac OS X;
en_us)                 -     -     -    media/MP2T 399380              496752
2014-01-19 16:39:36 +0000              GET
[scheme]://media2.earthcam.com:1935/fecnetwork/4931.flv/playlist.m3u8?wowzases
sionid=1694040126 HTTP/1.1                200    237    AppleCoreMedia/1.0.0.11A501
(iPhone; U; CPU OS 7_0_2 like Mac OS X; en_us)                   -       -       -
                       application/vnd.apple.mpegurl    509    28223
2014-01-19 16:39:36 +0000              GET
[scheme]://media2.earthcam.com:1935/fecnetwork/4931.flv/media_3837.ts?wowzase
ssionid=1694040126 HTTP/1.1               200    500832
                AppleCoreMedia/1.0.0.11A501 (iPhone; U; CPU OS 7_0_2 like Mac OS X;
en_us)                 -     -     -    media/MP2T 501207              637183
```

[scheme]—http
Wavy line—Segment file eligible URL
Thick Underline—INDEX ID file eligible URL
Double Underline—AppleCoreMedia user agent consistent for all records
Bold—Media-Type value, different for index files and segment files The constant, dynamic change of the index files during a live broadcast streamed to a media device results in a media provider updating or sending new index files every few seconds. Accordingly, in live streaming sessions, it is expected that there will be a large numbers of index files (e.g., ten or more index files, twenty or more index files, etc.). In examples where media is streamed on demand a media provider sends index files when there is a bandwidth change during the streaming process (or other event that requires a new index file to be retrieved).

The HLS protocol supports automatic switching between streams to adjust to any changes in the network bandwidth. For example, the media device, while presenting the media, moves away from a Wi-Fi™ network (e.g., high bandwidth) to a cellular network (e.g., low bandwidth). In examples where multiple index files with segments are available (each one corresponding to a different bandwidth and/or other attribute) the media device automatically switches to an appropriate bandwidth (e.g., low for the example cellular network).

For example, a media device requests and/or retrieves example index files at a beginning of (and during) the media presentation and/or streaming process. If the index file contains alternate streams, the index file contains the URLs of the alternate streams and each one of those URLs corresponds to a different index file. These alternate streams support delivery of multiple streams of the same media with varying quality levels for different network bandwidths or different media devices. An example media device determines appropriate times to switch between the alternate streams, if needed. In some examples, a master index file 310 identifies a sub-index file 320 that is specific to an alternate stream, as discussed further with reference to FIG. 3.

Figure 3:
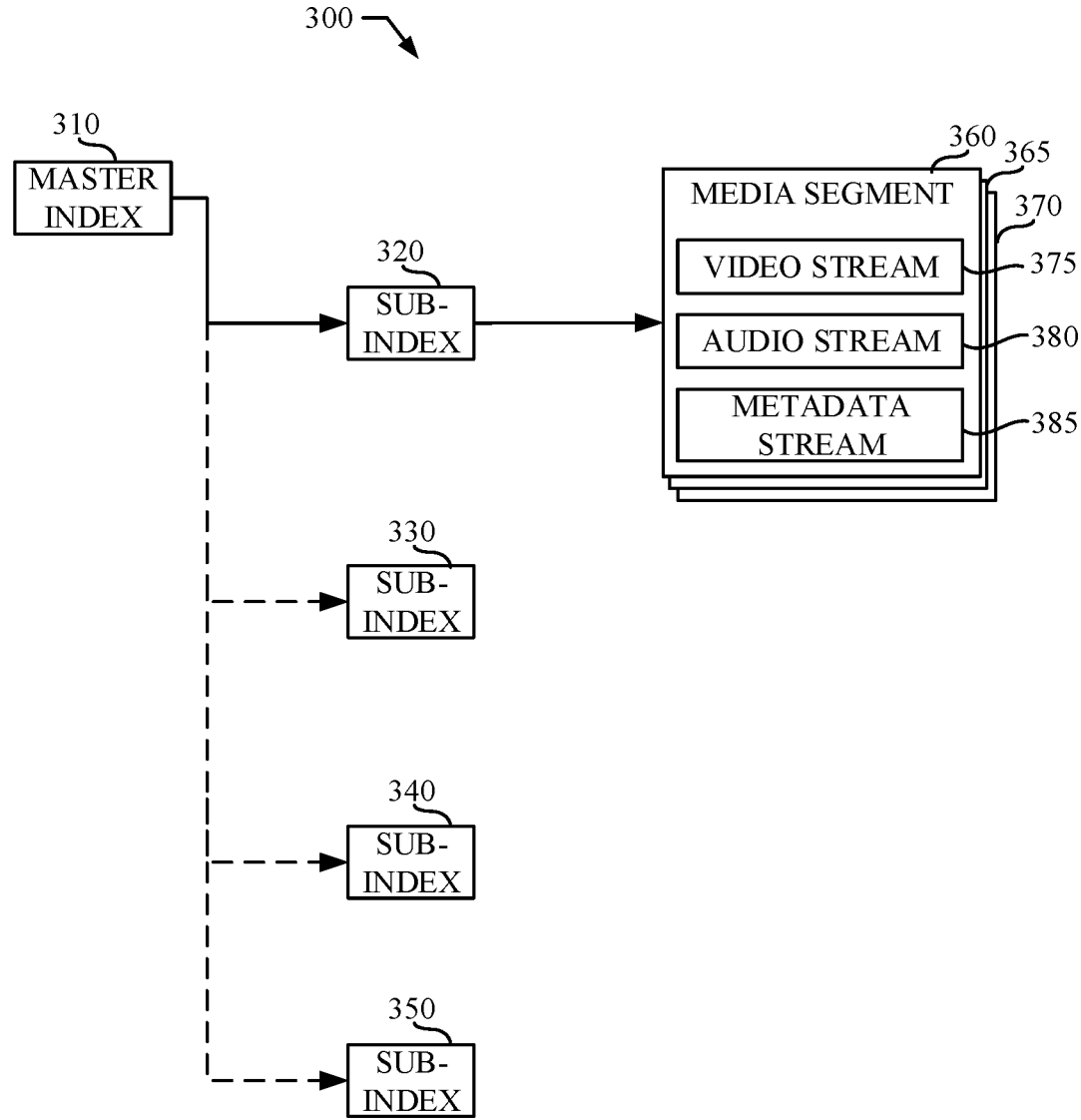
FIG. 3 is a block diagram of an example file hierarchy of an example master index file.

FIG. 3 is a block diagram of an example file hierarchy 300 for an example master index file 310 (e.g., similar to the example index file 210 of FIG. 2). In some examples, the example master index file 310 includes alternate streams identified by a tag (EXT-X-STREAM-INF) in the example master index file 310. The format for this tag is:

```
#EXT-X-STREAM-INF:<attribute-list>
          <URL>
```

In the example index file hierarchy 300, the example master index file 310 identifies alternate media streams by including a list of other, alternate index files, including, for example, example sub-index files 320, 330, 340, and 350. The example sub-index file 320 references example segment files 360, 365, 370 associated with an alternate media stream. The example sub-index files 330, 340, 350 each reference segment files associated with alternate media streams as discussed above with reference to the example sub-index file 320. Each media segment file 360, 365, 370 includes example video stream data 375, example audio stream data 380, and example metadata stream data 385. Other alternate data may be included within the example media segments 360, 365, 370. In some examples, segment files have a .ts file extension.

Additionally or alternatively, URLs of example segments 360, 365, 370 of example sub-index file 320 may redirect to other URLs. These new records (with the redirected URLs) are not traced within the example sub-index file 320. Moreover, those redirected records may not even have a .ts extension (expected for segment URLs). This situation is common with YouTube media streaming.

In some examples, redirection is possible both at the example sub-index file 320, 330, 340, 350 and at the example segment file 360, 365, 370 level. When redirection occurs, a request that was transmitted to an original URL receives a response (e.g., an HTTP redirection response) that directs the media device to re-transmit the request to a different URL (e.g., a second URL different from the original URL). In some examples, a segment file URL may actually redirect to a different URL that identifies a location where the identified media is provided. In some examples where redirection occurs, the actual segment files with the media may not have an expected extension (e.g., ".ts").

Example 5

Proxy log record:

```
GET
[scheme]://qthttp.apple.com.edgesuite.net/11piubpwiqubf06/iphone_w_vod.
m3u8 HTTP/1.1 200 248 AppleCoreMedia/1.0.0.8J2 (iPhone; U; CPU OS
4_3_3 like Mac OS X; ru_ru)- - - audio/x-mpegurl 651 27110
```

[scheme]—http
Bold—index file name, which ends in ".m3u8"
Italics—Media-Type value.

Example 6

Example of an index file with alternate stream containing locations of other index files:

```
#EXTM3U
#EXT-X-STREAM-INF:PROGRAM-
ID=1,BANDWIDTH=638000,RESOLUTION=640x360,CODECS="avc1.66.
30, mp4a.40.2"
index_2_av.m3u8?e=b471643725c47acd
#EXT-X-STREAM-INF:PROGRAM-
ID=1,BANDWIDTH=148000,RESOLUTION=400x224,CODECS="avc1.66.
30, mp4a.40.2"
index_0_av.m3u8?e=b471643725c47acd
#EXT-X-STREAM-INF:PROGRAM-
ID=1,BANDWIDTH=476000,RESOLUTION=400x224,CODECS="avc1.66.
30, mp4a.40.2"
index_1_av.m3u8?e=b471643725c47acd
#EXT-X-STREAM-INF:PROGRAM-
ID=1,BANDWIDTH=1238000,RESOLUTION=640x360,CODECS="avc1.77
.30, mp4a.40.2"
index_3_av.m3u8?e=b471643725c47acd
#EXT-X-STREAM-INF:PROGRAM-
ID=1,BANDWIDTH=38000,CODECS="mp4a.40.2"
index_0_a.m3u8?e=b471643725c47acd
```

Bold—tag indicating alternate stream with associated info including another index file A media device determines which, if any, alternate streams to use based on network bandwidth, signal, or other like factors. Once the media device has decided which one of the streams to use (if alternate streams exist), the media device will download the example sub-index file(s) 320, 330, 340, 350 for that stream which will then include its own list of example segments (e.g., example segments 360, 365, 370). The media device will then download the example segments 360, 365, 370 in order, as discussed with regard to the example diagram in FIG. 1. Example segments 360, 365, 370 are represented by separate records in the proxy logs and the URLs of those segments have a file extension of ".ts." In some examples, other rules may additionally or alternatively be used to identify the media segments. When alternate streams are used, the media device downloads the example master index file 310 and at least one of the example sub-index files 320, 330, 340, 350 at the beginning of the streaming session.

In some examples, the media device downloads other index files in the course of a media presentation. For example, when there is a bandwidth change, the media device downloads a new index file (the media device keeps and/or caches the URLs of the alternate streams from the master index file). In some examples, if the media is very large (e.g., includes many segments), multiple index files are used to organize the segments. In the case of live streaming, a media providing server periodically updates the index file and is the media device re-downloads updated index files.

In examples where the server hosting the media supports different quality streams for different network bandwidths, the server will provide a master index file with alternate streams to the media device. The master index file identifies available streams for different bandwidth ranges. As noted above, the media device will assess available bandwidth and select the appropriate streaming quality. The media device will then download the index file identifying the associated segments for the selected stream.

Media delivered over the Internet may be streamed (as discussed above) and/or may be downloaded and played later. When using a "download-and-play" approach, the media to be presented is first downloaded using a single request, in some examples, and then played. In some examples, media is downloaded using a few requests (i.e., media is downloaded in chunks). In such examples, the number of requests for downloading media is less than the number of segments into which streaming media is broken down.

In some examples, the "download-and-play" approach does not involve the use of index files. The "download-and-play" approach is used in a number of different scenarios (e.g., advertisements, user created Facebook™ media, etc.). In some examples, multiple different media formats are used across different downloaded media In a HTTP progressive download, a media player issues example HTTP request for a media, which begins to download and be stored on a media device. The example media player begins to play the media from memory on the media device after a threshold amount of media has been downloaded. The following table (Table 1) provides example media formats that can be played by media devices (e.g., iOS devices, android devices, etc.).

TABLE 1

| Media-Type | Description | File name extension |
|---|---|---|
| audio/3gpp | 3GPP media | 3gp, 3gpp |
| audio/3gpp2 | 3GPP2 media | 3g2, 3gp2 |
| audio/aiff | AIFF audio | aiff, aif, aifc, cdda |
| audio/x-aiff | | |
| audio/amr | AMR audio | amr |
| audio/mp3 | MP3 audio | mp3, swa |
| audio/mpeg3 | | |
| audio/x-mp3 | | |
| audio/x-mpeg3 | | |
| audio/mp4 | MPEG-4 media | mp4 |
| audio/mpeg | MPEG audio | mpeg, mpg, mp3, swa |
| audio/x-mpeg | | |
| audio/wav | WAVE audio | wav, bwf |
| audio/x-wav | | |
| audio/x-m4a | AAC audio | m4a |
| audio/x-m4b | AAC audio book | m4b |
| audio/x-m4p | AAC audio (protected) | m4p |
| media/3gpp | 3GPP media | 3gp, 3gpp |
| media/3gpp2 | 3GPP2 media | 3g2, 3gp2 |
| media/mp4 | MPEG-4 media | mp4. mpeg |
| media/mpeg | | |
| media/quicktime | QuickTime Movie | mov, qt, mqv |
| media/x-m4v | Media | m4v |

Accordingly, difficulties associated with monitoring streaming media have previously been addressed using on-device or application specific monitoring. These monitoring methods consume device resources and do not properly credit publishers with child sessions and presenters with parent sessions.

The example apparatus and methods disclosed herein monitor, at a central facility of an AME (such as, for example, The Nielsen Company (US), LLC), requests transmitted by media devices via a proxy server to observe and credit media exposure. The example apparatus and methods disclosed herein reduce the processing burden otherwise placed on the media devices by implementing such monitoring at a central facility. Additionally, the example apparatus and methods disclosed herein properly credit publishers with media established by the publisher and presenters with media presented by the presenter.

Example methods, apparatus, and articles of manufacture disclosed herein monitor media presentations on media devices via the proxy server. Such media devices may include, for example, Internet-enabled televisions, personal computers, Internet-enabled mobile handsets (e.g., a smartphone), media game consoles (e.g., Xbox®, PlayStation®), tablet computers (e.g., an iPad®), digital media players (e.g., a Roku® media player, a Slingbox®, etc.), etc. Disclosed example apparatus and methods aggregate media monitoring information to determine ownership and/or usage statistics of media devices, relative rankings of usage and/or ownership of media devices, media devices use (e.g., whether a device is used for browsing the Internet, streaming media from the Internet, etc.), and/or other types of media device information. In some examples, monitoring information includes, but is not limited to, media identifying information (e.g., media-identifying metadata, data elements, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

The example apparatus and methods route media traffic through the example proxy server and the example proxy server creates logs of the various media requests sent through the example proxy server. Subsequently, the example apparatus and methods analyze the proxy logs to identify a media presenter session (e.g., a parent session), to identify at least one index file indicating a live and/or on-demand streaming media session has been viewed within the media presenter session, and/or to identify at least one media file indicating a "download-and-play" media session has been presented (e.g., child sessions) within the media presenter session.

To identify a particular media session, the example apparatus and methods identify a request for the media that is routed through an example proxy server. In some examples, the example apparatus and methods identify duplicate requests to the same index file or files inside the proxy logs for the same media session. Typically, when that happens, these identical, duplicate requests (same URL, media type, etc.) are no more than 2 seconds from each other. When such duplicate requests are identified, the example apparatus and methods handle the duplicates appropriately (e.g., are removed, ignored, etc.). The example apparatus and methods set forth a threshold (e.g., one second) to determine if a duplicate request was received. However, the example apparatus and methods may set forth any other threshold to identify duplicate requests.

The example apparatus and methods implement a crediting model in which streaming media viewed from inside applications and/or websites over HTTP is credited independently of crediting associated with the applications and/or websites. Crediting streaming media separately enables analysis and/or reporting that is particularly tied to the streaming media. For example, useful information such as, for example, a presentation duration, a file size of a media, bandwidth used by various streaming media, what streaming media is being viewed more frequently, etc. can be identified.

To account for streaming media (e.g., child sessions) being presented within an application and/or website session (e.g., parent sessions), the example apparatus and methods use parallel sessions (e.g., timelines) occurring at the same time. One session corresponds to the website and/or application requesting the streaming media, and a separate session corresponds to the streaming media itself. As a result, crediting of the website and/or application is unaffected by the additional crediting associated with the streaming media.

Child sessions are associated with parent sessions. For example, a child session may include a link to the parent application session or page view session. However, in some examples, child sessions are dissociated from their respective parent sessions. For example, long user inactivity or log file rotation and cutting on the proxy side separate child media sessions from their parent and make it difficult to find a relationship in the logs. This is referred to as an "orphan" session.

In some examples, an orphan record is created when the media device transitions between a Wi-Fi™ network and a cellular network. In such examples, a duplicate record is created in the proxy log. Whichever of the two records does not match in connectivity type as the rest of the media session will be ignored as it will appear to be an orphan. When an orphan media session is identified, that orphaned media session is ignored. However, in additional or alternative examples, the orphaned media session may be processed and receive crediting despite the lack of an identified parent session. The example apparatus and methods described herein identify such "orphan" media sessions which are not associated with any parent app, or page view when analyzing the server logs.

The example proxy server stores records of requests in the example proxy log. The example apparatus and methods identify an index file (e.g., example index file 210) followed by segment files (e.g., example segment files 220, 225, 230) in the example proxy log as streaming media. The example apparatus and methods identify the beginning of HLS-based media streaming inside an application based on the presence of records in the proxy logs requesting index files. The example apparatus and methods disclosed herein calculate the duration of media presentations along with the duration of the application and/or website through which the media is being presented. To accurately credit HLS-based media, the example apparatus and methods examine the index file(s) associated with that media. In some examples, the example apparatus and methods download and parse the index files to identify the media segments that were made available to the media device. In the illustrated example, the example apparatus and methods do not download and parse index files, but analyze the proxy records at the proxy to identify media files and segments. The ability to analyze streaming media without downloading and parsing the index files avoids constant download, parsing and/or cross-examination of index files, which adds to the workload and decreases the performance of the example apparatus and methods described herein. Therefore, not downloading and parsing index files identified in the proxy log conserves resources (e.g., processor time, bandwidth, power, etc.).

Example properties of log records representing index files disclosed herein are applicable to both master index files and non-master index files. In some examples, the example apparatus and methods ignore index files that do not follow the above rules during crediting. Additionally or alternatively, the example apparatus and methods may use different rules to identify index files that utilize a format and/or protocol other than the M3U protocol (Example 1).

The above disclosed procedure(s) for identifying log records containing index files and segment files (e.g., for HLS) in a media streaming session are used, with the following exception(s) for segment files. In some examples, any record with a segment or non-HLS download whose payload size is 500 bytes or less are ignored (for media crediting purposes). For the purposes of HLS segment files considered here, the example apparatus and methods look for the .ts extension or segment specific media types. For non-HLS downloads, the .ts extension is not a requirement. While the example rules disclosed herein use specific numeric constants, different values for those numeric constants may additionally or alternatively be used. That is, the numeric constants are configurable when implementing the rules.

The example apparatus and methods parse index files to identify media sessions. As described herein, the example apparatus and methods detect EXTINF tags (Example 1) in order to identify a media segment file. The example apparatus and methods identify a master index file with alternate streams by locating a tag (EXT-X-STREAM-INF) in the master index file. The presence of the tag indicates a master index file with alternate streams. If this tag is missing, the example apparatus and methods determine the index file is a regular index file (without alternate streams). The format for this tag is:

```
#EXT-X-STREAM-INF:<attribute-list>
    <URL>
```

The example apparatus and methods extract the BAND-WIDTH attribute (within the <attribute-list>), if the attribute is defined, from the index file (Example 3). In the above example format, the value for the example BANDWIDTH attribute is a decimal-integer of bits per second. The example apparatus and methods identify the bandwidth of the media session based on the bandwidth values identified in subsequent records in the proxy log.

Example 3

Example of an index file with alternate streams of media:

---

EXTM3U
EXT-X-STREAM-INF:PROGRAM-ID=1,     *BANDWIDTH=655000,*
RESOLUTION=640x360
<u>index_3_av.m3u8?e=fd093f7626fefccc</u>
EXT-X-STREAM-INF:PROGRAM-ID=1,     *BANDWIDTH=39000,*
CODECS="mp4a.40.5"
<u>index_0_a.m3u8?e=fd093f7626fefccc</u>
EXT-X-STREAM-INF:PROGRAM-ID=1,     *BANDWIDTH=129000,*
RESOLUTION=400x224
<u>index_1_av.m3u8?e=fd093f7626fefccc</u>
EXT-X-STREAM-INF:PROGRAM-ID=1,     *BANDWIDTH=452000,*
RESOLUTION=400x224
<u>index_2_av.m3u8?e=fd093f7626fefccc</u>
EXT-X-STREAM-INF:PROGRAM-ID=1,     *BANDWIDTH=847000,*
RESOLUTION=640x360
<u>index_4_av.m3u8?e=fd093f7626fefccc</u>
EXT-X-STREAM-INF:PROGRAM-ID=1,     *BANDWIDTH=1252000,*
RESOLUTION=640x360
<u>index_5_av.m3u8?e=fd093f7626fefccc</u>

---

Bold—tag indicating beginning of index file.
Italics—bandwidth for media stream.
Underline—path for index file with media segments.

The example apparatus and methods identify index files with alternate streams in the logs that that have at least one media segment. The reported bandwidth for such a media session is the average value of the bandwidths of the streams corresponding to these index files. Additionally or alternatively, the bandwidth of the last stream (of all the alternates) that has segments in the logs may be reported as the bandwidth of the media session. Additionally or alternatively, any other identified bandwidth may be reported such as, for example, an average bandwidth, a maximum bandwidth, a minimum bandwidth, etc.

In some examples, media streaming from inside a web page is implemented using HLS. However, any other standard(s) and/or format(s) may additionally or alternatively be used. HLS media streaming, delivery, and presentation inside a web page follows the same rules and traffic patterns discussed with respect to index files and segment files.

However, if a master index file with alternate streams is used, the URL request for that file may be duplicated in two different proxy records (e.g., the index is requested by the media device twice). In some examples, the two records are consecutive to each other in the logs with similar timestamps (e.g., the exact same timestamp, timestamps indicating a difference of a few seconds) (Example 4). One of the records will have a Safari user agent and the other record will have an AppleCoreMedia user agent. The example apparatus and methods filter the record using the Safari user agent when this duplication occurs. As a result of this filtering, only un-duplicated records with AppleCoreMedia user agents remain and will be used for crediting the media sessions.

Example 4

---

GET [scheme]://once.unicornmedia.com/now/adaptive/m3u8/f21d8e33-8e2f-460c-965d-e4939d60d203/bc2ddfaa-8db2-4732-ba6a-e13ac65ab0fe/9473a4b3-28a3-4132-8667-5a4ebb637215/<u>content.m3u8</u> HTTP/1.1     200    2409     Mozilla/5.0 (iPhone; CPU iPhone OS 7_0_2 like Mac OS X) AppleWebKit/537.51.1 (KHTML, like Gecko) Version/7.0 Mobile/11A501 Safari/9537.53    -    -
     <u>[scheme]://m.weather.com/medias/12345</u>     application/x-mpegURL
     2915     468346    -
GET [scheme]://once.unicornmedia.com/now/adaptive/m3u8/f21d8e33-8e2f-460c-965d-e4939d60d203/bc2ddfaa-8db2-4732-ba6a-e13ac65ab0fe/9473a4b3-28a3-4132-8667-5a4ebb637215/<u>content.m3u8</u> HTTP/1.1     200    3207
     AppleCoreMedia/1.0.0.11A501 (iPhone; U; CPU OS 7_0_2 like Mac OS X; en_us)    -     -    - application/x-mpegURL    3714     87946    -
GET [scheme]://api20-phx.unicornmedia.com/now/od/m3u8/f21d8e33-8e2f-460c-965d-e4939d60d203/bc2ddfaa-8db2-4732-ba6a-e13ac65ab0fe/681f29c5-81eb-4229-9801-ebe21531a57c/9473a4b3-28a3-4132-8667-5a4ebb637215/876/0/99/<u>content.m3u8</u> HTTP/1.1     200    5600
     AppleCoreMedia/1.0.0.11A501 (iPhone; U; CPU OS 7_0_2 like Mac OS X; en_us)    -     -    - application/x-mpegURL    5975     94167    -
GET [scheme]://unicorn.weather.com/now/od/tschunk/f21d8e33-8e2f-460c-965d-e4939d60d203/00000000-0000-0000-0000-000000000000/681f29c5-81eb-4229-9801-ebe21531a57c/9473a4b3-28a3-4132-8667-5a4ebb637215/876/0/5/1921432021/*content.ts* HTTP/1.1     200    308320
     AppleCoreMedia/1.0.0.11A501 (iPhone; U; CPU OS 7_0_2 like Mac OS X; en_us)    -     -    - media/MP2T 308737     2208608      -
GET [scheme]://unicorn.weather.com/now/od/tschunk/f21d8e33-8e2f-460c-965d-e4939d60d203/00000000-0000-0000-0000-000000000000/681f29c5-81eb-4229-9801-ebe21531a57c/9473a4b3-28a3-4132-8667-5a4ebb637215/876/5/10/1921432021/*content.ts* HTTP/1.1     200    287452
     AppleCoreMedia/1.0.0.11A501 (iPhone; U; CPU OS 7_0_2 like Mac OS X; en_us)    -     -    - media/MP2T 287869     2953110      -
GET [scheme]://unicorn.weather.com/now/od/tschunk/f21d8e33-8e2f-460c-965d-e4939d60d203/00000000-0000-0000-0000-000000000000/1500a936-6f3b-4a5d-bdee-c16d51b73896/9473a4b3-28a3-4132-8667-5a4ebb637215/876/5/10/-149054220/*content.ts* HTTP/1.1     200    167320
     AppleCoreMedia/1.0.0.11A501 (iPhone; U; CPU OS 7_0_2 like Mac OS X; en_us)    -     -    - media/MP2T 167735     1432593      -
GET [scheme]://unicorn.weather.com/now/od/tschunk/f21d8e33-8e2f-460c-965d-e4939d60d203/00000000-0000-0000-0000-000000000000/1500a936-6f3b-4a5d-bdee-c16d51b73896/9473a4b3-28a3-4132-8667-5a4ebb637215/876/10/15/-

---

-continued

```
149054220/content.ts HTTP/1.1              200      173900
          AppleCoreMedia/1.0.0.11A501 (iPhone; U; CPU OS 7_0_2 like Mac OS X;
en_us)           -            -      - media/MP2T 174315          1584003          -
GET [scheme]://unicorn.weather.com/now/od/tschunk/f21d8e33-8e2f-460c-965d-
e4939d60d203/00000000-0000-0000-0000-000000000000/1500a936-6f3b-4a5d-
bdee-c16d51b73896/9473a4b3-28a3-4132-8667-5a4ebb637215/876/15/20/-
149054220/content.ts HTTP/1.1              200      172960
          AppleCoreMedia/1.0.0.11A501 (iPhone; U; CPU OS 7_0_2 like Mac OS X;
en_us)           -            -      - media/MP2T 173376          1680912          -
GET [scheme]://unicorn.weather.com/now/od/tschunk/f21d8e33-8e2f-460c-965d-
e4939d60d203/00000000-0000-0000-0000-000000000000/7d9ebac9-8315-4aba-
b422-832ebf12f21d/9473a4b3-28a3-4132-8667-5a4ebb637215/876/15/20/-
933547533/content.ts HTTP/1.1              200      237820
          AppleCoreMedia/1.0.0.11A501 (iPhone; U; CPU OS 7_0_2 like Mac OS X;
en_us)           -            -      - media/MP2T 238235          1268553          -
GET [scheme]://unicorn.weather.com/now/od/tschunk/f21d8e33-8e2f-460c-965d-
e4939d60d203/00000000-0000-0000-0000-000000000000/7d9ebac9-8315-4aba-
b422-832ebf12f21d/9473a4b3-28a3-4132-8667-5a4ebb637215/876/20/25/-
933547533/content.ts HTTP/1.1              200      228796
          AppleCoreMedia/1.0.0.11A501 (iPhone; U; CPU OS 7_0_2 like Mac OS X;
en_us)           -            -      - media/MP2T 229212          1648693          -
GET [scheme]://unicorn.weather.com/now/od/tschunk/f21d8e33-8e2f-460c-965d-
e4939d60d203/00000000-0000-0000-0000-000000000000/7d9ebac9-8315-4aba-
b422-832ebf12f21d/9473a4b3-28a3-4132-8667-5a4ebb637215/876/25/30/-
933547533/content.ts HTTP/1.1              200      239888
          AppleCoreMedia/1.0.0.11A501 (iPhone; U; CPU OS 7_0_2 like Mac OS X;
en_us)           -            -      - media/MP2T 240303          1588406          -
GET [scheme]://unicorn.weather.com/now/od/tschunk/f21d8e33-8e2f-460c-965d-
e4939d60d203/00000000-0000-0000-0000-000000000000/7d9ebac9-8315-4aba-
b422-832ebf12f21d/9473a4b3-28a3-4132-8667-5a4ebb637215/876/30/35/-
933547533/content.ts HTTP/1.1              200      227668
          AppleCoreMedia/1.0.0.11A501 (iPhone; U; CPU OS 7_0_2 like Mac OS X;
en_us)           -            -      - media/MP2T 228083          2161744          -
```

[scheme]—http
Wavy line—index file name, ending in ".m3u8"
Thick Underline—Alternate index file URL template, Safari User-Agent and redirect URL
Double Underline—duplicate request with AppleCoreMedia User-Agent
Bold—Content-Type value
Italic Highlights—segment file name, ending in ".ts"

In some examples, the browser (e.g., Safari) makes HTTP GET requests for each HTML <media> tag that is present inside the HTML code of a main page. However, these requests are independent media records (e.g., the media type of such requests will be "media/*") in the logs associated either with the Safari or the AppleCoreMedia user agents. In examples where the Safari user agent is used, those records are removed prior to crediting. In examples where the AppleCoreMedia user agent is used, they will be ignored for streaming media crediting purposes, because these records do not belong to any index-file-based media streaming structure and are associated with Safari. In some examples, this applies to third party browsers as well. In such examples, the Safari user agent is replaced by the UIWebView user agent.

While the disclosed crediting rules are described in connection with the native Safari browser of iOS devices, media may be presented using other browsers (e.g., Chrome, Dolphin, etc.) as well. In some examples, usage of a browser application other than the default browser application for a mobile operating system (e.g., Safari in connection with iOS, Chrome in connection with Google Android), may be treated as media presented in the context of an application, as described herein.

The example apparatus and methods identify a live streaming session when a large number of index files are located in the proxy log. There are too many index files with a live streaming session to download and parse efficiently because the index files are updated or a new index file is created every few seconds. In some examples, the contents of the index file are dynamically changing (not static as in on demand sessions). The crediting process is based on processing the HTTP records with the index and segment files as found in the proxy logs generated during the live media session.

In some examples, live streaming media sessions are credited following the general rules described herein parsing the log records for index and segment files. Viewing a live event on a media device can be done in one long session or in multiple sessions depending on whether a user pauses or stops media play and/or for how long the media is paused and/or stopped. In examples disclosed herein, regardless of whether the live streamed media is identified as one or multiple sessions, there will be a start point and an end point for each session, so the example apparatus and methods described herein calculate and report the duration and/or size (in bytes) for each session that is part of the live broadcast.

The example apparatus and methods identify "download-and-play" media differently from streaming media, because "download-and-play" media is not organized inside an index file. Instead, the example apparatus and methods identify the "download-and-play" media based on independent media file downloads. As disclosed herein, rules for crediting media sessions that follow protocols other than HLS may additionally or alternatively be used. Other streaming formats may additionally and/or alternatively be analyzed to identify media presentations, such as, for example, media segments streaming over HTTP (e.g., HTTP progressive download).

Once the example apparatus and methods identify a live, on-demand, and/or "download-and-play" media session, the example apparatus and methods determine a duration of the media session. For streaming sessions, the example apparatus and methods determine a full duration time by summing all the individual segment files within an index file. The example apparatus and methods incrementally sum a presented duration by tallying individual segment files until a pause or application termination. The example apparatus and methods estimate the presented duration based on the start time of the media session, the time the application is paused or closed, and the full duration time. Alternatively, the example apparatus and methods scale a size of the media session based on a ratio of a selected duration of the segment to a full duration identified in the index file. Therefore, the example apparatus and methods estimate how much of a media a user watched based on the duration the media was actually presented (e.g., a fraction of the full duration).

For downloaded sessions, the example apparatus and methods calculate an estimated presented duration/size based on contextual analysis of the log records. In some examples, the estimated presented duration is the difference between an end time with a start time plus 15 seconds (provided this summation is not greater than an absolute end time of an application or web page, or overlaps with an additional media session within the same application or web page) minus any pause durations encountered and recorded. In some examples, the estimated presented duration is the difference between the end time and the start time.

The example apparatus and methods determine a pause duration by comparing the timestamps of a first media segment and a second media segment. In some examples, if the timestamps of the first media segment and the second media segment more than a first threshold apart and less than a second threshold apart, the example apparatus and methods add the difference between the timestamps of the first media segment and the second media segment minus fifteen seconds to the pause duration. The example apparatus and methods continue this process for as many media segments that remain between the start time and the end time.

Once the example apparatus and methods disclosed herein identify a session and identify a duration and other properties of the session, the example methods and apparatus store the identified session and data associated therewith in a database. The example apparatus and methods associate one session record for each credited media session. The following table (Table 2) represents example data written to the example database:

TABLE 2

| Column Name | Column Description | Column Data Type |
| --- | --- | --- |
| MediaSessionID | Unique ID for session. Incremental. | Link media to app or page |
| MobileID | The id of the panelist's device | Integer |
| StartEventTime | This is the UTC Timestamp denoting when the media started | DateTime |
| ParentType | Whether the parent is a page view or an application | Varchar |
| UserAgentID | The ID of the parent application's user agent which contains the media | Varchar |
| URL ID | The URL identifying a page that contains the media. This may be the URL of the parent page view or parent | Varchar |

TABLE 2-continued

| Column Name | Column Description | Column Data Type |
| --- | --- | --- |
| | application which hosts the media | |
| REFERRER ID | The Referrer URL, derived from the Referrer URL of the media record in the proxy file, when available | Varchar |
| INDEX ID | The INDEX ID File URL of an index file used in association with the media. In some examples, such as a "download-and-play" scenario, the INDEX ID may not be available. | Varchar |
| SEGMENT ID | The segment URL of a segment file used in association with the media. In some examples, such as a non-HLS scenario, the SEGMENT ID is the URL of the first record in the session. | Varchar |
| DurationInSec | The number of seconds which the media was presented (session duration) | Integer |
| MediaSize | The size, in bytes, of the actual media played during the media session (must be greater than 0) | Integer |
| MIMEType | The format of the media as provided by the media type | Varchar |
| Bandwidth | If available and can be calculated, it is the bandwidth of the network delivering the media to the iOS client, in Mbps | Decimal |
| MediaDeliveryType | Describes media type: "live-stream", "on-demand", "HLS", "non-HLS", "download-play", or "HTTP progressive download" | Varchar |
| BrowsingType | 'C' for cellular connectivity, 'W' for Wi-Fi ™ connectivity. | Char |

The example apparatus and methods store media sessions if they satisfy a minimum duration such as, for example, three to fifteen seconds. The example minimum duration requirement ensures that unintended or accidental launches of a media presentation from a user are not credited. In some examples, such accidental or unintended launches of media presentations is common for media devices.

After the example apparatus and methods determine the duration of an identified media session, the example apparatus and methods disclosed herein associate the media of the identified media session with the publisher of the media. Example apparatus and methods disclosed herein distinguish a publisher of the media of a media session (e.g., creator, author, copyright holder, etc.), from a media presenter (e.g., an entity in control of a website, a media player, or a media application) for each media presentation type (e.g., live streamed, streamed on-demand, and/or "download-and-play").

The example methods and apparatus identify the publisher of the identified media session by identifying a user agent identifier, such as, for example a UserAgentID, and comparing the example UserAgentID to a known UserAgentID associated with known publishers of media. Additionally or alternatively, the example methods and apparatus identify the publisher of the identified media session by comparing at least a portion of a media session indicator (e.g., a URL associated with the media session, such as, for example, a URL ID, a REFERRER ID, an INDEX ID, or a SEGMENT ID) to patterns associated with known publisher. Additionally or alternatively, the example apparatus and methods associate the media of the identified media session with the publisher of the media by comparing domains referenced by the example media session indication (e.g., the example URL ID, the example REFERRER ID, the example INDEX ID, or the example SEGMENT ID) to a list of known hosting domains and verifying that at least two of the example URL ID, the example REFERRER ID, the example INDEX ID, or the example SEGMENT ID reference the same domain.

The example apparatus and methods provide advantages over on-device monitoring systems, because on-device monitoring systems often are functionally limited, require permissions, drain resources, and/or credit only the devices, players, and/or applications themselves, amongst other disadvantages. In examples disclosed herein, streaming media sessions take place inside the context of an application or a web page. The example apparatus and methods described herein identify a session associated with the application and/or the web page (page view) and calculate a duration for that session. The example apparatus and methods disclosed herein identify individual media sessions, which start and end within a parent session (i.e., an application or a page view). For example, a web page (e.g., parent session) presents an ad/iAd or other media (e.g., child session). In some examples, the example apparatus and methods disclosed herein determine data element properties such as start time, stop time, duration, pause duration, size, bandwidth, etc. Even further, the example apparatus and methods correctly credit a publisher of a media session where previously media presenters were incorrectly credited as the publisher.

Figure 4:
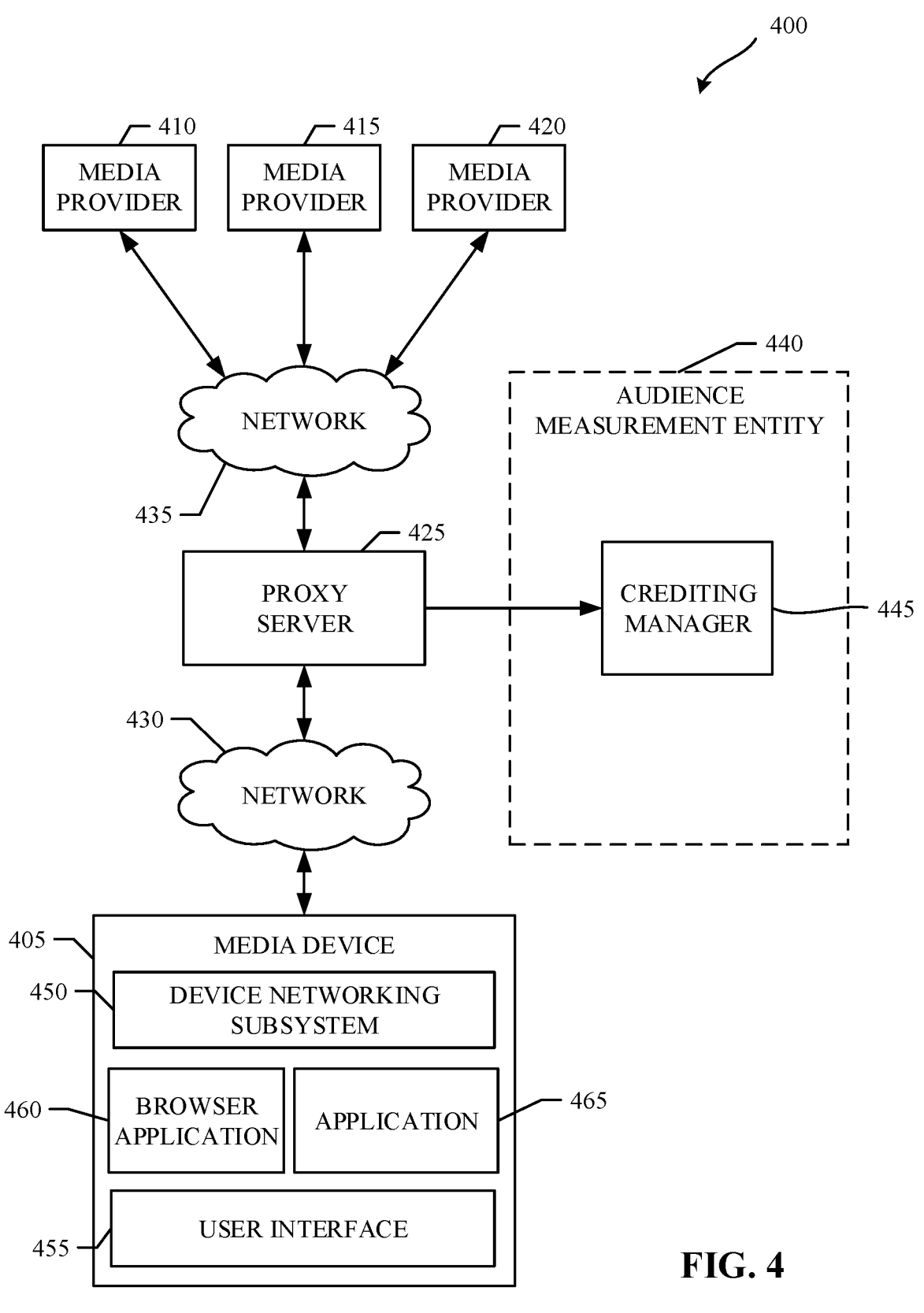
FIG. 4 is a block diagram of an example environment that includes an example crediting manager to credit media presented at an example media device in accordance with the teachings of this disclosure.

FIG. 4 is a block diagram of an example environment 400 in which an example crediting manager 445 of an example AME 440 credits media presented at an example media device 405 in accordance with the teachings of this disclosure. The example environment 400 includes the example media device 405, example media providers 410, 415, 420, an example proxy server 425, an example first network 430, an example second network 435, the example AME 440, and the example crediting manager 445.

In the illustrated example, the example media device 405 is a mobile device (e.g., a cell phone, a smart phone, a tablet such as an iPad™, etc.). The example media device 405 request(s) and receives media to present to a user. In the illustrated example, traffic of the media device 405 is routed through the example proxy server 425. The example media device 405 includes an example device networking subsystem 450, an example user interface 455, an example browser application 460, and an example application 465. The example device networking subsystem 450 is to send and receive communications, such as, for example, media request(s) and response(s). Examples of the device networking subsystem 450 include a network controller, Ethernet card, DSL modem, etc. The example user interface 455 provides input and output capabilities to a user of the example media device 405. For example, the example user interface 455 may include buttons, a touch screen, finger-print scanner, microphone, speakers, display, etc. The example browser application 460 allows a user to connect to and browse a network of devices. Examples of the browser applications 460 include, without limitation, Chrome™, Safari™, FireFox™, Internet Explorer™, Edge™, and the like. The example application 465 is a program disposed on and executed by the example media device 405. Examples of the application 465 include Netflix™, YouTube™, WatchESPN™, etc.

In the illustrated example, the example media providers 410, 415, 420 are sources of media. The example media providers 410, 415, 420 provide media to a subscriber of a media service (e.g., Netflix™, Hulu™, Comcast™ etc.). In some examples, the example media providers 410, 415, 420 provide media to individuals without a subscription (e.g., over-the-air television). While three media providers 410, 415, 420 are shown in FIG. 4, any number of media providers may source media as described herein.

The example proxy server 425 intercepts or otherwise routes traffic to destinations identified in the traffic and generates logs of such traffic. The example proxy server 425 receives request(s) for media from the example media device 405. The example proxy server 425 forwards the request(s) to one or more of the example media providers 410, 415, 420 (e.g., to one of the of the example media providers 410, 415, 420 identified in the request(s)). The example proxy server 425 receives response(s) including the requested media from the one or more of the example media providers 410, 415, 420. The example proxy server 425 of the illustrated example forwards the response(s), and thus, the media, to the example media device 405. The example proxy server 425 records logs of the request(s) and response(s) as a proxy log or record. Log files from the example proxy server 425 store information regarding user activity at the example media device 405, such as visits to web sites, launching and interacting with applications, and streaming media request(s) transmitted to the example media providers 410, 415, 420. In some examples, the logs of example proxy server 425 are accessible to hosts of the example proxy server 425 and/or other third parties (e.g., the example AME 440 and/or a third party that hosts the example proxy server 425 and provides the example AME 440 access to the proxy logs. In the illustrated example, the example proxy server 425 is implemented by one or more logic circuits, such as processors executing computer readable instructions. Additionally or alternatively, the example proxy server 425 could be implemented by an application specific integrated circuit ("ASIC"), a programmable logic device ("PLD"), a field programmable logic device ("FPLD"), an analog circuit, and/or digital circuitry. While the illustrated example includes one example proxy server 425, any number of proxy servers may be implemented to route and log network traffic between media devices and media providers.

The example first network 430 communicatively couples the example media device 405 to the example proxy server 425. The example second network 435 communicatively couples the example proxy server 425 to the example media providers 410, 415, 420. In the illustrated example, the example first network 430 and the example second network 435 are wireless networks, such as, for example, the Internet. Alternatively, the example first network 430 and the example second network 435 may be a wired network, a Wide Area Network (WAN), or a Local Area Network (LAN). In some examples, the example second network 435 is the same as first network 430 (e.g., the Internet). Alternatively, one of the networks 430, 435 may be different than the other (e.g., the example first network 430 may be LAN and the example second network 435 may be the Internet).

The example AME 440 of the illustrated example is a ratings entity (e.g., the Nielsen Company (US), LLC) that monitors media presentations to users, creates impressions from such media monitoring, and credits media presentations. The example AME 440 also determines demographic reach for advertising and media programming based on registered panel members. The example crediting manager 445 is a server hosted by the AME 440 to process the traffic logs of the example proxy server 425 to analyze and credit media sessions. The example crediting manager 445 identifies usage sessions and durations associated with those usage sessions (e.g., how long an application was used, how long a website was viewed, etc.). The example crediting manager 445 identifies a media session (e.g., website, media player, media application, etc.) and associates the media of the identified session with the publisher of the media to properly credit the publisher with a detected media presentation of the media. The example crediting manager 445 stores the identified usage sessions, durations, identity of the publisher of the media, and their associations in one or more databases. The example AME 440 uses the one or more databases to create audience measurements for different media. Audience measurement may include the number of viewers for a particular media, the demographics of said viewers, the percentage that a media was presented, the identity of the presenter of the media, the identity of the publisher of the media, etc. The example AME 440 can create a rating based on this information to categorize and rank different media.

In operation, the example media device 405 request(s) and receives media from one or more of the example media providers 410, 415, 420 through example the proxy server 425. As described herein, the example media device 405 is configured so that network traffic (e.g., HTTP traffic) is routed to the example proxy server 425 via the example first network 430. The example proxy server 425 communicates with the example media providers 410, 415, 420 via the example second network 435. In the illustrated example, the example media device 405 request(s) media from the example proxy server 425, which subsequently routes the request(s) to the example media providers 410, 415, 420. In response, the example proxy server 425 receives response(s) to the request(s) from the example media providers 410, 415, 420. The example proxy server 425 forwards the requested media to the media device for presentation of the media. In the illustrated example, the example proxy server 425 keeps records or logs of such transactions (e.g., requests and responses).

According to the illustrated example, when streaming media is provided to the example media device 405, many messages are transmitted between the example media device 405 and the example media providers 410, 415, 420 (e.g., messages to request portions of the media, messages transmitting the requested portions, etc.). The example messages (e.g., hypertext transfer protocol (HTTP) messages) are routed through the example proxy server 425. Accordingly, instead of requesting media directly from the example media providers 410, 415, 420, to retrieve media for presentation, the example media device 405 request(s) that the example proxy server 425 obtain the media from media providers 410, 415, 420 on behalf of the example media device 405 and relay the media to the example media device 405 (e.g., by transmitting an HTTP request to the example proxy server 425, wherein the request identifies the one of the example media providers 410, 415, 420 from which the media is requested.

A user of the example media device 405 accesses the example browser application 460 (e.g., uses the example browser application 460 to access a media player on a webpage through the example first network 430 and/or the example second network 435 (e.g., www.youtube.com)) and/or the example application 465 (e.g., a media player installed on the example media device 405 (e.g., iTunes)) using the example user interface 455. When the user accesses the example browser application 460 and/or the example application 465, the example device networking subsystem 450 of the example media device 405 requests media from one of the example media providers 410, 415, 420, as described further in conjunction with the description of FIG. 5. The example proxy server 425 creates log file(s) detailing the messages sent between the example media device 405 and the example media providers 410, 415, 420.

The example crediting manager 445 of the example AME 440 receives the log file(s) created by the example proxy server 425. The example crediting manager 445 processes the proxy logs to identify media sessions. Once the example crediting manager 445 of the illustrated example identifies a media session, the example crediting manager 445 determines data elements (e.g., start time, stop time, duration, pause duration, size, bandwidth, URL, demographic impression, etc.) of the media session. The example crediting manager 445 associates the identified session and data elements with its respective publisher to credit the publisher with the identified session, duration of the session, demographics of the user the session was presented to, etc.

To associate the media of the media session with a publisher of the media of the media session, the example crediting manager 445 analyzes user agent patterns associated with publishers to identify whether a user agent of the media session matches one of the user agent patterns. When the example crediting manager 445 determines that the user agent does not identify a publisher, the example crediting manager 445 classifies a media session based on whether domains referenced by data elements of the media session (e.g., URL ID, REFERRER ID, INDEX ID, SEGMENT ID, etc.) match patterns associated with a publisher and/or are within a list of known hosting domains associated with publishers. The example crediting manager 445 stores the associations in one or more databases for audience measurement purposes. Audience measurement may include generation of a rating indicative of the number of viewers for a particular media, the demographics of said viewers, the percentage that a media was presented, the identity of the presenter of the media, the identity of the publisher of the media, etc.

Figure 5:
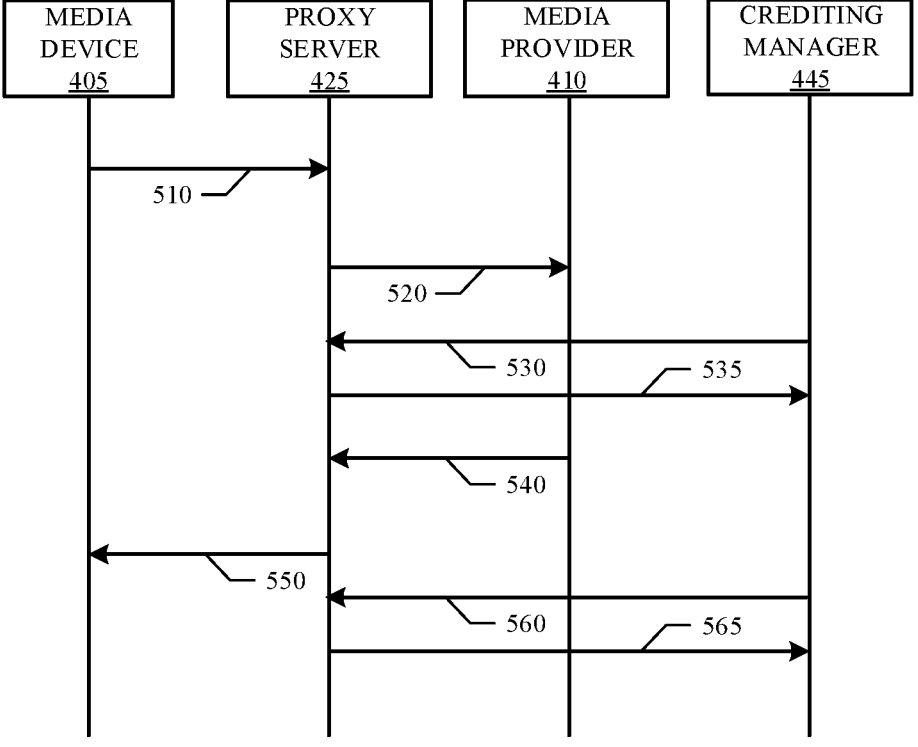
FIG. 5 is a message diagram illustrating traffic routed between an example media device and the example media providers of FIG. 4 that is captured by the example proxy server of FIG. 4 and is analyzed by the example crediting manager of FIG. 4.

FIG. 5 is a message diagram illustrating example traffic routed between the example media device 405, the example proxy server 425, the example media provider 410 and the example crediting manager 445 of FIG. 4. According to the illustrated example, the example media device 405 (e.g., the example device networking subsystem 450 (FIG. 4)) sends a first request 510 to the example media provider 410 for media selected within the browser application 460 or the application 465 (e.g., media selected by a user). However, as illustrated in FIG. 5, the example first request 510 is intercepted or otherwise routed to the example proxy server 425. For example, the example media device 405 may request media from the example media provider 410 and the example proxy server 425 may intercept the request. Additionally or alternatively, the example media device 405 may be configured to send some or all requests to the example proxy server 425.

Once the example proxy server 425 receives the example first request 510 from the example media device 405, the example proxy server 425 collects information about the example first request 510 and sends an example second request 520 (e.g., translation of the first request 510, new request, etc.) to the example media provider 410 to obtain the media requested by the example first request 510. For example, the second request may be a translated copy of the first request 510. In the illustrated example, the example crediting manager 445 identifies the first request 510 and/or the second request 520 by sending an example log request 530 to access an example log without downloading the example log from the example proxy server 425. Additionally or alternatively, the example proxy server 425 may send an example log push 535 (e.g., periodically, in response to requests, etc.) to the example crediting manager 445, thereby providing the example crediting manager 445 the example log, which includes the information collected from the first request 510 and/or the second request 520.

The example media provider 410 receives the example second request 520 and processes the same. For example, the example media provider 410 identifies the media requested in the example second request 520 and locates the media. Thereafter, the example media provider 410 sends an example first response 540 to the example proxy server 425 (e.g., the example first response 540 is intercepted or otherwise routed through the example proxy server 425) based on the second request 520. The example first response 540 contains the media requested by the example first request 510 and/or the second request 520.

The example proxy server 425 processes the example first response 540 (e.g., translates the source of the response and forwards the response to the media device, logs the response and generates a new response, etc.). Subsequently, the example proxy server 425 send to the example media device 405 an example second response 550 (e.g., translation of the first response 540, new request, etc.) containing the media requested by the example first request 510. In the illustrated example, the example crediting manager 445 identifies the first response 540 and/or the second response 550 by sending an example log request 560 to access an example log without downloading the example log from the example proxy server 425. Additionally or alternatively, the example proxy server 425 may send an example log push 565 (e.g., periodically, in response to requests, etc.) to the example crediting manager 445, thereby providing the example crediting manager the example log, which identifies the first response 540 and/or the second response 550.

The example device networking subsystem 450 of the example media device 405 receives the second response 550 containing the media requested by the example first request 510. The example device networking subsystem 450 relays the media to the example browser application 460 or the example application 465 that caused the first request 510 to be sent. In some examples, the example media device 405 is unaware of the routing of the first request 510 and/or the second request 520 and/or the first response 540 and/or the second response 550 through the example proxy server 425 (e.g., the example proxy server 425 intercepts the example first request 510 of the example media device 405). In the illustrated example, the example media device 405 is configured to send all requests 510 to the example proxy server 425 (e.g., the example proxy server 425 is an intermediary). Thus, in the illustrated example, the example logs (e.g., accessed by the example log requests 530, 560 and/or sent by the example log pushes 535, 565) of the first request 510 and/or the second request 520, the first response 540 and/or the second response 550, and the media files contained therein that are trafficked through the example proxy server 425 are accessed by or sent to the example crediting manager 445.

In examples disclosed herein, the device networking subsystem 450 of the example media device 405 requests media through messages (e.g., hypertext transfer protocol (HTTP) messages). For streaming media, the example crediting manager 445 identifies that the example media device 405 requested and/or received an index file, based on a URL, which identifies a stream associated with the requested media. In some examples, the index file is referred to as a manifest file. In the illustrated example, the crediting manager 445 identifies streaming activity when the example logs (e.g., accessed by the example log requests 530, 560 and/or sent by the example log pushes 535, 565) indicate the example media device requested an index file. The index file (which is a text file in some examples) specifies the location of the available media files, decryption keys, and any alternate streams available. The example crediting manager 445 identifies alternate streams that the example media device 405 selected depending on variations in available bandwidth when the example crediting manager 445 examines the proxy logs. For a selected stream, the example crediting manager 445 can identify which media files the example media device 405 requested.

Figure 6:
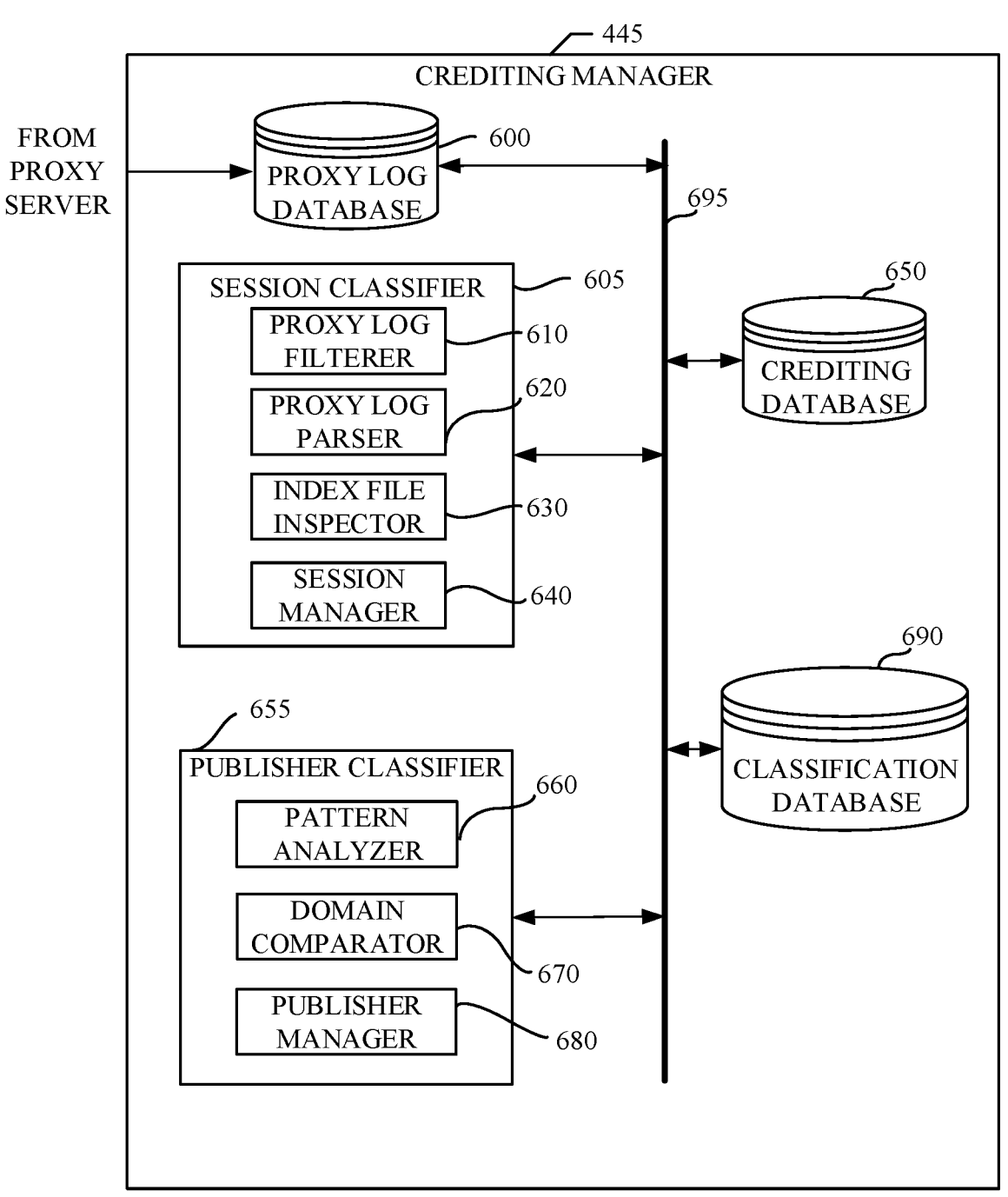
FIG. 6 is a block diagram of an example implementation of the crediting manager of FIG. 4.

FIG. 6 is a block diagram of an example implementation of the crediting manager 445 of FIG. 4. The example crediting manager 445 of FIGS. 4 and/or 6 includes an example proxy log database 600, an example session classifier 605, an example proxy log filter 610, an example proxy log parser 620, an example index file inspector 630, an example session manager 640, an example crediting database 650, an example publisher classifier 655, an example pattern analyzer 660, an example domain comparator 670, an example publisher manager 680, an example classification database 690, and an example bus 695.

The example proxy log database 600 is a storage device (e.g., hard drives, solid state drives, floppy disks, compact disks, Blu-ray disks, RAID systems, and digital versatile disks (DVD), etc.) that stores identified media session records, including, for example, index files associated with media. According to the illustrated example, the example proxy log database 600 is part of the example crediting manager 445. Alternatively, the example proxy log database 600 may be hosted and/or controlled by a third-party (e.g., a third party that cooperates with the example proxy server 425 to provide access to the example logs (e.g., accessed by the example log requests 530, 560 and/or sent by the example log pushes 535, 565) to the example crediting manager 445). In some examples, index files are only available for a limited amount of time. Accordingly, in such examples, the example proxy log database 600 receives the index files from the example proxy server 425 (FIG. 4) as soon as proxy server logs (e.g., the example logs accessed by the example log requests 530, 560 and/or sent by the example log pushes 535, 565 of FIG. 5) are created. In some examples, the example proxy log database 600 downloads the index files. In some examples, the example proxy log database 600 downloads media session records without index files.

The example proxy log filter 610, the example proxy log parser 620, the example index file inspector 630, and the example session manager 640 of the example session classifier 605 identify media sessions, distinguish child and parent sessions, and identify data elements of the media session.

The example proxy log filter 610 locates media sessions in proxy logs (e.g., the example logs accessed by the example log requests 530, 560 and/or sent by the example log pushes 535, 565 of FIG. 5). In the illustrated example, the example proxy log filter 610 determines a streaming media session exists by identifying an index file followed by segment files, as described above. In the illustrated example, the example proxy log filter 610 determines a "download-and-play" media session exists by identifying a media file download (i.e., one or more downloadable chunks). Table 3 shows example proxy records to be filtered by the example proxy log filter 610.

example index file inspector 630 determines whether there are various differing URLs referenced in the index file. In the illustrated example, the example index file inspector 630 identifies alternate streams associated with different bandwidths. The example index file inspector 630 stores data associated with the alternate streams (e.g., URLS, bandwidths, etc.) in the example crediting database 650. The example index file inspector 630 extracts portions of the URLs (e.g., a domain) associated with the index files The example session manager 640 determines data elements of a media session, including, for example, the beginning and duration of a streaming media presentation at the example media device 405. In examples in which the media is streamed, the example session manager 640 calculates the beginning and duration of a media stream by

TABLE 3

| URL | REFERRER URL | USER AGENT | RESPONSE SIZE | RESPONSE CONTENT TYPE | TIMESTAMP |
|---|---|---|---|---|---|
| http://mediaprovider.com/now/ adaptive/m3u8/.../content.m3u8 | http://m.weather.com/videos/12345 | Mozilla/5.0 (iPhone; CPU iPhone OS 7_0_2) AppleWebKit/ 537.51.1 | 2409 | application/x- mpegURL | |
| http://mediaprovider.com/now/od/ m3u8/.../content.m3u8 | — | AppleCoreMedia/ 1.0.0.11A501 | 5600 | application/x- mpegURL | |
| http://mediaprovider.com/now/od/ tschunk/.../content1.ts | — | AppleCoreMedia/ 1.0.0.11A501 | 308320 | video/MP2T | |
| http://mediaprovider.com/now/od/ tschunk/.../content2.ts | — | AppleCoreMedia/ 1.0.0.11A501 | 287452 | video/MP2T | |
| http://mediaprovider.com/now/od/ tschunk/.../content3.ts | — | AppleCoreMedia/ 1.0.0.11A501 | 167320 | video/MP2T | |

The proxy filter 610 identifies media sessions by examining proxy records, such as the example proxy records shown in Table 3. For example, the example proxy log filter 610 determines the first two rows are index files, at least based on the .m3u8 file extension within the URL. Additionally, the example proxy log filter 610 determines the last three rows are segment files, at least based on the .ts file extension. Even further, the example proxy log filter 610 determines the last three rows are associated with the second row based on at least one of the arrangement of the segment files (e.g., following the second index file), the same user agent identifier (e.g., AppleCoreMedia), similarities in the URL (e.g., "mediaprovider.com/now/od"). The example proxy log filter 610 can use other data from the proxy records to identify a media session, as further discussed herein.

The example proxy log parser 620 identifies and distinguishes child sessions from parent sessions (i.e., a media session within a browser application or media device application) in proxy logs (e.g., example logs accessed by the example log requests 530, 560 and/or sent by the example log pushes 535, 565 of FIG. 5). The example proxy log parser 620 first identifies applications and/or page views, which are top-level structures (e.g., parent sessions). The example proxy log parser 620 then identifies whether the parent session contains further activity (e.g., child sessions) inside the patent session (i.e., between the start time and end time of an application and/or page view, there are additional start and end times for additional media). In the illustrated example, the example proxy log parser 620 identifies a number of child sessions within a parent session (e.g., advertisement presentations, audio streaming, media streaming, etc.).

The example index file inspector 630 determines if an index file contains alternate streams. For example, the looking for index files and segment files associated with the media stream. The example session manager 640 identifies the beginning of a media session when the proxy log filter 610 locates an index file followed by segment files. In examples in which the media is downloaded, the example session manager 640 identifies the beginning of a media session by identifying a first downloaded media file.

In examples in which the media is streamed on-demand, the example session manager 640 calculates the full duration (e.g., in seconds) of the media by summing the duration value (e.g., length value) for all segments identified in the index file. The example session manager 640 calculates presented duration by subtracting time where the media is detected to have been paused and/or stopped from the full duration. In examples in which the media is a live stream, the example session manager 640 does not calculate a full duration because there is no known start and/or end of the live event prior to streaming the live event (e.g., the user may have begun the live stream while the broadcast was already in session, the user may have terminated the stream before its actual ending, etc.).

In the illustrated example, the example session manager 640 determines the size of a media segment based on examination of the proxy records by the proxy log parser 620. The example session manager 640 calculates the actual size of the particular media (e.g., in bytes). In contrast to the calculation of a duration, instead of summing durations (as found inside the index file) for segments presented in the log records, the example session manager 640 sums together the actual sizes of these segments. Accordingly, the example session manager 640 identifies the full and presented size for the media session. This example procedure is repeated for each individual media session of an application in the same manner as described in connection with determination of the duration.

In examples in which index files are downloaded, the example session manager 640 calculates the duration for the parent session (e.g., application and/or website) presenting the child session. Given the start time of the parent session, the example session manager 640 determines that the absolute end time of the parent session is the start time plus the calculated parent session duration (e.g., absolute end time of application or page view). The example session manager 640 determines that no child session can go beyond the absolute end time of the corresponding parent session. The example session manager 640 determines that no media record of the child session can be located with a timestamp that is beyond the absolute end time of the parent session.

In example in which index files are not downloaded, the example session manager 640 estimates a duration, which may be referred to as an estimated presented duration. In such examples, the example session manager 640 calculates the duration of a media presentation based on a contextual analysis of the log records (e.g., because the entire index file has not been downloaded). In the illustrated example, the example session manger 640 can only approximate the full length of the media by only examining proxy log records (e.g., not downloading). The example session manager 640 adds the estimated and/or calculated duration time to the identified start time to determine the end time of a parent session.

In examples in which the media is downloaded, the example session manager 640 calculates the duration of illustrated example, if the estimated presented duration exceeds the absolute end of the parent session or overlaps with the start of the next media session in the same parent session, then the example session manager 640 shortens the estimated presented duration to terminate at the absolute end of the parent session or just prior to the start of the next media session in the same parent session. Then, the example session manager 640 deducts any pause periods (see FIG. 17) encountered during the media session. In the illustrated example, the example session manager 640 stores the Full Duration and the Presented duration of each requested media session in the example crediting database 650. In the illustrated example, the presented duration is less than or equal to the full duration.

In the illustrated example, the example index file inspector 630 derives the size of each segment used in calculating the duration from the actual proxy log record for that segment. In such examples, each segment corresponds to one HTTP record in the logs containing HTTP headers for both the request and the corresponding response. The size of the response in bytes (payload without HTTP headers) is the data used. This data is available through the proxy log, as shown in Example 7.

Example 7

Proxy Log Records Depicting the Segment Size

---

GET [scheme]://qthttp.apple.com.edgesuite.net/11piubpwiqubf06/0640/06401.ts
HTTP/1.1 200 *676800* AppleCoreMedia/1.0.0.8J2 (iPhone; U; CPU OS 4_3_3 like Mac OS X; ru_ru) media/mp2t 677154 10958670
GET [scheme]://qthttp.apple.com.edgesuite.net/11piubpwiqubf06/0640/06402.ts
HTTP/1.1 200 *897700* AppleCoreMedia/1.0.0.8J2 (iPhone; U; CPU OS 4_3_3 like Mac OS X; ru_ru) media/mp2t 898054 3399514
GET [scheme]://qthttp.apple.com.edgesuite.net/11piubpwiqubf06/0640/06403.ts
HTTP/1.1 200 *689960* AppleCoreMedia/1.0.0.8J2 (iPhone; U; CPU OS 4_3_3 like Mac OS X; ru_ru) media/mp2t 690314 2802980
GET [scheme]://qthttp.apple.com.edgesuite.net/11piubpwiqubf06/0640/06404.ts
HTTP/1.1 200 *698608* AppleCoreMedia/1.0.0.8J2 (iPhone; U; CPU OS 4_3_3 like Mac OS X; ru_ru) media/mp2t 698962 3008197

---

In the illustrated example, the [scheme] is "http"
Bold—segment file name
Underline Italics—size (in bytes) of the HTTP response media in terms of bytes instead of time (e.g., an estimated presented size). The terms full size and presented size are similar to the durations disclosed herein. The example session manager 640 measures the amount of traffic (e.g., in bytes) that the example media device 405 downloaded from the server to present the media to the user. The example session manager 640 uses the estimated or calculated duration size of the parent session to determine the full size of the parent session.

As described above, in the illustrated example, the example session manager 640 uses the same technique for determining the start and end times of the child session and performs the determining in parallel to determining the start and end times of the parent session. For an estimated presented duration, the example session manager 640 determines the difference between an end time and start time (as identified earlier). In the illustrated example, the example session manager 640 verifies that the estimated presented duration of the child session does not exceed the absolute end of the parent session (e.g., application or page view). In the illustrated example, the example session manager 640 verifies that the child session does not overlap with the start of a next media session in the same parent session. In the As described herein, the example crediting database 650 is a storage device (e.g., hard drives, solid state drives, floppy disks, compact disks, Blu-ray disks, RAID systems, and digital versatile disks (DVD), etc.) that stores the outputs of the example proxy log filter 610, the example proxy log parse 620, the example index file inspector 630, and the example session manager 640. The example crediting database 650 provides such information to the example publisher classifier 655 for crediting of the same.

The example pattern analyzer 660 of the example publisher 655 determines whether patterns associated with publishers match data elements (e.g., user agent ID, URL ID, REFERRER ID, INDEX ID, SEGMENT ID, etc.) of a media session. The example pattern analyzer 660 creates a pattern using a wildcard "*" placed in a location in a URL pattern that is associated with a publisher. After the pattern is created, the example pattern analyzer 660 will automatically classify future URLs that match the assigned pattern as being associated with that publisher.

As a non-limiting example, a pattern is created by first identifying the most important keyword(s) in the URL and making everything else a wild-card. In some examples, the port number in a URL is not a wildcard. In some examples, a wildcard does not follow directly after the domain with nothing following the wildcard. In some examples, no wildcards exist between the domain and the first "I". In the illustrated example, there can be more than one wildcard in each pattern. In some examples, unique identifiers in the URL such as Session IDs, Page IDs, Media IDs may be wildcards. However, in the illustrated example, the site page is not a wildcard. In examples where wildcarding a site page is used, a "." exists at the end of site page.

Example 8

URL [scheme]://evp-50615492d3d18-
c6f43381acf011c854e192a63111b363.s3.amazonaws.com/sample-2.mp4
   Correct pattern:       (1) evp*.s3.amazonaws.com/*mp4, or
                      (2) evp*.*.amazonaws.com/*mp4
   Incorrect pattern: evp*.amazonaws.com/*mp4

In the illustrated example, the second pattern does not match because, com.amazonaws.evp* would not match to the reverse of site_name from URL.

In the illustrated example, the example pattern analyzer 660 first checks the user agent identifier for potential matches with publisher patterns. For example, a publisher pattern may include known usage of a particular user agent identifier by a particular publisher (e.g., watch ESPN™), known non-use of a particular user agent identifier by publishers (e.g., Safari), use of the user agent identifier in a URL pattern, or other like patterns. The example pattern analyzer 660 finds matches using the user agent identifier by determining whether the user agent identifier of a particular media session is associated with a publisher. Therefore, the example pattern analyzer 660 identifies the user agent identifier, searches a database (e.g., example crediting database 650, example classification database 690, etc.) for the user agent identifier, and if the same user agent identifier is found in the database, determines whether the user agent identifier is associated with a publisher.

When the user agent identifier does not identify a publisher, the example pattern analyzer 660 checks the URL ID, REFERRER ID, INDEX ID, SEGMENT ID, etc. for matches. The example pattern analyzer 660 finds matches using the URL ID, REFERRER ID, INDEX ID, SEGMENT ID, etc. by identifying a domain referenced by one of the URL ID, REFERRER ID, INDEX ID, SEGMENT ID and comparing the domain to a domain pattern (e.g., evp*.s3.amazonaws.com/*mp4). In some examples, only the non-wildcard elements of the domain pattern have to match with the domain referenced by one of the URL ID, REFERRER ID, INDEX ID, SEGMENT ID for the pattern analyzer 660 to determine there is a match.

In the illustrated example, the example pattern analyzer 660 serially checks the URL ID, REFERRER ID, INDEX ID, SEGMENT ID, etc. until a match is found. Alternatively, the example pattern analyzer 660 may match data elements in parallel. If no matches are found, the example domain comparator 670 checks domains referenced by the data elements user agent, URL ID, REFERRER ID, INDEX ID, SEGMENT ID, etc. Thus, in some examples the example pattern analyzer 660 includes a data element mapping table to match data elements from an identified media session to known hosting domains and/or publisher domain patterns.

The example domain comparator 670 determines whether domains referenced by the data elements (e.g., user agent ID, URL ID, REFERRER ID, INDEX ID, SEGMENT ID, etc.) of a media session are associated with a list of known hosting domains. For example, the example domain comparator 670 identifies the root domain of a data element identified from media session records and compares the root domain to known media publisher domains for a match. In the illustrated example, the example domain comparator 670 compares the domain of a data element to known hosting domains. In some examples, the example domain comparator 670 compares the domains of all data elements to known hosting domains.

The example publisher manager 680 verifies the output of the example domain comparator 670 and if all of the data elements reference a same domain, the example publisher manager 680 credits the publisher associated with the same domain with the media session. Additionally or alternatively, the example publisher manager 680 verifies the output of the example pattern analyzer 660 and if any of the data elements match a pattern associated with a publisher, the example publisher manager 680 credits that publisher associated with the matched pattern. In some examples, the example publisher manager 680 only verifies that at least two of the data elements reference a same domain before the example publisher manager 680 associates the media of the media session with the publisher associated with the domain referenced by the at least two of the data elements.

The patterns from the example pattern analyzer 660, the domains from the example domain comparator 670, and data regarding matching of the patterns and/or domains are stored or otherwise saved in the example classification database 690. The example pattern analyzer 660, the example domain comparator 670, and the example publisher manager 680 of the example publisher classifier 655 are described further in conjunction with the description of FIGS. 16-17.

The example bus 695 connects each of the example proxy log database 600, example session classifier 605, example proxy log filter 610, example proxy log parser 620, example index file inspector 630, example session manager 640, example crediting database 650, example publisher classifier 655, example pattern analyzer 660, example domain comparator 670, and example classification database 690. The example bus 695 includes multiple paths for data to traverse between the above identified example components.

In operation, the example proxy log database 600 retrieves and/or stores the example proxy logs (e.g., accessed by the example log requests 530, 560 and/or sent by the example log pushes 535, 565) (FIG. 5) of the first request 510 and/or the second request 520 (FIG. 5) and the first response 540 and/or the second response 550 (FIG. 5) trafficked through the example proxy server 425 (FIG. 4). The example session classifier 605 accesses the example proxy log database 600 to classify media sessions. The example proxy log filterer 610 obtains the logs from the example proxy log database 600 and locates media sessions therein. The example proxy log parser 620 identifies and distinguishes child sessions from parent sessions (i.e., a media session within a browser application or media device application) in the media files stored in the example proxy log database 600. The example index file inspector 630 determines if any sub-index files, and therefore alternate streams, exist. Additionally, the example index file inspector 630 extracts portions of URLs associated with index or sub-index files. The example session manager 640 breaks down child session log files to determine data elements of the identified child sessions (e.g., start time, duration, stop time, etc.). In the illustrated example, the example crediting database 650 stores these data elements and other information relating to the media files as session records.

The example session manager 640 calculates the presented size in a manner similar to the presented duration described herein. In such examples, the example session manager 640 scales the size of the segment using a ratio of the duration of the selected segment and the duration of the segment identified in the index file. However, in some examples, the example session manager 640 does not shape the duration. Instead, in such examples, the example session manager 640 includes the full length of the last segment presented in the calculated size.

In the illustrated example, the example session manager 640 calculates the estimated presented size of the media session based on the estimated presented duration determination. For example, first the example session manager 640 calculates the time duration for a media session. Then, the example proxy log parser 620 searches for all non-index file (e.g., index files may be associated with HLS media, as described above) media records (e.g., media records having the user agent ID AppleCoreMedia) inside the session (e.g., having the same eligible domain, in some examples). For HLS streaming, the example session manager 640 counts all segments after the leading index for calculating size. For other types of streaming, the example session manager 640 counts all chunk records (e.g., even if the duration rule excludes the first one). For HTTP progressive downloads, the example session manager 640 counts both segments and chunk records. In the illustrated example, the example session manager 640 identifies all records having segment files between the start and end of a media session and lists the records. The example session manager 640 includes the records corresponding to the start and end times in the list. However, in some examples, such records may be omitted.

Having created the list of records with segment files from the media session, the example session manager 640 aggregates (e.g., sums) the actual sizes of the media associated with those records. In the illustrated example, the example index file inspector 630 derives the size of each segment in the list from the actual proxy log record for that segment (e.g., Example 5). Each segment corresponds to one HTTP record in the logs containing HTTP headers for both the request and the corresponding response. The size of the response in bytes (payload without HTTP headers) is the value used in the summation. This value is available through the example proxy server 425 and is inside each record of the proxy logs (e.g., example logs accessed by the example log requests 530, 560 and/or sent by the example log pushes 535, 565 of FIG. 5).

The example session manager 640 returns the estimated presented size (e.g., in bytes) for the media session and repeats the aforementioned procedure for each individual media session of an application or page view. In some examples, the example session manager 640 labels the estimated presented size as "unknown" when information necessary for the estimated presented size calculations described herein is not available in the proxy logs (e.g., such as in HTTPS streaming). The example crediting database 650 stores the outputs of the example proxy log filter 610, the example proxy log parse 620, the example index file inspector 630, and the example session manager 640.

In the illustrated example, the example publisher classifier 655 (FIG. 6) accesses the example crediting database 650 and/or the example session classifier 605 to associate the media of the media session with the publisher of the media and credit the same. The example pattern analyzer 660 identifies data elements from media session records and determines whether patterns associated with publishers match the data elements. Additionally, the example domain comparator 670 compares domains associated with the data elements to known hosting domains. The example publisher manager 680 determines whether to credit a publisher based on the outputs of the example pattern analyzer 660 and the example domain comparator 670. The example classification database 690 stores the outputs of the example pattern analyzer 660, the example domain comparator 670, and the example publisher manager 680.

While an example manner of implementing the example crediting manager 445 of FIG. 4 is illustrated in FIG. 6, example of the elements, processes and/or devices illustrated in FIG. 6 may be combined, divided, re-arranged, omitted, eliminated and/or implemented in any other way. Further, the example proxy log database 600; the example proxy log filter 610, the example proxy log parser 620, the example index file inspector 630, the example session manager 640, and/or, more generally, the example session classifier 605; the example crediting database 650; the example pattern analyzer 660, the example domain comparator 670, the example publisher manager 680, and/or, more generally, the example publisher classifier 655; the example classification database 690, the example bus 695; and/or, more generally, the example crediting manager 445 of FIGS. 4 and/or 6 may be implemented by hardware, software, firmware and/or any combination of hardware, software and/or firmware. Thus, for example, any of the example proxy log database 600; the example proxy log filter 610, the example proxy log parser 620, the example index file inspector 630, the example session manager 640, and/or, more generally, the example session classifier 605; the example crediting database 650; the example pattern analyzer 660, the example domain comparator 670, the example publisher manager 680, and/or, more generally, the example publisher classifier 655; the example classification database 690, the example bus 695; and/or, more generally, the example crediting manager 445 of FIGS. 4 and/or 6 could be implemented by example analog or digital circuit(s), logic circuits, programmable processor(s), ASIC(s), PLD(s), and/or FPLD(s). When reading any of the example apparatus or system claims of this patent to cover a purely software and/or firmware implementation, at least one of the example proxy log database 600; the example proxy log filter 610, the example proxy log parser 620, the example index file inspector 630, the example session manager 640, and/or, more generally, the example session classifier 605; the example crediting database 650; the example pattern analyzer 660, the example domain comparator 670, the example publisher manager 680, and/or, more generally, the example publisher classifier 655; the example classification database 690, the example bus 695; and/or, more generally, the example crediting manager 445 of FIGS. 4 and/or 6 are hereby expressly defined to include a tangible computer readable storage device or storage disk such as a memory, a digital versatile disk (DVD), a compact disk (CD), a Blu-ray disk, etc. storing the software and/or firmware. Further still, the example crediting manager 445 of FIGS. 4 and/or 6 may include example elements, processes and/or devices in addition to, or instead of, those illustrated in FIG. 6, and/or may include more than one of any or all of the illustrated elements, processes and devices.

Flowcharts representative of example machine readable instructions for implementing the example crediting manager 445 of FIGS. 4 and/or 6 are shown in FIGS. 7-20. In this example, the machine readable instructions comprise a program for execution by a processor such as the processor 2112 shown in the example processor platform 2100 discussed below in connection with FIG. 21. The program may be embodied in software stored on a tangible computer readable storage medium such as a CD-ROM, a floppy disk, a hard drive, a digital versatile disk (DVD), a Blu-ray disk, or a memory associated with the processor 2112, but the entire program and/or parts thereof could alternatively be executed by a device other than the processor 2112 and/or embodied in firmware or dedicated hardware. Further, although the example program is described with reference to the flowchart illustrated in FIGS. 7-20, many other methods of implementing the example crediting manager 445 may alternatively be used. For example, the order of execution of the blocks may be changed, and/or some of the blocks described may be changed, eliminated, or combined.

As mentioned above, the example processes of FIGS. 7-20 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 7-20 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 7:
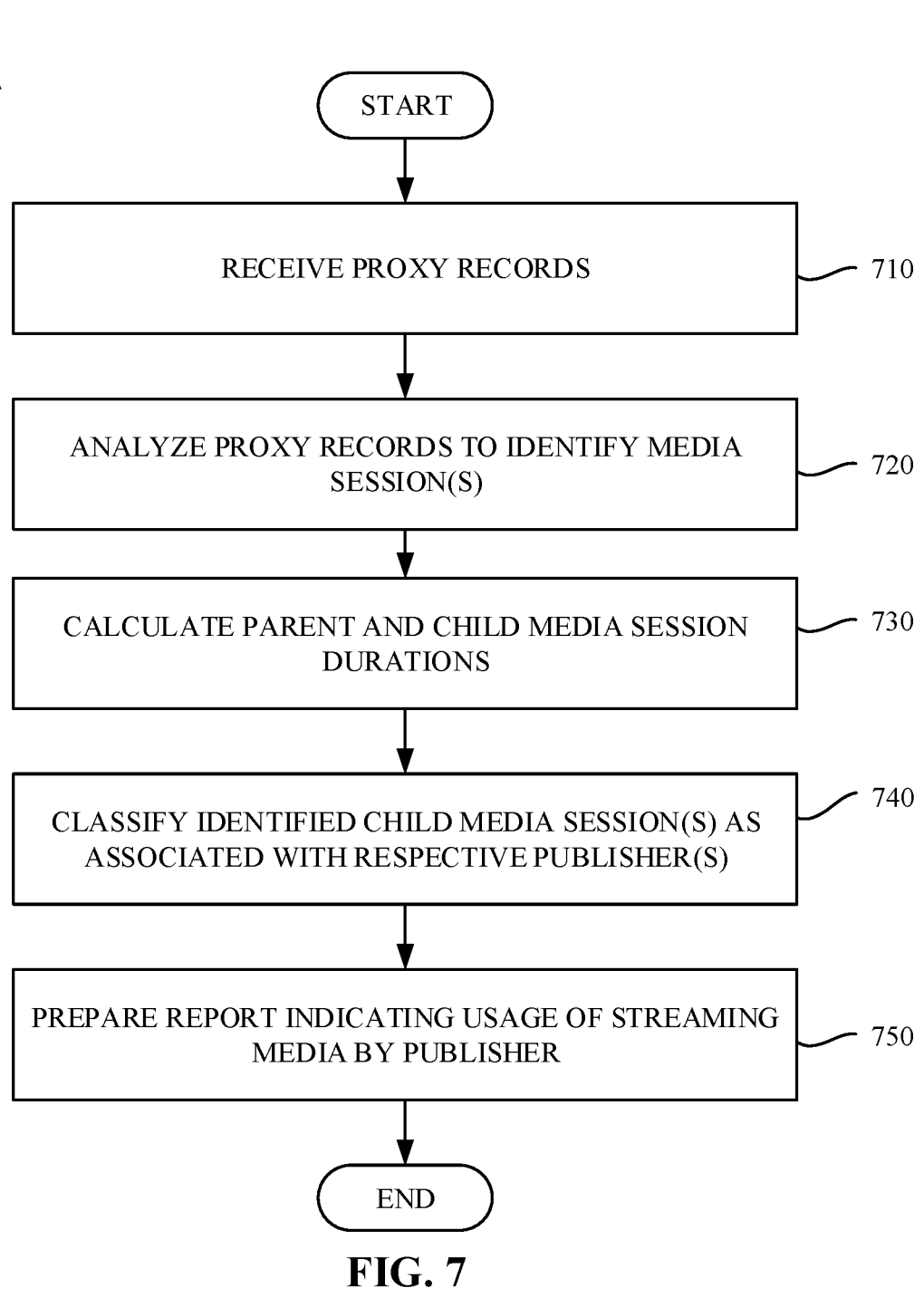
FIG. 7 is a flowchart representative of example machine readable instructions that may be executed to implement the example crediting manager of FIGS. 4 and/or 6.

FIG. 7 is a flowchart representative of example machine readable instructions 700 that may be executed to implement the example crediting manager 445 of FIGS. 4 and/or 6. The example program 700 begins at block 710. At block 710, the example proxy log database 600 (FIG. 6) of the example crediting manager 445 receives proxy records from the example proxy server 425 (FIG. 4). The example proxy log filter 610 (FIG. 6) of the example session classifier 605 (FIG. 6) retrieves the proxy records from the example proxy log database 600. In the illustrated example, the example proxy log filter 610 analyzes the proxy records to identify media session(s) (block 720). The example proxy log filter 610 first identifies a parent session (e.g., an application or web page), as further discussed in conjunction with FIG. 8. Once a parent session has been identified, the example proxy log parser 620 (FIG. 6) identifies child sessions within the parent session (e.g., a media session within an application or web page) by determining whether there are any index files or media files requested by the example media device 425 (FIG. 4) throughout the duration of the parent session, as further discussed in conjunction with FIGS. 8-9. The example session manager 640 then calculates the duration of the child session(s) and the parent session (block 730), as further discussed in conjunction with FIGS. 10-18. The example publisher manager 680 of the publisher classifier 655 classifies each child session identified by the example proxy log parser 620 as associated with the publisher of that child session (block 740), as further discussed in conjunction with FIGS. 19 and/or 20. In the illustrated example, the example publisher manager 680 stores the associations between publisher and child sessions in the example classification database 690 (FIG. 6). At block 750, the example crediting manager 445 generates a report(s) based on the duration and publisher(s) of a particular child session. For example, the example crediting manager 445 generates a report including a particular media, the presented duration of the particular media, the presented duration and/or size of the particular media, the publisher of the particular media, and/or the parent session through which the particular media was presented.

Figure 8:
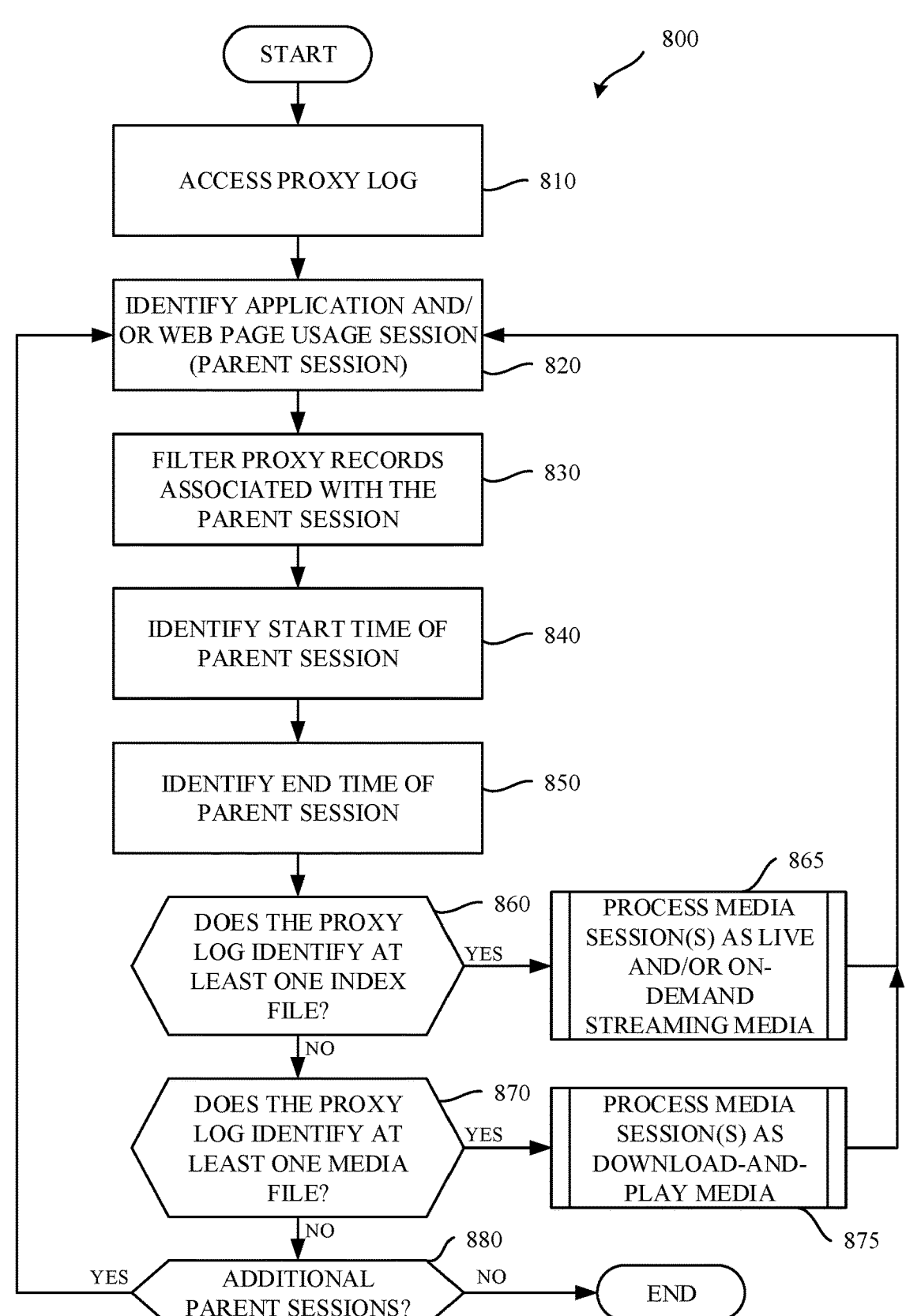
FIG. 8 is a flowchart representative of example machine readable instructions that may be executed to implement the example session classifier of FIG. 6.

FIG. 8 is a flowchart representative of an example process 800 that may be executed to implement the example session classifier 605 of FIG. 6. The example process 800 of FIG. 8 begins when the example proxy log filter 610 (FIG. 6) accesses a proxy log from the example proxy log database 600 (FIG. 6) (block 810). The example proxy log filter 610 (FIG. 6) analyzes the proxy log to identify a parent session (e.g., an application and/or web page) (block 820). Example approaches for analyzing a proxy log to identify a parent session are disclosed above and in U.S. Patent Application Publication Nos. 2014/0273929 and 2014/0280896, both entitled "Methods and Apparatus to Credit Usage of Mobile Devices," both filed on Mar. 15, 2013, which are hereby incorporated by reference herein in their entirety. Once the parent session has been identified, the example proxy log filter 610 filters the proxy log to obtain proxy records associated with the identified parent session (block 830). In the illustrated example, the example proxy log filter 610 filters the proxy logs (e.g., example logs accessed by the example log requests 530, 560 and/or sent by the example log pushes 535, 565 of FIG. 5) to remove request(s) that are not related to media presentations. In the illustrated example, the example proxy log filter 610 removes proxy log records that have a file type that does not match a media type. Additionally or alternatively, any other approach to filtering records may be used such as, for example, inspecting a file extension, inspecting a response size, inspecting a user agent field, etc.

The example session manager 640 inspects timestamps associated with a first proxy record to identify a start time of the parent session (block 840). The example session manager 640 inspects timestamps associated with a last proxy record to identify an end time of the parent session (block 850). The example session manager 640 determines the start and end times differently for each type of media session (e.g., live stream, stream on demand, "download-and-play", etc.).

For example, to determine the start time for HLS streaming media, the example session manager 640 identifies that a media streaming session is associated with a leading index file. The index file defines streaming session parameters. In the illustrated example, the presence of index file(s) in a proxy log (e.g., example logs accessed by the example log requests 530, 560 and/or sent by the example log pushes 535, 565 of FIG. 5) indicates a possible media streaming session. If the example session manager 640 determines there is a media streaming session and finds multiple consecutive index files in the logs (with no segment files between them), the example proxy log parser 620 scans the index file sequence until the absolute end of application or page view has been reached or the example proxy log parser 620 finds a record containing a media segment. In the illustrated example, the example proxy log parser 620 identifies a last index file in the sequence of multiple consecutive index files as the leading index file of a media session. The example index file inspector 630 extracts a portion of the URL associated with the index file. In the illustrated example, the portion of the URL is from the prefix (e.g., "http://") to the first forward slash of the URL (e.g., excludes a communication port identifier that may be part of the URL). The extracted portion of the URL is referred to as the eligible domain of the index file of the session. In the illustrated example, the example index file inspector 630 extracts the media type of the record. The example index file inspector 630 reports the extracted media type as the MIME type of the media session.

The example index file inspector 630 attempts to locate a first record containing a media segment following the leading index file, within the session of the application or page view. If no such record is found, the example session manager 640 determines there is no media session to credit. If the example index file inspector 630 finds a record containing a media segment, then the example session manager 640 identifies the start of a new media session at the timestamp of the identified record. In the illustrated example, the example session manager 640 verifies there are at least two segments after the leading index before crediting the media session. In such examples, the example session manager 640 identifies the timestamp of the second segment following the leading index as the start time.

Non-HLS streaming (e.g., proprietary streaming, HTTP, HTTPS, etc.) may not have an index/segment structure. Therefore, to determine the start time for non-HLS streaming, the example proxy log parser 620 identifies a series of consecutive records (e.g., having an AppleCoreMedia user agent ID) regardless of the file extensions or media types. In the illustrated example, the example session manager 640 identifies the first record as the start of the session. Thereafter, the example index file inspector 630 extracts the portion of the URL (e.g., associated with the index file) and identifies the start of a new media session as described above. In the illustrated example, when HTTPS is used for delivering media chunks, the example index file inspector 630 may report the MIME type of the sessions as "Unknown" for unidentified or missing media (e.g., only the domain, not the rest of the URL (e.g., media type), is identifiable in HTTPS). In the illustrated example, the HLS standard uses HTTP.

In the illustrated example, to determine the start time for downloads (e.g., HTTP Progressive), the example proxy log parser 620 identifies records having, for example, an Apple-CoreMedia user agent ID. In some example, the AppleCore-Media user agent ID indicates "download-and-play" media. Although the present disclosure refers to the user agent ID AppleCoreMedia, alternative user agent IDs may indicate streaming and/or "download-and-play" media. The aforementioned records may not represent index files or segment files (as defined in previous sections). In the illustrated example, the example session manager 640 records the timestamp of the first record having the AppleCoreMedia user agent ID as the start time of the media session. In the illustrated example, the example session manager 640 verifies there are at least two records having the AppleCoreMedia user agent ID before determining a session exists (i.e., one record having the AppleCoreMedia user agent ID is not indicative of a session for crediting purposes). The example index file inspector 630 extracts a portion of the URL of the first record until the first forward slash (without any port) as described above. The example session manager 640 determines whether the extracted URL portion is the eligible domain of the session for crediting purposes. In examples disclosed herein, when a "download-and-play" media session is analyzed, the rule(s) associated with index files are ignored.

The example session manager 640 determines the end of media session (block 850). For example, in the course of an HLS media session, the example session manager 640 identifies a record containing an index file that does not have a same eligible domain as the index files of the media session. In such examples, the example session manager 640 determines that the media session associated with the eligible domain has ended. Thus, the example session manager 640 identifies the timestamp of the last record of the media session with the same eligible domain as the end time of the media session.

In the illustrated example, in the course of a non-HLS media session, the example proxy log parser 620 identifies a record containing an index file, containing a segment file that does not have the same eligible domain of the segment files of the current media session, or that belongs to a different media streaming type. The example proxy log parser 620 identifies two consecutive segments (regardless of their domain) displaced more than 5 minutes apart. The proxy log parser 620 does not identify another record containing a segment, an index file, or a record belonging to a non-HLS media by the absolute end of the application or page view, by the end of file of the current log, or within 5 minutes from the last record containing either an index or a segment file of the current session. If any or all of the aforementioned examples are true, the example session manager 640 determines the non-HLS media session has ended. In the illustrated example, the example session manager 640 identifies the timestamp of the last record containing a segment file of the current media session as the end time of the media session.

In the illustrated example, the example proxy log parser 620 searches after the last record but before the end of the current application or page view for at least one of a POST HTTP request within a threshold time (e.g., 30 seconds) from the last media record, any non-media record belonging to the container application (except syncedDefault (e.g., iOS) type of records, iTunes (e.g., iOS), mail clients, or other asynchronous background traffic examples because these examples do not indicate that a session has terminated) or a record that terminated the current session for any other media session. If any of the above identified types of records are found, the example session manager 640 identifies the timestamp of the identified record as the end time of the current media session. In the illustrated example, the example session manager 640 identifies the end of the page view, application, or proxy file as the end of the session if no matching records are found through the end of the page view, application or log file. Additionally or alternatively, any other approach to determining start and/or end times of a parent session may additionally or alternatively be used.

The example proxy log parser 620 determines whether the proxy log identifies any index files (block 860). An example implementation of the example proxy log parser 620 determining whether the proxy log identifies an index file is disclosed below in connection with FIG. 9. If the example proxy log parser 620 identifies an index file in the proxy log (block 860: YES), the example session manager 640 processes the proxy records as live and/or on-demand streaming media (block 865). Thereafter, control returns to block 820. If the example proxy log parser 620 determines there is not an index file in the proxy log (block 860: NO), the example proxy log parser 620 determines whether the proxy records identify a media file (block 870). The example proxy log parser 620 identifies a media file by determining whether any proxy records identify request(s) for a file having a file extension that matches a known media file extension. For example, the example proxy log parser 620 inspects each proxy log record to determine whether the example media device 405 (FIG. 4) request(s) a file having a file extension of ".ts", ".mp3", ".wav", etc. Therefore, in the illustrated example, the example proxy log parser 620 includes a file extension mapping table to match file extensions from proxy record request(s) to known media file extensions.

Additionally or alternatively, other approaches for determining whether the proxy log identifies a media file may be used. For example, the example proxy log parser 620 may determine whether a media type of a session record matches a known media type. The example proxy log parser 620 may analyze the response message to determine whether it is likely to be media.

If the example proxy log parser 620 determines that the proxy log identifies a media file (block 870: YES), the example session manager 640 processes the proxy records as media that is presented as "download-and-play" media (block 875). Thereafter, control returns to block 820. If the example proxy log parser 620 determines that the proxy log does not identify a media file (block 870: NO), then the example proxy log parser 620 determines there are no child media sessions within the identified parent session to be credited. Control proceeds to block 880, where the example proxy log filter 610 determines whether additional parent sessions are present in the proxy log (block 880). If additional parent sessions are present (block 880: YES), control returns to block 820, where the example proxy log filter 610 identifies a subsequent parent session to be processed. If no additional parent sessions are present (block 880: NO), the example process of FIG. 8 terminates.

Figure 9:
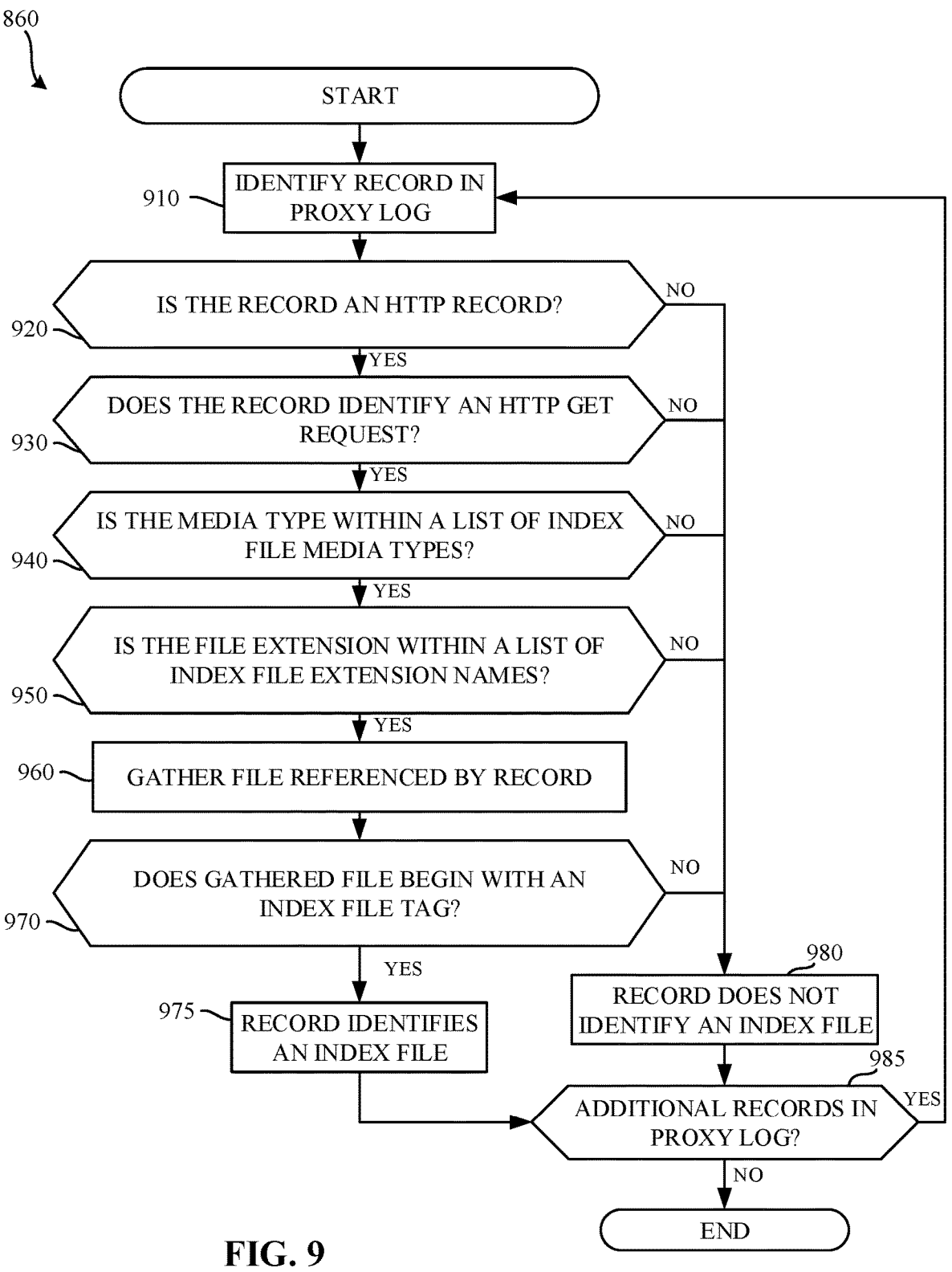
FIG. 9 is a flowchart representative of example machine readable instructions that may be executed to implement the example proxy log parser of FIG. 6.

FIG. 9 is a flowchart representative of an example implementation of the process illustrated in block 860 of FIG. 8 to determine whether the proxy log identifies an index file. The example process of FIG. 9 begins when the example crediting manager 445 identifies a record in the proxy log (block 910). The example proxy log filter 610 then analyzes the identified record to determine whether the record identifies an index file, and thus, media. To identify an index file, the example proxy log filter 610 first determines whether the identified record is an HTTP record (block 920). For example, HTTP Live Streaming (HLS) media is identified by an index file followed by media segments. Therefore, if the identified record is not an HTTP record, the media session cannot be HLS media. In some examples, an HTTP "GET" (e.g., GET http://) method is used to request media. Alternatively, other schemes are used instead of http:// (e.g., GET [scheme]://, where [scheme]:// can be http://, https://, ftp://, mailto://, etc.). Accordingly, if the record is an HTTP record (block 920: YES), then the example proxy log filter 610 determines whether the record identifies an HTTP "GET" request (block 930).

If the record identifies an HTTP "GET" request (block 930: YES), then the example proxy log filter 610 determines whether a media type of the record is within a list of index file media types (block 940). Some example media types include, without limitation, "application/vnd.apple.mpegurl," "audio/mpegurl," and "audio/x-mpegurl." If the media type of the record is within a list of index file media types (block 940: YES), then the example proxy log filter 610 determines whether a file extension of the record is within a list of index file extension names (block 950). In the illustrated example, the extension of the file name is inside the URL (e.g., at the end of the URL right before the query string) and is at least one of ".m3u8" or ".m3u."

In the illustrated example, in addition to the above conditions, index files that follow the M3U protocol are text files and start with the #EXTM3U tag. Thus, if the file extension is within a list of index file extension names (block 950: YES), then the example proxy log filter 610 gathers the file referenced in the identified record (block 960). Thereafter, the example proxy log filter 610 determines whether the gathered file begins with an index file tag (e.g., "#EXTM3U") (block 970). If the example proxy log filter 610 determines the gathered file begins with an index file tag (block 970: YES), the example proxy log filter 610 identifies the record as an index file. The example proxy log filter 610 indicates the identified record to the example proxy log parser 620. Control proceeds to block 985.

If the record is not an HTTP record (block 920: NO), the record does not identify an HTTP "GET" request (block 930: NO), the media type is not within a list of index file media types (block 940: NO), the file extension is not within a list of index file extension names (block 940: NO), or the gathered file does not start with an index file tag (block 970: NO), then the example proxy log filter 610 determines that the record does not identify index files for media crediting purposes (block 980). The example proxy log filter 610 indicates to the example proxy log parser 620 that no child sessions were identified and control proceeds to block 985.

At block 985, the example proxy log filter 610 searches for addition records to identify (e.g., multiple child sessions may exist within a single parent session). If the example proxy log filter 610 determines additional records exist in the proxy log (block 985: YES), control returns to block 910. If the example proxy log filter 610 determines there are no additional records in the proxy log (block 985: NO), the example process 860 terminates. In the illustrated example, blocks 910 through 985 are repeated until (1) a record identifying an index file is identified (block 975), or (2) no additional records exist in the proxy log (block 985: NO). While blocks 920, 930, 940, 950, 960, and 970 are shown in series in FIG. 9, the example proxy log filter 610 may perform each block in parallel (i.e., if any of blocks 920, 930, 940, 950, 960, and 970 are satisfied, the example proxy log filter 610 determines the record identifies an index file).

FIGS. 10-14 are flowcharts representative of example machine readable instructions that may be executed to implement the example crediting manager 445 (FIG. 4) to credit a live and/or on-demand streaming media session based on a proxy log generated by the example proxy server 425 (FIG. 4). As discussed in conjunction with FIG. 9, the example proxy log filter 610 (FIG. 6) locates any records containing an index file (e.g., streaming child sessions) within an application or page view (e.g., parent session). Thereafter, the proxy log parser 620, the example index file inspector 630, and the example session manager 640 process the records. After the records are processed, the example proxy log filter 610 identifies the next parent session, if any, and identifies any child sessions therein (e.g., according to example process 800).

FIG. 10 illustrates the start of an example implementation of block 865 of FIG. 8 to process a media session as live and/or on-demand streaming media. After the example proxy log filter 610 locates a record containing an index file (FIG. 8, block 860: YES), the example proxy log parser 620 (FIG. 6) sorts any media sessions identified by the example proxy log filter 610 via block 860 (FIGS. 8-9) associated with the same parent session chronologically (block 1005). In the illustrated example, the example proxy log parser 620 communicates with the example proxy log filter 610 to determine if a child media session is identified within the parent session (blocks 1010, 1015). If the example proxy log parser 620 does not identify a child session (block 1015: NO), the example proxy log parser 620 determines there are no subsequent media sessions exist for crediting. When the example proxy log parser 620 identifies a record containing an index file (block 1015: YES), the example session manager 640 identifies the beginning of a new child media session.

In the illustrated example, the example session manager 640 determines a duration of the child media session. The example session manager 640 initializes values associated with the child media session (e.g., full duration, presented duration, full size, and presented size values) to zero (blocks 1020, 1025, 1030, 1035). In the illustrated example, the example session manager 640 determines a URL of a web page that caused the index file to be requested by, for example, inspecting a referrer field of the proxy record identifying the index file (block 1040). The example session manager 640 determines a referrer URL of the web page that caused the identified index to be requested by, for example, inspecting a referrer field of a proxy record identifying request transmitted to the URL of the web page that caused the index file to be requested (block 1045). In the illustrated example, the example session manager 640 additionally determines a user agent that was used to request the index file by inspecting the user agent field of the proxy record identifying the index file (block 1050). Thereafter, the example proxy log parser 620 accesses the index file and parses the same (block 1055). Alternatively, the example proxy log database 600 may download the index file prior to the example proxy log parser 620 parsing the index file.

Figure 11:
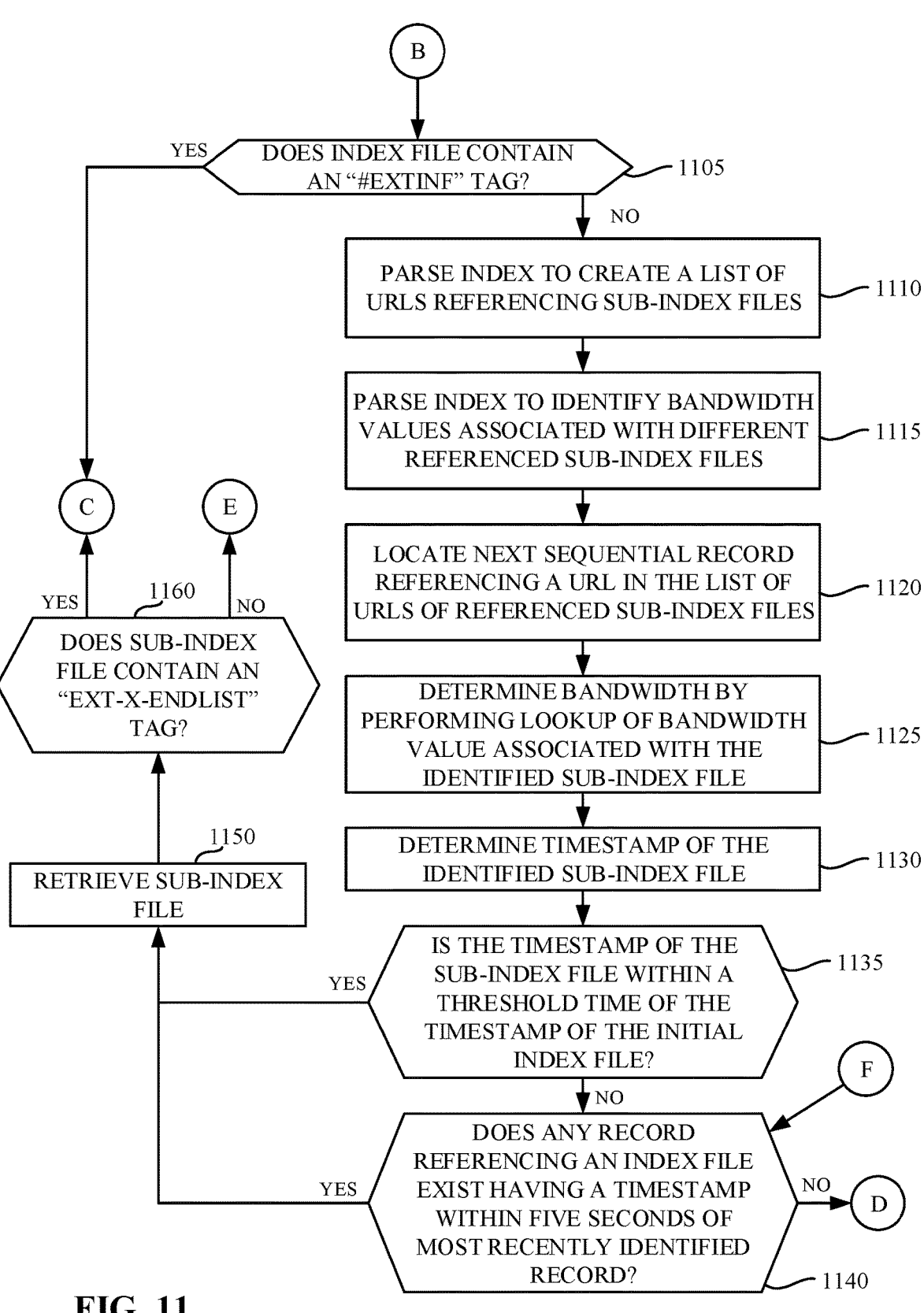
Figure 12:
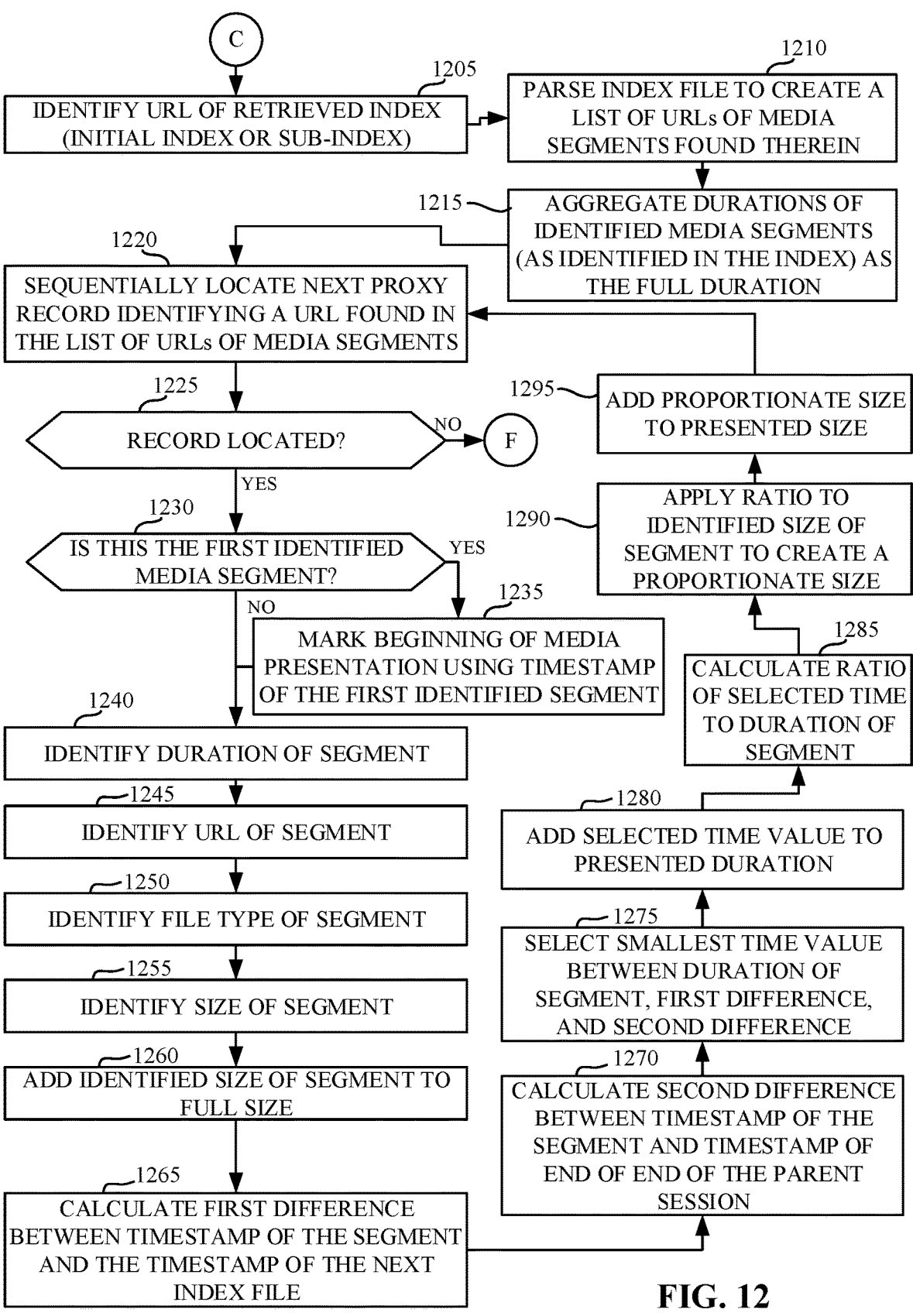

After block 1055, control proceeds to block 1105, described further in conjunction with FIG. 11. FIG. 11 illustrates a continuation of the example implementation (FIGS. 10-14) of block 865 of FIG. 8 In the illustrated example, the example proxy log filter 610 determines if an index file contains an #EXTINF tag (block 1105), which indicates that the index file is followed by segment files. If the example proxy log filter 610 determines the index file contains the #EXTINF tag (block 1105: YES), control proceeds to block 1205 (FIG. 12). If the example proxy log filter 610 determines the index file does not contain the #EXTINF tag (block 1105: NO), the example index file inspector 630 parses the index file for sub-index files (block 1110). In the illustrated example, the example index file inspector 630 parses the index file for URLs of other index files (e.g., sub-index files) having different bandwidths (block 1115). The example index file inspector 630 saves the URLs of index files representing the varying bandwidths with session records in the example crediting database 650. The example index file inspector 630 looks in the subsequent records for a record with an index file whose URL contains one of these paths. At block 1120, the example index file inspector 630 locates the next sequential record referencing a URL in the list of URLs of the referenced sub-index files. Next, the example session manager 640 determines the bandwidth of the media session by looking up bandwidth value associate with the identified sub-index file (block 1125).

Figure 13:
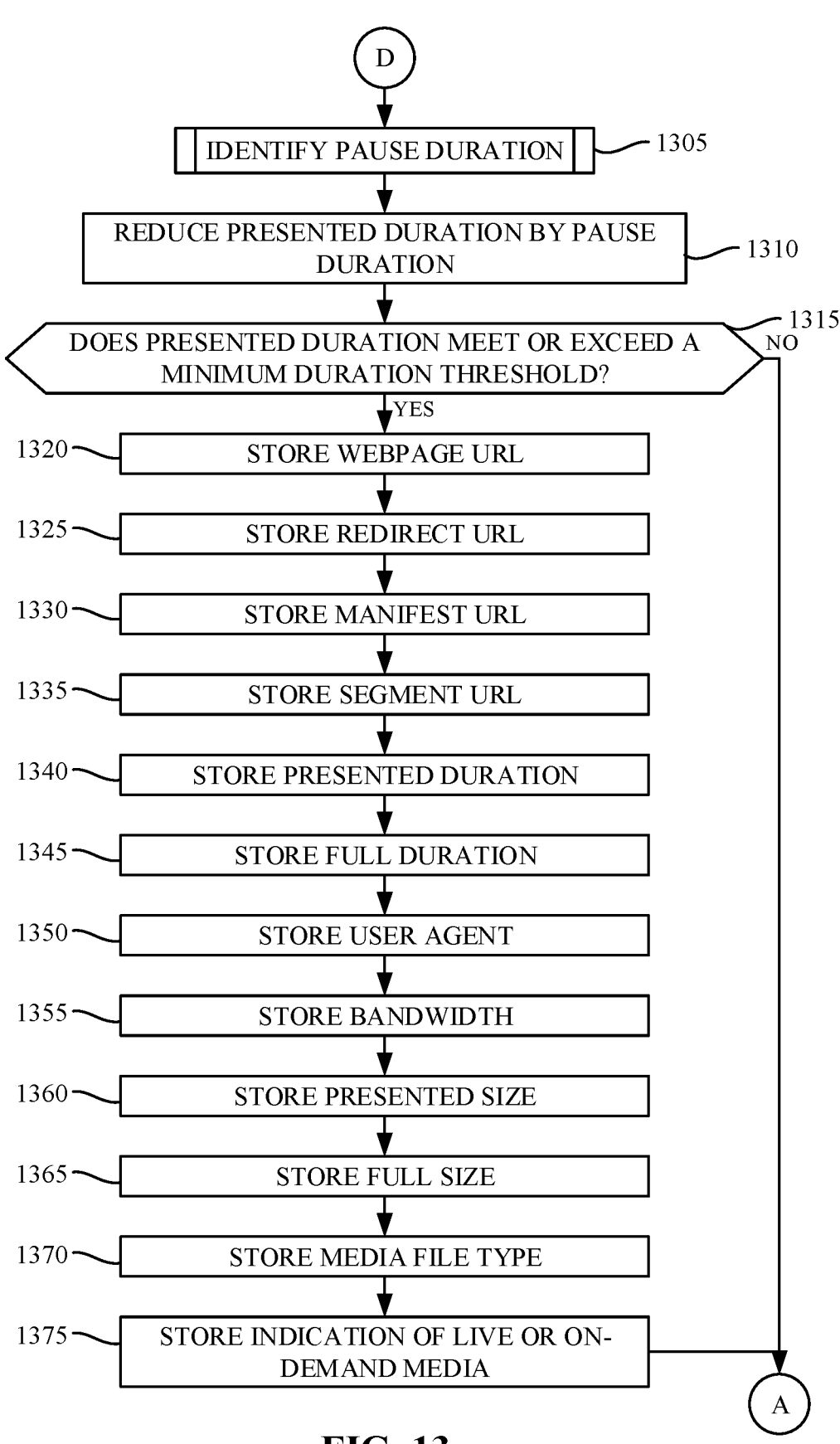

In the illustrated example, the example session manager 640 determines the timestamp of the identified sub-index file (block 1130). The example session manager 640 determines whether the timestamp of the sub-index file was within a threshold time of the timestamp of the master index file (block 1135). If the example index file inspector 630 does not find a record within 5 seconds of the timestamp of the master index file (block 1135: NO), the example session manager 640 determines whether any record references an index file having a timestamp within 5 seconds of the timestamp of the most recently identified record (block 1140). Due to possible redirection, the identified index file is used as the index file with the segments for this session. If the example index file inspector 630 does not find an index file record within 5 seconds of the timestamp of the master index file (block 1140: NO), the example session manager 640 determines that the session has ended and control proceeds to block 1305 (FIG. 13). Other thresholds besides within 5 seconds may be used without departing from the scope of this disclosure.

If the example index file inspector 630 determines the timestamp of the sub-index file is within the threshold time of the timestamp of the master index file (block 1135: YES) or if the example index file inspector 630 finds any record referencing an index file having a timestamp within 5 seconds of the timestamp of the most recently identified record (block 1140: YES), then the example proxy log database 600 downloads the new index file and the example proxy log parser 620 parses the new index file (block 1150).

In the illustrated example, the absence of an #EXT-X-ENDLIST tag indicates the media is a live session. Thus, if the example index file inspector 630 determines that the index file contains #EXT-X-ENDLIST tag (block 1160: YES), the example session manager 640 determines the media session is not a live session and control proceeds to block 1205. Processing and/or crediting non-live streaming media sessions is disclosed below in connection with FIG. 12. Similarly, if the example index file inspector 630 determines that the index file does not contain an #EXT-X-ENDLIST tag (block 1160: NO), the example session manager 640 determines the media session is a live session and control proceeds to block 1405. An example process to process and/or credit live streaming media sessions is disclosed below in connection with FIG. 14.

FIG. 12 illustrates a continuation of the example implementation (FIGS. 10-14) of block 865 of FIG. 8 and is representative of example machine readable instructions that may be executed to implement the example crediting manager 445 to process a non-live streaming media session. At block 1205, the example index file inspector 630 identifies the URL of the retrieved master index or sub-index file. The example index file inspector 630 parses the index file to create a list of URLs of media segments found therein (block 1210). In the illustrated example, the example index file inspector 630 saves all paths to the segment files found inside the index file to the example crediting database 650. The example session manager 640 aggregates or otherwise adds all integer/floating-point numbers after tag #EXTINF for each segment inside the index file (block 1215) to determine the Full Duration of the media, in seconds. The example proxy log parser 620 locates the next sequential proxy record identifying URLs that match the URLs of the segments and in the order of the segments in the index file (blocks 1220, 1225). If no record is found anywhere until the absolute end time of the application (block 1225: NO), control returns to block 1140.

In the illustrated example, if this is the very first segment of the media (block 1230: YES), the example session manager 640 identifies the beginning of the media presentation at the timestamp of the record with the very first segment (block 1235). For each segment found, the example session manager 640 identifies the duration of the segment (block 1240). This duration value is an integer of floating number and it can be found after tag #EXTINF for that segment inside the index file identifying the segment. Additionally, the example session manager 640 identifies the URL of the segment (block 1245), the file type of the segment (block 1250), and the size of the segment (block 1255). In the illustrated example, the example session manager 640 adds the size of the identified segment to the full duration (block 1260). In the illustrated example, the example session manager 640 calculates a first difference between the timestamp of the record with the identified segment and the timestamp of the first record (block 1265) with an index file with alternate streams, or a regular index file (i.e., not with alternate streams) that is not in the list created in block 1110. In the illustrated example, the example session manager 640 calculates a second difference between the timestamp of the record with the identified segment and the absolute end of the parent application (block 1270). Thereafter, the example session manager 640 determines the smallest time value of the aforementioned time values (e.g., the duration of the identified segment, the first difference, and the second difference) (block 1275). The example session manager 640 adds the determined smallest time value to the presented duration for the media session (block 1280).

Additionally or alternatively, the example session manager 640 calculates the ratio of the selected time and the duration of the section identified in block 1240 (block 1285). Thereafter, the example session manager 640 applies the ratio to the identified size of the segment determined in block 1255 to create a proportionate size (block 1290). Similar to the presented duration, the example session manager 640 adds the proportionate size to the presented size (block 1295). Thereafter, control returns to block 1220.

In the illustrated example, the example session manager 640 shapes the presented time to make sure the reported time does not exceed certain boundaries that are obvious in the logs such as the end of the application, the beginning of another application, or the beginning of another media within the same application. Such checks may be used because the proxy logs (e.g., example logs accessed by the example log requests 530, 560 and/or sent by the example log pushes 535, 565 of FIG. 5) do not include information concerning when and/or whether the media has been paused or stopped.

FIG. 13 illustrates a continuation of the example implementation (FIGS. 10-14) of block 865 of FIG. 8. Once the example session manager 640 determines the presented duration, the example session manager 640 identifies a pause duration, if any (block 1305). At block 1310 the example session manager 640 modifies the presented duration to account for any detected pauses from block 1305. In the illustrated example, the example session manager 640 then determines whether the session is to be credited (e.g., if the presented duration satisfies a minimum threshold) (block 1315). If the presented duration meets or exceeds the minimum duration threshold (block 1315: YES), the example session manager 640 stores, in the example crediting database 650, the webpage URL (block 1320), the redirect URL (block 1325), the manifest URL (block 1330), the segment URL (block 1335), the presented duration (block 1340), the full duration (block 1345), the user agent (block 1350), the bandwidth (block 1355), the presented size (block 1360), the full size (block 1365), the media file type (block 1370), and/or an indication that the media is live or on-demand (block 1375) as a session record. The session records stored in the example crediting database 650 are created and/or identified through the example process 865 shown in FIGS. 10-14. After the above information is stored in the example crediting database 650 or if the presented duration is less than the minimum duration threshold (block 1315: NO), control returns to block 1010.

Figure 14:
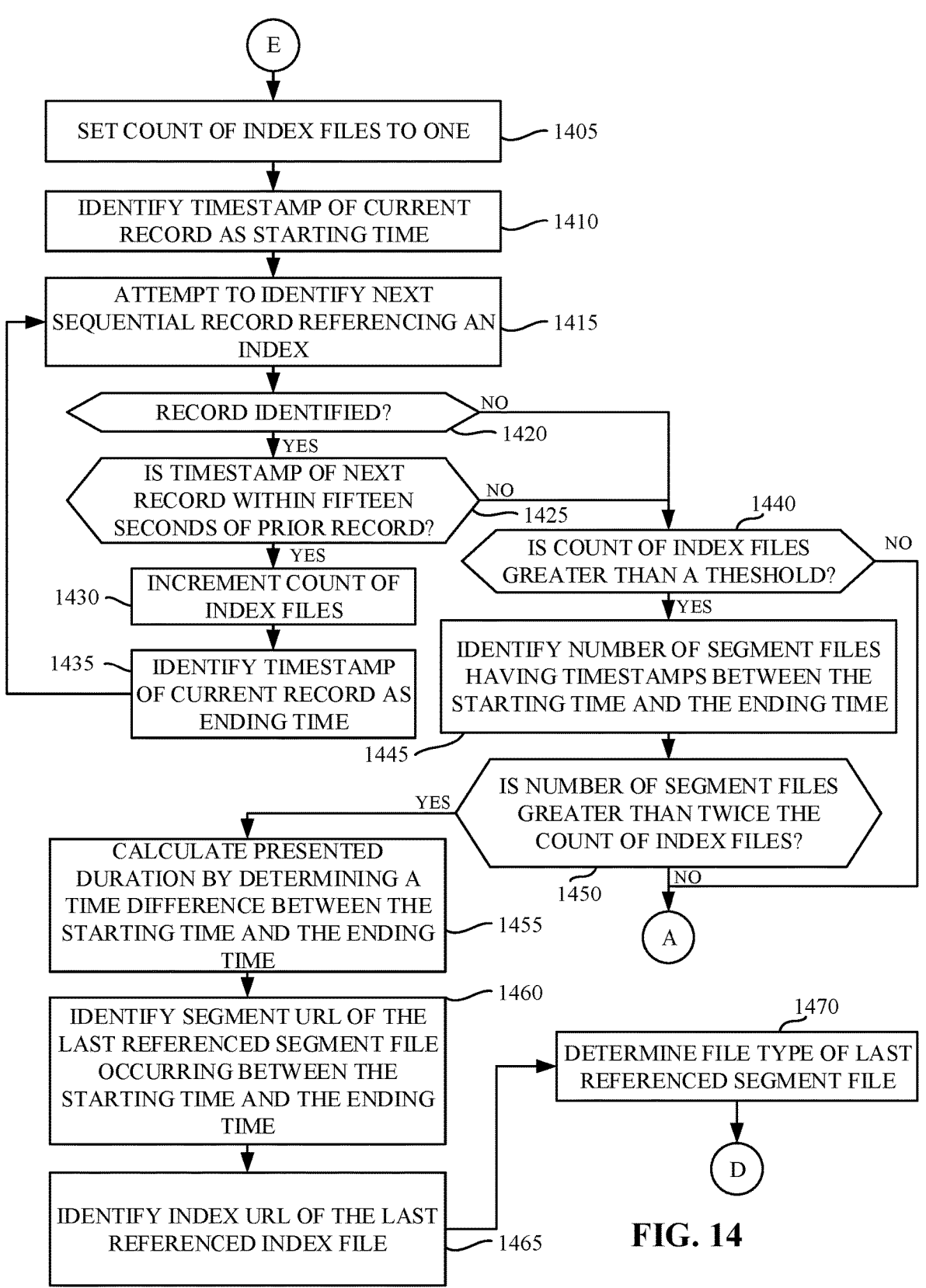

FIG. 14 illustrates a continuation of the example implementation (FIGS. 10-14) of block 865 of FIG. 8 and is representative of example machine readable instructions that may be executed to implement the example crediting manager 445 to process a live streaming media session. As noted above, a live streaming media session is identified when an index file does not include a live streaming media tag, such as "EXT-X-ENDLIST" (block 1160: NO). The example process of FIG. 14 is performed when the example index file inspector 630 identifies that the index file does not include the live streaming media tag (block 1160: NO).

The example process of crediting a live session begins at block 1405. The example session manager 640 sets a count of a number of index files to one (block 1405). The example session manager 640 identifies a timestamp of a first identified index file as a starting time (block 1410). In the illustrated example, the example proxy log parser 620 attempts to identify a next sequential record referencing an index file (block 1415). If the example proxy log parser 620 identifies a record identifying an index file (block 1420: YES), the example session manager 640 determines whether the timestamp of the record identifying the index file is within a threshold time (e.g., fifteen seconds) of the prior record (block 1420). As noted above, when media is retrieved using live streaming, index files will be temporally grouped together. If an index file is identified, the example session manager 640 increments the count of the number of identified index files (block 1430). The example session manager 640 then identifies the timestamp of the current record (e.g., the record identifying the next index file within a threshold time of the prior index file) as an ending time (block 1435). Accordingly, in the illustrated example, the example session manager 640 constantly updates the end time as the example proxy log parser 620 identifies more conforming records.

Control returns to block 1415 where the process is repeated until either (1) no subsequent record is identified (block 1420: NO), or (2) a subsequent record is identified but that record is not within a threshold time of an immediately prior record (block 1425: NO). If either of the prior conditions are met (blocks 1420, 1425), the example session manager 640 determines whether the count of index files is greater than a threshold number of index files (e.g., twelve index files) (block 1440).

The example publisher manager 680 uses the following rule(s) to determine whether a live streaming media session is to be credited. Excluding paused periods, the example publisher manager 680 credits streaming sessions when the media session satisfies a first threshold (e.g., number of index files is greater than 12). In the illustrated example, the example publisher manager 680 credits streaming sessions when, inside the media session, the total number of records with index files satisfies a second threshold (e.g., number of records with index files is at least 50% of the total number of records with segment files). The first and second thresholds are configurable and described numerically for exemplary purposes only. In the illustrated example, a threshold other than twice the number of index files is used. Moreover, any other comparison technique may additionally or alternatively be used such as, for example, greater than, less than, less than or equal to, etc.

If the first threshold is not satisfied (e.g., number of index files is less than or equal to 12) (block 1440: NO), the example publisher manager 680 is not to credit the session and control proceeds to block 1010 (FIG. 10). At block 1010, the proxy log filter 610 attempts to identify a subsequent media session. If the first threshold is satisfied (e.g., number of index files is greater than 12) (block 1440: YES), the example session manager 640 determines a number of segment files that have timestamps intermediate the starting time (identified in block 840), and the ending time (identified in block 850) (block 1445). If the second threshold is not satisfied (e.g., number of segment files is not greater than or equal to twice the count of the number of index files) (block 1450: NO), the example session classifier 605 does not credit the session, and control returns to Block 1010. If the second threshold is satisfied (e.g., the number of segment files is greater than twice the count of the number of index files) (block 1450: YES), the example session manager 640 calculates a presented duration by determining a time difference between the starting time (identified in block 840) and the ending time (identified in block 850) (block 1455). The example session manager 640 identifies a URL of a last referenced segment occurring between the starting time (identified in block 840) and the ending time (identified in block 850) as a segment URL (block 1460). The example crediting database 650 stores the segment URL, which is useful in determining the publisher of the media. In the illustrated example, the example session manager 640 identifies a URL of the last referenced index file (block 1465). The URL of the last referenced index file is referred to as the index URL. The example crediting database 650 stores the index URL, which is useful in determining the publisher of the media. The example session manager 640 then determines a file type of the last referenced segment file (block 1470). Control then proceeds to block 1305 (FIG. 13), where the pause duration, if any, is calculated and used to determine whether the session is to be credited (blocks 1310, 1315).

In the illustrated example, the example index file inspector 620 identifies whether a media session is live or on-demand. In the illustrated example, the example index file inspector 620 processes the media session to identify whether it is live or on-demand after the example session manager 640 determines the estimated presented duration and/or estimated presented size. In the illustrated example, the example index file inspector 620 identifies a media session as live or on-demand at any other time with respect to the example session manager 640 determining the estimated presented duration and/or estimated presented size.

In the illustrated example, the example session manager 640 determines any pause time when calculating the duration of the media session. For example, if the example session manager 640 calculates a duration of 5 minutes for presented media and, halfway through presentation the user paused the media for 2 minutes, the example session manager 640 removes those 2 minutes from the calculated duration. In the illustrated example, the example session manager 640 determines whether a pause duration satisfies a threshold (e.g., two minute pause). In such examples, if the threshold is satisfied, the example session manager 640 determines that the media session has terminated. Further, the example session manager 640 identifies a separate session when the media presentation is resumed.

In the illustrated example, the example session manager 640 identifies a pause duration by identifying an abnormal gap between request(s) for media segments. Moreover, in the illustrated example, the example session manager 640 identifies the end time of an application session (e.g., a parent session with respect to the media session) as the end time of the media presentation (e.g., closing an application ends a media presentation therein). The example session manager 640 utilizes such information to calculate a presented duration of the media. For example, if five minutes of media were retrieved by the media device, and the media device began retrieving the media two minutes prior to the application presenting the media being closed, the example session manager 640 determines only two minutes of the media were presented.

Figure 16:
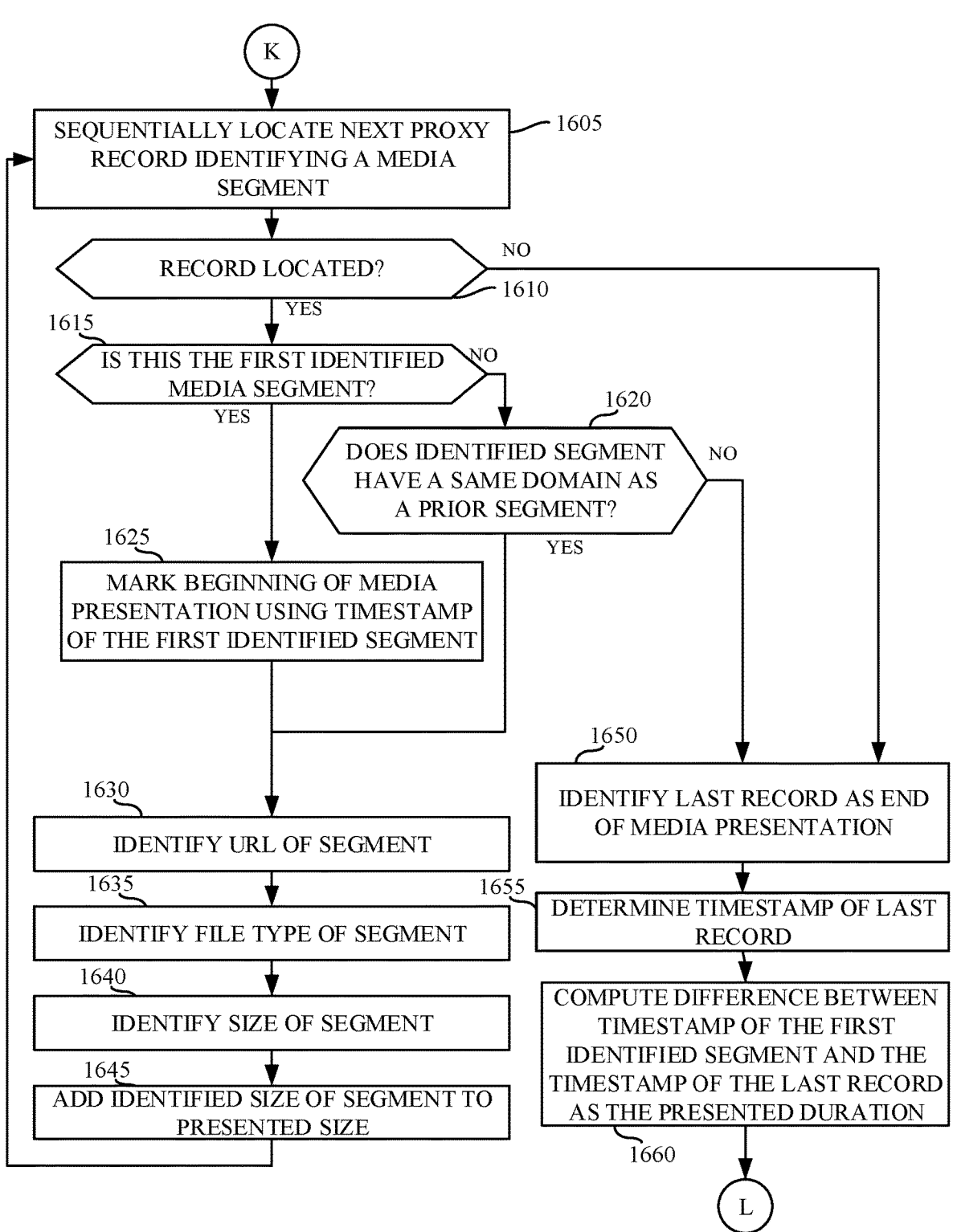
Figure 17:
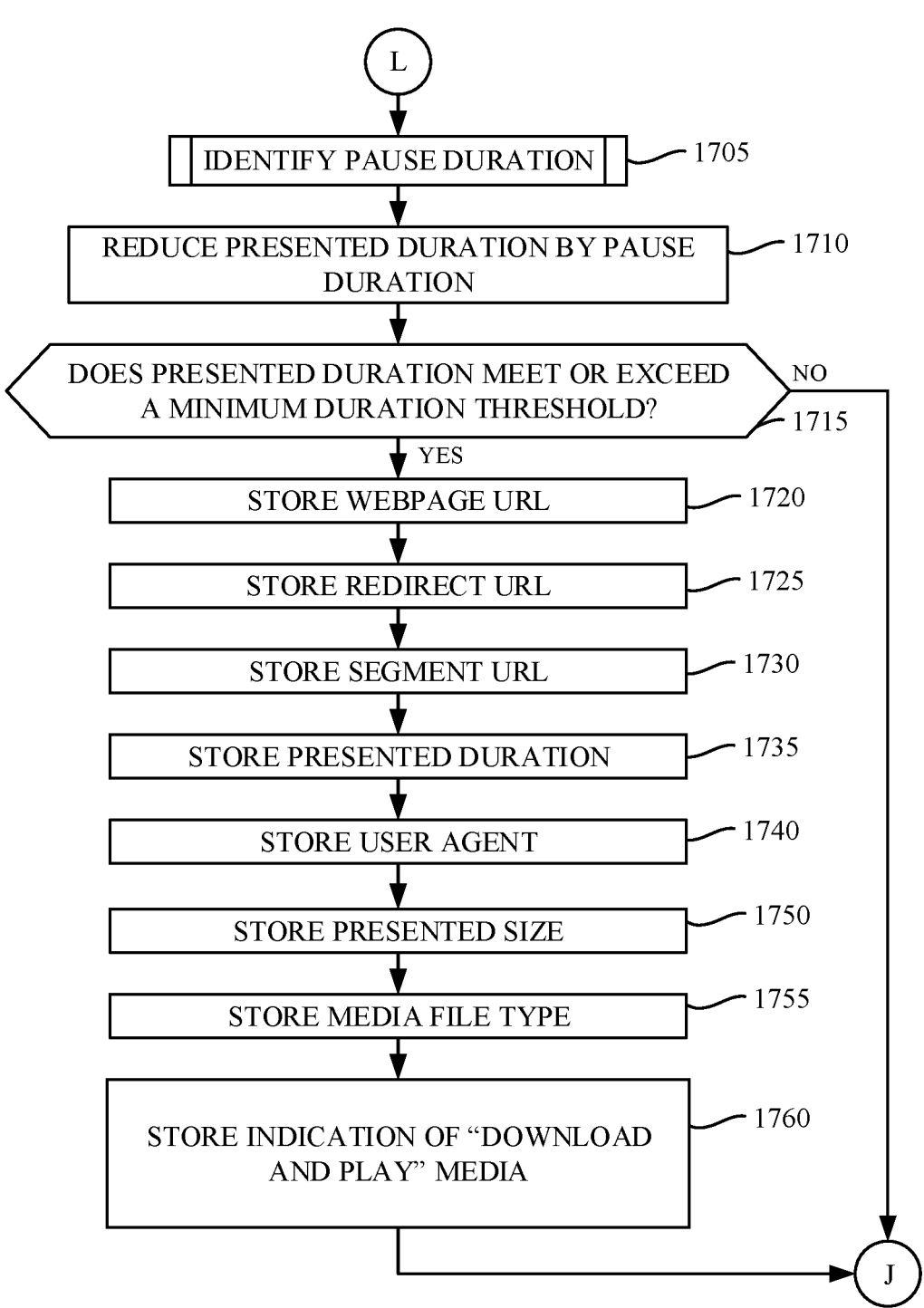

FIGS. 15-17 are flowcharts representative of example machine readable instructions that may be executed to implement the example crediting manager 445 to credit a "download-and-play" media session based on a proxy log generated by the example proxy server 425 (FIG. 4). As discussed in conjunction with FIG. 8, the example proxy log filter 610 (FIG. 6) locates any records containing a media file (e.g., "download-and-play" child sessions) within an application or page view (e.g., parent session). Thereafter, the proxy log parser 620, the example index file inspector 630, and the example session manager 640 process the records. After the records are processed, the example proxy log filter 610 identifies the next parent session, if any, and identifies any child sessions therein (e.g., according to example process 800).

FIG. 15 illustrates the start of an example implementation of block 875 of FIG. 8 to process a media session as "download-and-play" media. After the example proxy log filter 610 locates any media files (FIG. 8, block 870: YES), the example proxy log parser 620 sorts any media sessions (e.g., identified by the example proxy log filter 610 via block 870 of FIG. 8) associated with the same parent session chronologically (FIG. 15, block 1505). In the illustrated example, the example proxy log parser 620 communicates with the example proxy log filter 610 to identify a record identifying a media segment (blocks 1510, 1515). If the example proxy log parser 620 does not identify any record identifying a media segment (block 1515: NO), the example proxy log parser 620 determines that there are no additional media sessions exist for crediting. In the illustrated example, the example proxy log parser 620 identifies a record identifying a media segment (e.g., a child session) (block 1515: YES). When this occurs, the example session manager 640 identifies the beginning of the new child "download-and-play" media session.

The example session manager 640 determines a duration of the child media session. In the illustrated example, the example session manager 640 initializes values associated with the child media session (e.g., presented duration and presented size values) to zero (blocks 1525, 1535). In the illustrated example, the example session manager 640 determines a URL of a web page that caused the identified media segment to be requested (block 1540). The example session manager 640 determines a referrer URL of the web page that caused the identified media segment to be requested (block 1545). In the illustrated example, the example session manager 640 additionally determines a user agent that was used to request the segment file (block 1550). Thereafter, control proceeds to block 1605 (FIG. 16).

FIG. 16 illustrates a continuation of the example implementation (FIGS. 15-17) of block 875 of FIG. 8. At block 1605, the example proxy log parser 620 locates the next sequential proxy record identifying a media segment. If a record is found (block 1610: YES), control proceeds to block 1615. At block 1615, the example session manager 640 determines whether the identified media segment is the first such segment. If the identified media segment is not the first segment (block 1615: NO), the example session manager 640 determines if the identified segment has a same domain as the prior segment (block 1620). If the example session manager 640 determines the identified segment has the same domain as the prior segment (block 1620: YES), control proceeds to block 1630.

If the identified media segment is the first segment (block 1615: YES), the example session manager 640 identifies the beginning of the media presentation at the timestamp of the record with the first identified media segment (block 1625). For each segment found, the example session manager 640 identifies the URL of the segment (block 1630), the file type of the segment (block 1635), and the size of the segment (block 1640). In the illustrated example, the example session manager 640 adds the size of the identified segment to a presented size (block 1645). Control returns to block 1605.

If no record is found anywhere until the absolute end time of the application (block 1610: NO) or if the example session manager 640 determines the identified segment has a different domain as the prior segment (block 1620: NO), proceeds to block 1650. At block 1650, the example session manager 640 identifies the last record as the end of the media presentation. Thereafter, the example session manager 640 identifies the timestamp of the last record as the end time (block 1655). In the illustrated example, the example session manager 640 calculates the difference between the timestamp of the first identified segment and the timestamp of the last record (block 1660). Control proceeds to block 1705 (FIG. 17).

FIG. 17 illustrates a continuation of the example implementation (FIGS. 15-17) of block 875 of FIG. 8. In the illustrated example, the example session manager 640 identifies a pause duration, if any (block 1705). At block 1710, the example session manager 640 modifies the presented duration to account for any detected pauses from block 1705. In the illustrated example, the example session manager 640 determines whether the session is to be credited based on the modified presented duration (e.g., if the modified presented duration satisfies a minimum threshold) (block 1715). If the modified presented duration meets or exceeds the minimum duration threshold (block 1715: YES), the example session manager 640 stores, in the example crediting database 650, the webpage URL (block 1720), the redirect URL (block 1725), the segment URL (block 1730), the presented duration (block 1735), the user agent (block 1740), the presented size (block 1750), the media file type (block 1755), and/or an indication that the media is "download-and-play" (block 1760) as a session record. Additionally or alternatively, the example session manager 640 may obtain additional information related to a "download-and-play" session, such as, for example, the network bandwidth through which a media is downloaded, a full size of the downloaded media, and/or a full duration. In some examples, the full duration of a downloaded media may be determined based on the full size of the downloaded media, the presented size of the downloaded media, and/or the presented duration of the downloaded media. In such examples, the example session manager 640 stores the network bandwidth, the full size, and/or the full duration in the example crediting database 650. After the example session manager 640 stores above information in the example crediting database 650 or if the presented duration is less than the minimum duration threshold (block 1715: NO), control returns to block 1510 (FIG. 15).

Figure 18:
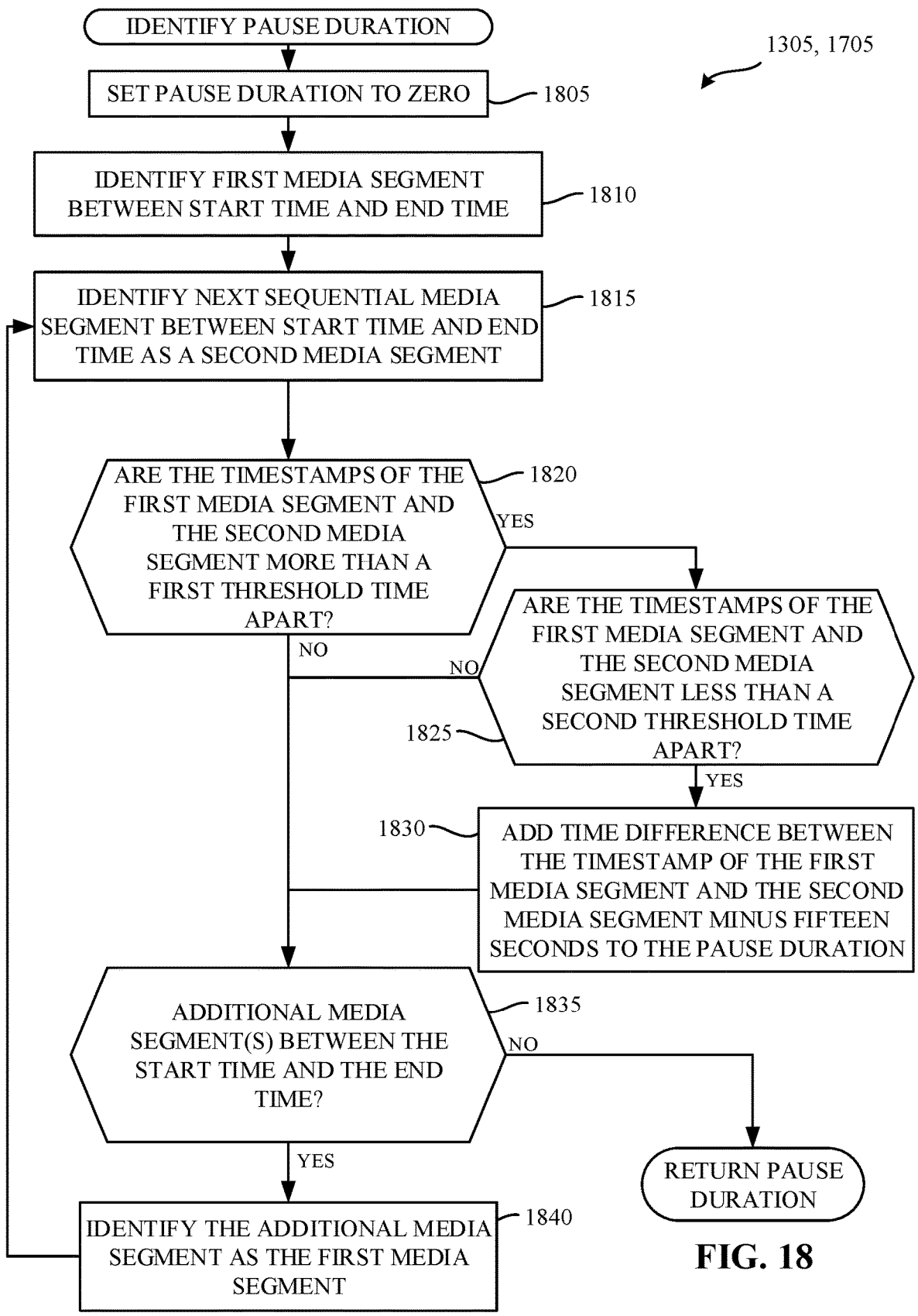
FIG. 18 illustrates a flowchart representative of example machine readable instructions that may be executed to implement the example session manager of FIG. 6 to determine a pause duration.

FIG. 18 is a flowchart representative of example machine readable instructions that may be executed to implement block 1305 and/or block 1705. At block 1805, the example session manager 640 initializes the pause duration to zero. As discussed above, the example session manager 640 identifies the start of a media session. Once the example session manager 640 identifies the start of the media session, the example session manager 640 identifies the first media segment between the start time and end time (block 1810). In the illustrated example, the session manager 640 identifies the next sequential media segment between the start time and the end time as a second media segment (block 1815). The example session manager 640 determines the media session is playing if all found records containing segments have the same eligible domain of the segments, all found records containing index files have the same eligible domain of the index files, and/or no two consecutive records containing segment files of the same media session are more than a threshold time apart (e.g. 30 seconds).

At block 1820, the example session manager 640 determines whether two consecutive record are more than a first threshold apart (e.g. 30 seconds). If two consecutive segments of the same media session are more than the first threshold apart (block 1820: YES), then the example session manager 640 determines whether the two consecutive segments are less than a second threshold apart (e.g. 5 minutes) (block 1825). If two consecutive segments of the same media session are not more than the first threshold apart (block 1820: NO) or the two consecutive segments are not less than a second threshold apart (block 1825: NO), then control proceeds to block 1835.

If two consecutive segments of the same media session are more than a first threshold (e.g., 30 seconds) (block 1820: YES), but less than a second threshold (e.g., 5 minutes) apart (block 1825: YES), the example session manager 640 determines that the media session is paused. When the example session manager 640 determines that the media session is paused, the example session manager 640 calculates the difference between the timestamp of the first media segment and the timestamp of the second media segment (e.g., at least 30 seconds) and subtracts 15 seconds. The example session manager 640 adds this total to the pause duration (block 1830). Control proceeds to block 1835.

At block 1835, the example proxy log parser 620 searches for additional media segments between the start time and the end time (block 1835). If an additional media segment exists between the start time and the end time (block 1835: YES), the example session manager 640 identifies the additional media segment as the first media segment (block 1840), and control returns to block 1815. This example process is repeated until no additional media segment(s) exist between the start time and the end time (block 1835: NO). When no additional media segment(s) exist between the start time and the end time (block 1835: NO), the example session manager 640 returns the pause duration.

In the illustrated example, one iteration of the example process in FIGS. 10-14 or FIGS. 15-17 provides the durations (full and presented) for one media session. If there are multiple child media sessions inside the same parent session, the example procedures described above are executed until all sessions are processed. The example procedures described above exclude the duration for any advertisement presented as part of the requested media. Such ads are dynamic with duration of a few seconds (typically no more than 30 seconds) that are downloaded and presented immediately before the requested media is presented. Advertisements are delivered outside the structure of the index/segment files described earlier. In some examples, advertisements include isolated media files that are simply downloaded and played. In some examples, the example crediting manager 445 ignores such records. In some examples, the example crediting manager 445 does not identify the URLs of the advertisements because the URLs of advertisements are not part of any index file structure. In such examples, advertisement records are absorbed into the duration calculation of the entire parent session.

In examples disclosed herein, once the example session classifier 605 identifies media sessions, the example publisher classifier 655 processes those sessions to determine an identity of the publisher of the media. Identification of a publisher of the media is important because it enables reports to be generated that identify, for example, usage of media by different publishers.

Figure 19:
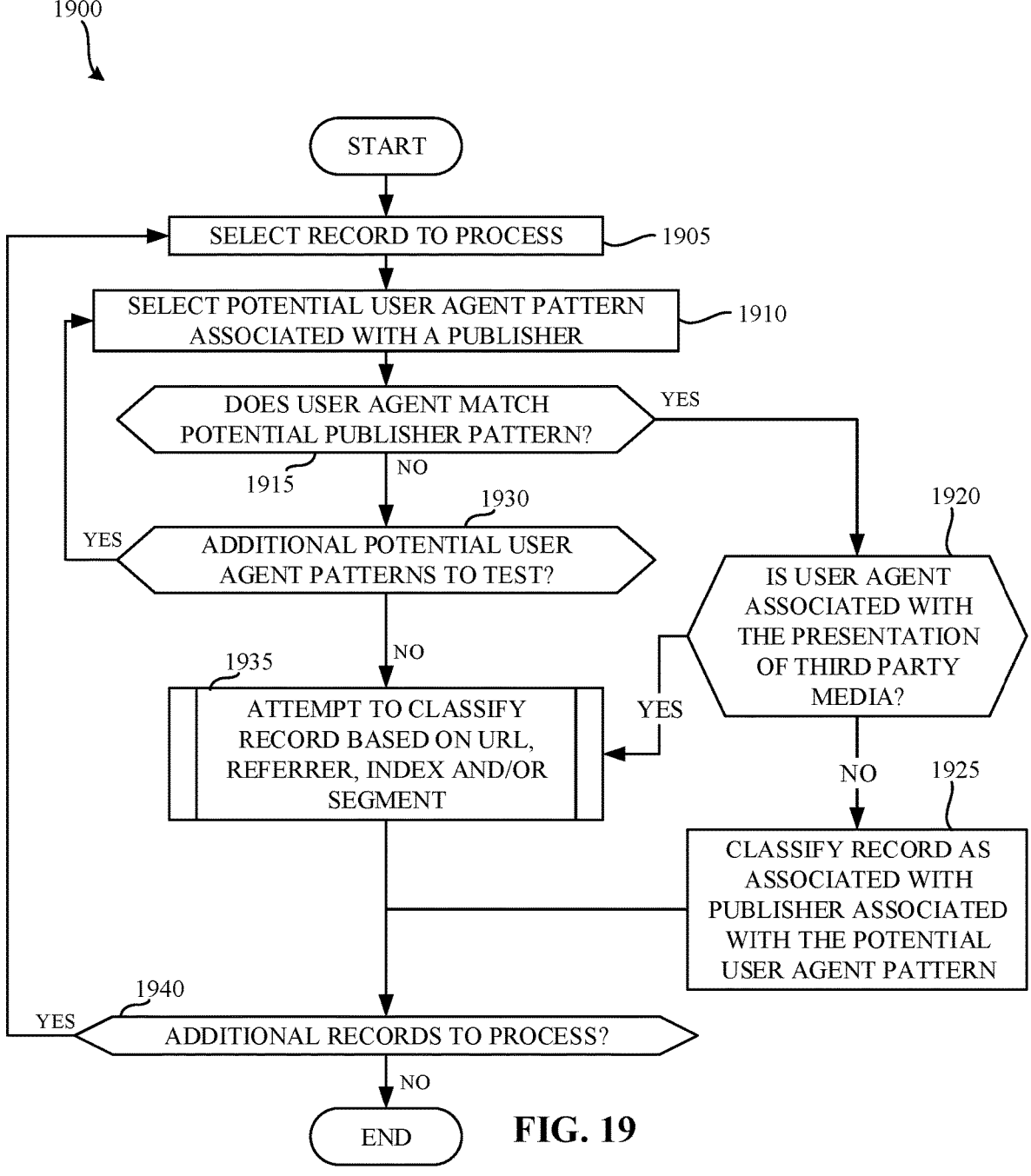
FIG. 19 is a flowchart representative of example machine readable instructions that may be executed to implement the example publisher classifier of FIG. 6.

FIG. 19 is a flowchart representative of example machine readable instructions 1900 that may be executed to implement the example publisher classifier 655 (FIG. 6) to identify a publisher of a media session. The process of identifying a publisher associated with a media session is referred to herein as classification. The example process 1900 of FIG. 19 begins when the example publisher classifier 655 selects a session record stored by the example session classifier 605 in the example crediting database 650 (block 1905). In examples disclosed herein, the example publisher classifier 655 has two levels of classification. The first level identifies an application or web page that requested the media (e.g., the parent session). The first level is based on a user agent identifier, such as a UserAgentID. The example publisher manager 680 determines the identity of the application that launched the media based on the user agent identifier, as opposed to the example proxy log parser 620 (as described above), which identifies the existence of a parent session (e.g., an application launched media) but not the identity of the parent session (e.g., which application launched media). The identity of the application that requested the media is useful for identification of the publisher because, in some examples, publishers implement their own applications. For example, an ESPN™ application can be associated with the publisher ESPN™. Therefore, if a publisher presents its own media, the publisher will have such a user agent pattern associated with its user agent identifier.

The example pattern analyzer 660 selects a potential user agent pattern that is associated with a publisher (block 1910). In the illustrated example, the example pattern analyzer 660 determines whether the user agent identifier of the session record matches the potential publisher pattern (block 1915). If the example pattern analyzer 660 determines the user agent identifier of the session record matches a potential publisher pattern (block 1915: YES), then the example publisher manager 680 determines if the user agent identifier is associated with the presentation of third party media (block 1920). For example, if the user agent identifier identifies Safari, then the example publisher manager 680 determines the media was presented in a browser session and is associated with the presentation of third party media, however the example publisher manager 680 may determine that Safari is the presenter (e.g., parent session). Accordingly, if the example publisher manager 680 determines that the user agent identifier is associated with the presentation of third party media (block 1920: YES), control proceeds to block 1935.

If example publisher manager 680 determines that the user agent identifier is not associated with the presentation of third party media (block 1920: NO), then control proceeds to block 1925. At block 1925, the record is classified as associated with the publisher associated with the potential user agent pattern (block 1925). For example, if the example pattern analyzer 660 determines the user agent of the session record matches the potential publisher pattern associated with WatchESPN™, and the example session manager 680 determines that WatchESPN™ is not associated with the presentation of third party media (e.g., WatchESPN™ presents ESPN™ media) then the example pattern analyzer 660 identifies the media of the media session is associated with the publisher associated with the potential publisher pattern, and the example pattern analyzer 660 determines that the publisher is also the presenter.

Once the record is classified with a publisher associated with the potential user agent pattern (block 1925), the example publisher manager 680 determines whether there are additional session records to process (block 1940). If there are additional session records to process (block 1940: YES), control returns to block 1905 where the example publisher manager 680 selects the next session record for classification processing (block 1905).

Returning to block 1915, if the user agent does not match the potential user agent pattern (block 1915: NO), the example pattern analyzer 660 determines whether there are additional potential user agent patterns to test (block 1930). If additional potential user agent patterns exist, control returns to block 1910 where the additional potential user agent pattern is tested. This process is repeated until (1) the user agent matches a potential user agent pattern (block 1915: YES), or (2) all potential user agent patterns have been tested (block 1930: NO). If all potential user agent patterns have been tested without finding a match (block 1930: NO) or if a matching user agent identifier is associated with the presentation of third party media (block 1920: YES), then the example domain comparator 670 classifies the session record based on a media session identifier (e.g., URL ID, REFERRER ID, INDEX ID, and/or SEGMENT ID) (block 1935). Attempting to classify the session record based on the media session identifier, such as the URL ID, REFERRER ID, INDEX ID, and/or SEGMENT ID, is described below in connection with FIG. 20.

Figure 20:
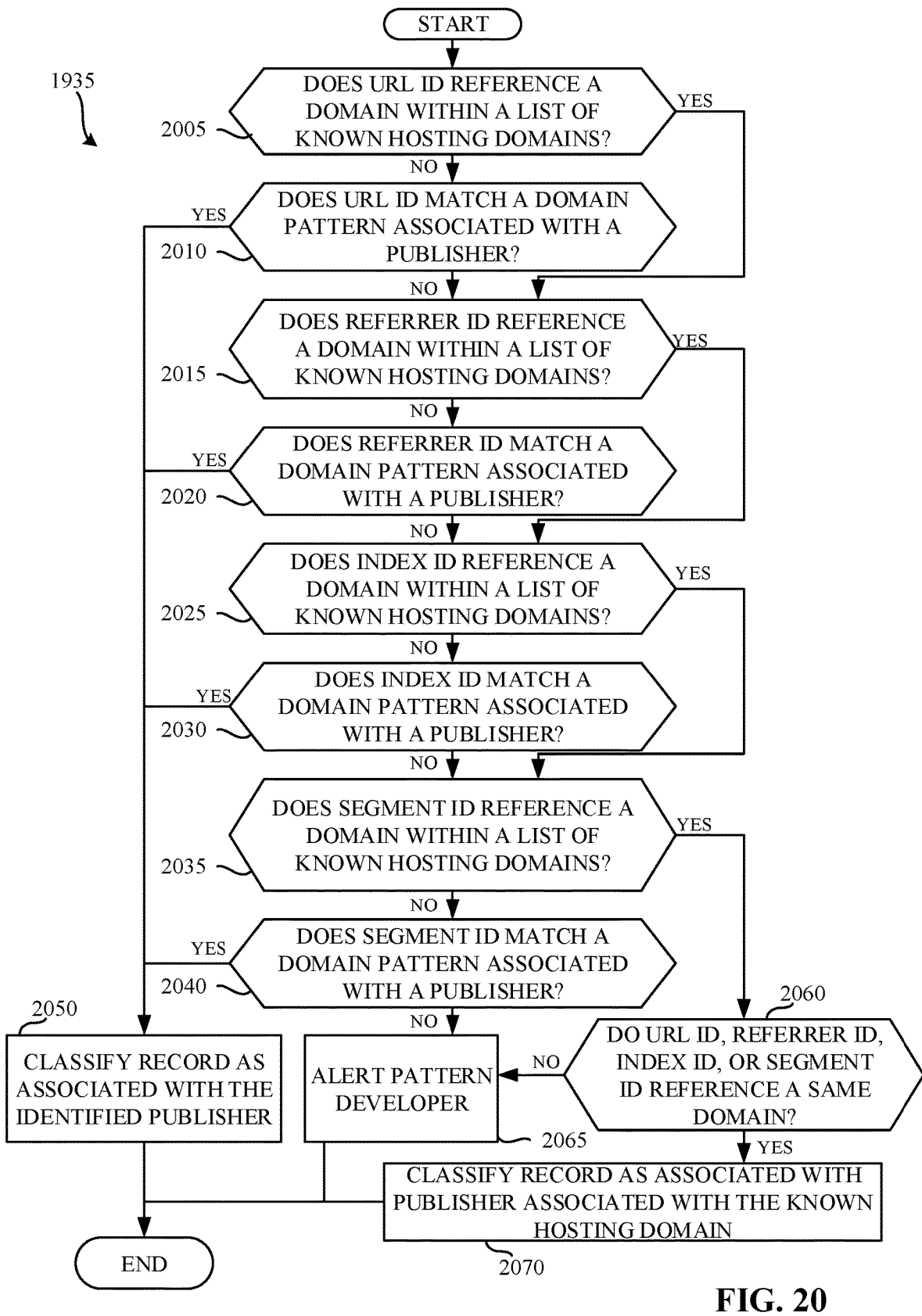
FIG. 20 is a flowchart representative of example machine readable instructions that may be executed to implement the example domain comparator of FIG. 6.

FIG. 20 is a flowchart representative of example machine readable instructions that may be executed to implement block 1935 (FIG. 19) to identify a publisher of a media session. In the illustrated example, the example domain comparator 670 utilizes a second level of media classification to identify the publisher of the media when the example pattern analyzer 660 does not identify the publisher using the user agent identifier (e.g., FIG. 19, block 1925). The example process of FIG. 20 begins when the example domain comparator 670 determines whether the media session identifier, such as the URL ID, stored in association with the session record references a domain within a list of known hosting domains (e.g., domains known to host media, such as, for example, YouTube™, Facebook™, etc.) (block 2005). Domains in the list of known hosting domains may include a plurality of suffixes (e.g., .com, .org., .tv, etc.) that may or may not be related to media. Alternatively, the domains in the list of known hosting domains may not include a suffix.

The URL ID does not always reference the URL of the publisher. For example, if the URL ID matches a domain (e.g., YouTube™) within a list of known hosting domains, then the media might be published by that domain (e.g., YouTube™). However, in some examples, YouTube™ also hosts media for other publishers, such as Telemundo™. Therefore, even if the example domain comparator 670 determines that the URL ID references a domain within a list of known hosting domains (block 2005: YES), control proceeds to block 2015. Similarly, if the example domain comparator 670 determines that the URL ID does not reference a domain within a list of known hosting domains, the example pattern analyzer 660 determines whether the URL references a domain pattern associated with a publisher (block 2010). Alternatively, the example pattern analyzer 660 may determine whether the URL ID references a domain pattern associated with a publisher prior to the example domain comparator 670 determining whether the URL ID references a domain within a list of known hosting domains.

In the illustrated example, the example domain comparator 670 sends the URL ID to the example pattern analyzer 660 for pattern matching. The example pattern analyzer 660 utilizes pattern matching to determine if a domain associated with a publisher. Many media URLs can be patterned so that any media URLs (e.g., the URL ID, the REFERRER ID, the INDEX ID, the SEGMENT ID, etc.), which match a pattern, can be automatically classified to a particular publisher. If the example pattern analyzer 660 determines that the URL ID of the media session matches the domain pattern associated with the publisher, the example publisher manager 680 classifies the media of the media session as being associated with the identified publisher (block 2050). Control then returns to block 1940 (FIG. 19).

If the example domain comparator 670 determines that the URL ID of the media session either (1) references a domain within the list of known hosting domains (block 2005: YES), or (2) does not match a domain pattern associated with a publisher (block 2010: NO), the example domain comparator 670 proceeds to determine whether the REFERRER ID references a domain within the list of known hosting domains (block 2015). The REFERRER ID identifies the URL of whatever application or website brought the user to the media. Often applications and/or websites will host their media using a third party site(s). A link within the application and/or website directs the media device to request the media from the third party. Thus, the REFERRER ID is informative about how a user arrived at media and is used to identify the publisher. If the example domain comparator 670 determines that the REFERRER ID does not reference a domain within the list of known hosting domains (block 2015: NO), the example pattern analyzer 660 determines whether the REFERRER ID matches a domain pattern associated with a publisher (block 2020). Alternatively, the example pattern analyzer 660 may determine whether the REFERRER ID references a domain pattern associated with a publisher prior to the example domain comparator 670 determining whether the REFERRER ID references a domain within a list of known hosting domains.

In the illustrated example, the example pattern analyzer 660 determines whether the REFERRER ID matches the pattern associated with the publisher in the same manner as described above. If the example pattern analyzer 660 determines that the REFERRER ID of the media session matches the pattern associated with the publisher, the example publisher manager 680 classifies the media of the media session as being associated with the identified publisher (block 2050). Control then returns to block 1940 (FIG. 19).

If the REFERRER ID of the media session either (1) references a domain within the list of known hosting domains (block 2015: YES), or (2) does not match a pattern associated with a publisher (block 2020: NO), the example domain comparator 670 proceeds to determine whether the INDEX ID references a domain within the list of known hosting domains (block 2025). The INDEX ID identifies a URL of an index file of the media, if available. In the illustrated example, the INDEX ID URL provides additional details regarding the media publisher, primarily when the publisher hosts the media themselves. In the examples in which the media is downloaded-and-played, the INDEX ID may not be available. If the example domain comparator 670 determines that the INDEX ID does not reference a domain within the list of known hosting domains (block 2025: NO), the example pattern analyzer 660 determines whether the INDEX ID matches a pattern associated with a publisher (block 2030). Alternatively, the example pattern analyzer 660 may determine whether the INDEX ID references a domain pattern associated with a publisher prior to the example domain comparator 670 determining whether the INDEX ID references a domain within a list of known hosting domains.

In the illustrated example, the example pattern analyzer 660 determines whether the INDEX ID matches the pattern associated with the publisher in the same manner as described above. If the example pattern analyzer 660 determines that the INDEX ID of the media session matches the pattern associated with the publisher, the example publisher manager 680 classifies the media of the media session as being associated with the identified publisher (block 2050). Control then returns to block 1940 (FIG. 19).

If the INDEX ID of the media session either (1) references a domain within the list of known hosting domains (block 2025: YES), or (2) does not match a pattern associated with a publisher (block 2030: NO), the example domain comparator 670 proceeds to determine whether the SEGMENT ID references a domain within the list of known hosting domains (block 2035). The SEGMENT ID identifies the URL of a segment file of the media, if available. In the illustrated example, the SEGMENT ID URL provides additional details regarding the media publisher, primarily when the publisher hosts the media themselves. If the example domain comparator 670 determines that the SEGMENT ID does not reference a domain within the list of known hosting domains (block 2035: NO), the example pattern analyzer 660 determines whether the SEGMENT ID matches a pattern associated with a publisher (block 2040). Alternatively, the example pattern analyzer 660 may determine whether the SEGMENT ID references a domain pattern associated with a publisher prior to the example domain comparator 670 determining whether the SEGMENT ID references a domain within a list of known hosting domains.

In the illustrated example, the example pattern analyzer 660 determines whether the SEGMENT ID matches the pattern associated with the publisher in the same manner as described above. If the example pattern analyzer 660 determines that the SEGMENT ID of the media session matches the pattern associated with the publisher, the example publisher manager 680 classifies the media of the media session as being associated with the identified publisher (block 2050). Control then returns to block 1940 (FIG. 19).

If the example domain comparator 670 determines that the SEGMENT ID of the media session references a domain within the list of known hosting domains (block 2035: YES), the example domain comparator 670 determines whether the URL ID, the REFERRER ID, the INDEX ID, and the SEGMENT ID reference a same domain (block 2060). In some examples, the hosting domain may be the publisher. In the illustrated example, the example domain comparator 670 determined when each of the URL ID, the REFERRER ID, the INDEX ID, and the SEGMENT ID reference a same domain. However, any other condition for determining that the hosting domain is the publisher may additionally or alternatively be used (e.g., if at least two of the URL ID, the REFERRER ID, the INDEX ID, and the SEGMENT ID reference a same domain, if at least three of the URL ID, the REFERRER ID, the INDEX ID, and the SEGMENT ID reference a same domain, etc.). If the URL ID, the REFERRER ID, the INDEX ID, and the SEGMENT ID reference a same domain (block 2060: YES), the example publisher manager 680 classifies the record as associated with a publisher associated with the domain of the URL ID, the REFERRER ID, the INDEX ID, and the SEGMENT ID (block 2070). Control then returns to block 1940 (FIG. 19).

If either (1) the SEGMENT ID does not match a pattern associated with a publisher (block 2040: NO) or (2) the URL ID, the REFERRER ID, the INDEX ID, and the SEGMENT ID do not reference a same domain (block 2060: NO), the example publisher manager 680 alerts a pattern developer (block 2065). In such an example, the media is not classified as associated with a publisher, and control returns to block 1940 (FIG. 19). After the example publisher manager 680 determines the publisher of the media, the example publisher manager 680 stores the publisher associations in the example classification database 690 and generates reports on media usage.

Example processes to credit and/or classify media usage rely on assumptions (e.g., patterns of URLs, etc.) and configurations. Monitoring these assumptions is important because scenarios change as technologies advance. For example, new third party hosting sites may be used, different URL patterns may be used, etc. A few example parameters and/or assumptions that are monitored in the illustrated example are detailed below.

Threshold Duration Records—In the illustrated example, media sessions are credited when the have a duration satisfying a threshold duration (e.g., equal to or greater than a minimum duration). An example duration is, for example, fifteen seconds. However, the number of sessions having a total duration less than fifteen seconds is to be analyzed to determine if the threshold duration is too large, too little, etc. The duration may be monitored by total (e.g., the total number of under minimum duration records) and by entity (e.g., the application and/or website in which the media is presented) to identify whether, for example, the threshold is to be modified.

Orphaned MediaRecords—In the illustrated example, crediting procedures disclosed herein do not match all of the media records in the proxy log files to valid media sessions. These records will not contribute any duration to any session and are essentially ignored by the crediting procedure. Since these orphaned records represent missed usage, it is important to monitor any trend change in the total number of these records. Furthermore, in the illustrated example, it will be beneficial to not only track the total but also group the records by entity. The entity can be potentially determined by the URL of the media record.

New Media Types—Media usage is identified by the media type indicated by the proxy log record. If the media type matches the list of known media types, then that record is eligible to contribute to a media session. However, if the record does not match the list of media types then it is assumed to not be media usage. In the illustrated example, the list of media types will continue to grow as new media technologies are created and if the list of known media types is not updated, some media usage may be lost and/or not identified. Thus, in the illustrated example, monitoring for new media types is critical. In the illustrated example, any new media type which starts with "media" or "audio" will create an alert so that the new media type can be analyzed and, in the illustrated example, added to the list of media types.

Low Payload Size—In some examples, any usage record (media or not media) is checked for size. In some examples, if the size indicated by the payload amount is less than a size threshold (e.g., 500 bytes), then the record will not be credited. The total number of low payload records is to be recorded and monitored. In some examples, a trend break results in an alert that the trend is to be investigated. Furthermore, in some examples, low payload records are grouped and trended by entity so that if a particular application shows a high number of low payload records, this may be investigated for any issues.

Live Stream Configurations—As noted above, a live stream is credited if the session includes a threshold number of records identifying index files such as, for example, 12 records identifying index files. In some examples, sessions that identify less than the threshold number of records are monitored for determination of whether the threshold is to be modified. In some examples, a threshold percentage of the records within the session identifying index files is used to identify live streaming. In some examples, the threshold percentage is 50%. Streaming sessions that include less than the threshold percentage of index files are monitored for determination of whether the threshold percentage is to be modified.

Number of Media Session—In some examples, the total number of media sessions by entity are monitored for trend breaks.

Duration of Media Session—In some examples, the average duration of media sessions by entity are monitored for trend breaks.

Media Type—Describes type of media, "live-stream", "on-demand", or "download-play". In some examples, the total percentage of media assigned to each type is monitored for trend breaks. Additionally, in some examples, monitoring of media type at the entity level is performed.

Figure 21:
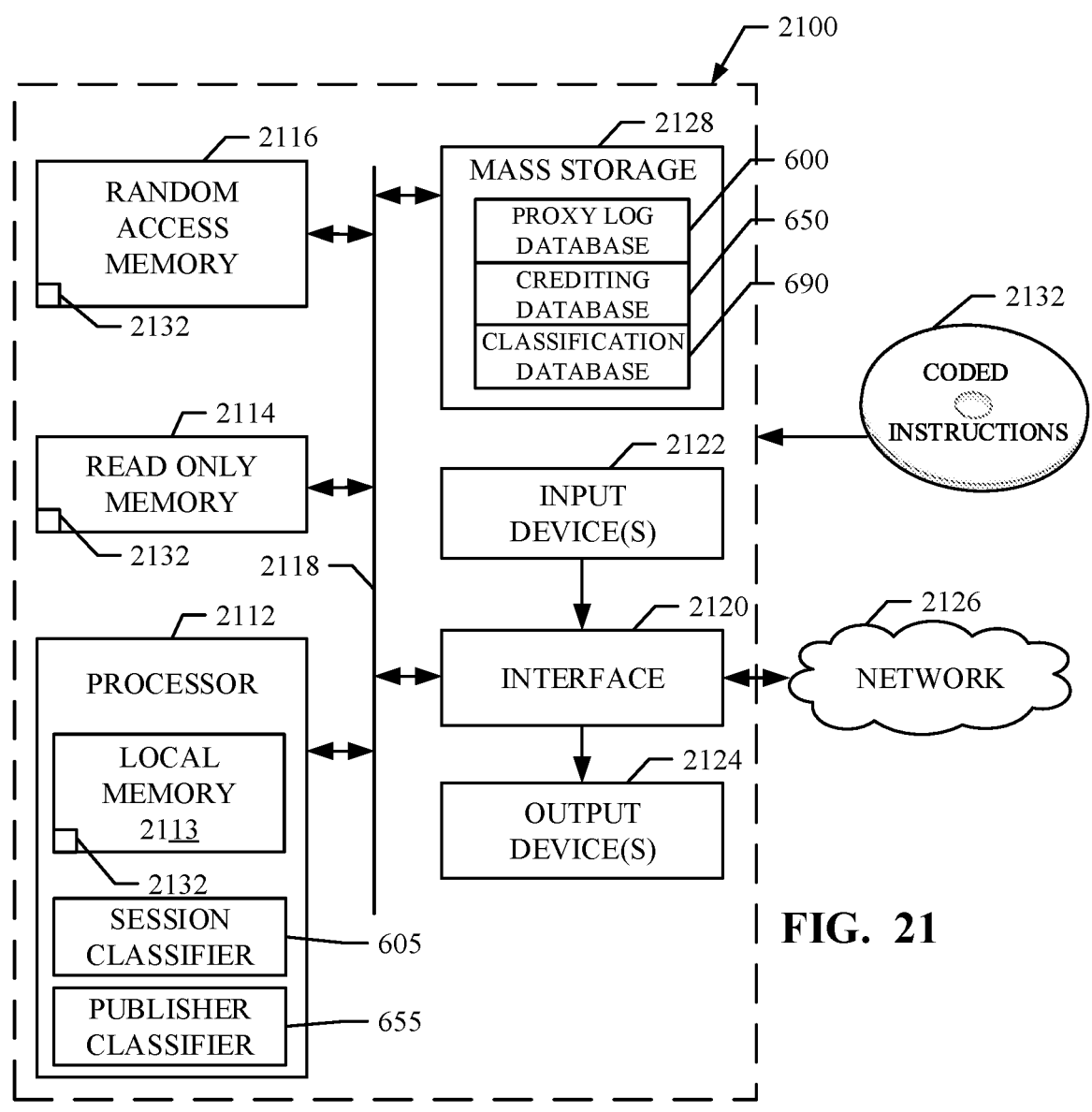
FIG. 21 is a block diagram of an example processing system capable of executing the example machine readable instructions of FIGS. 7-20 to implement the example crediting manager of FIGS. 4 and/or 6.

FIG. 21 is a block diagram of an example processor platform 2100 capable of executing the instructions of FIGS. 7-20 to implement the example crediting manager 445 of FIGS. 4 and/or 6. The processor platform 2100 can be, for example, a server, a personal computer, a mobile device (e.g., a cell phone, a smart phone, a tablet such as an iPad™), a personal digital assistant (PDA), an Internet appliance, a DVD player, a CD player, a digital media recorder, a Blu-ray player, a gaming console, a personal media recorder, a set top box, or any other type of computing device.

The processor platform 2100 of the illustrated example includes a processor 2112. The processor 2112 of the illustrated example is hardware. For example, the processor 2112 can be implemented by example integrated circuits, logic circuits, microprocessors or controllers from any desired family or manufacturer. The processor 2112 also includes the example session classifier 605 and the example publisher classifier 655.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random-dom Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), and/or a PCI express interface.

In the illustrated example, example input devices 2122 are connected to the interface circuit 2120. The input device(s) 2122 permit(s) a user to enter data and commands into the processor 2112. The input device(s) can be implemented by, for example, an audio sensor, a microphone, a camera (still or media), a keyboard, a button, a mouse, a touchscreen, a track-pad, a trackball, isopoint and/or a voice recognition system.

Example output devices 2124 are also connected to the interface circuit 2120 of the illustrated example. The output devices 2124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2120 of the illustrated example, thus, typically includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes example mass storage devices 2128 for storing software and/or data. Examples of such mass storage devices 2128 include floppy disk drives, hard drive disks, compact disk drives, Blu-ray disk drives, RAID systems, and digital versatile disk (DVD) drives. In the illustrated example, the mass storage devices 2128 include the example proxy log database 600, the example crediting database 650, and the example classification database 690.

The coded instructions 2132 of FIGS. 7-20 may be stored in the mass storage device 2128, in the volatile memory 2114, in the non-volatile memory 2116, and/or on a removable tangible computer readable storage medium such as a CD or DVD.

Mobile media usage is growing as more advanced device models come to market with superior screen resolution and faster processing capabilities. By monitoring such media usage, metrics and/or reports associating different trends in media usage and/or associations of media usage with different publishers may be generated. From the foregoing, it will be appreciated that the above disclosed methods and apparatus accurately credit publishers of media presented within a parent session (e.g., application or webpage media player). The example methods and apparatus utilize a proxy server to parse media request(s) and response(s), thereby preforming processing related to crediting in locations other than the media device that is requesting and receiving the media to be credited. Therefore, performance of the media device is unaffected, as additional crediting processing is not performed in parallel to other processes of the media device. Additionally, some example methods and apparatus analyze streaming media without downloading the index files. Such example methods and apparatus avoid constant download, parsing and/or cross-examination of index files. Such constant downloading can add to the workload of the system and would otherwise decrease the performance of the crediting processor. Because some disclosed example methods and apparatus do not download the index files identified in the proxy log, such example methods and apparatus conserve resources (e.g., processor time, bandwidth, power, etc.) that would be otherwise used to perform such downloading.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for monitoring network data associated with live streaming media, the method comprising:

parsing, by executing an instruction with at least one processor of a computing system, proxy records of network data, wherein a media device is configured to route network traffic of the media device through a proxy server to thereby facilitate logging the proxy records indicative of live streaming media without dependence on one or more applications operating on the media device being instrumented for monitoring functionality;

downloading, from the proxy records, a first index file indicative of a start of a child media session of live streaming media on the media device;

determining, from the first index file, a first timestamp associated with a first media segment of the child media session;

identifying, based on the downloaded first index file, a second media segment consecutive with the first media segment and associated with a first domain that is associated with the first media segment and determining a second timestamp associated with the second media segment;

identifying, from the proxy records, a second index file indicative of a third media segment of live streaming media on the media device;

determining that the second index file and the first index file share a common identifier;

responsive to determining that the second index file and the first index file share the common identifier, accessing a third timestamp associated with the third media segment without downloading the second index file;

determining a difference between the third timestamp and the second timestamp;

determining a pause duration associated with playback of the child media session by comparing the difference between the third timestamp and the second timestamp with at least one pause detection threshold;

determining a presented duration of the child media session based on the first timestamp determined from the first index file, the third timestamp associated with the third media segment, and the pause duration; and crediting the media device with the presented duration of the child media session of live streaming media.

2. The method of claim 1, further including:

classifying media of the child media session as being published by a publisher associated with a domain pattern matching the first domain.

3. The method of claim 1, wherein determining the presented duration includes:

removing the pause duration from a total child media session duration spanned by the first timestamp and the third timestamp.

4. The method of claim 1, further including identifying a file type and a size of the first and second media segments.

5. The method of claim 1, further including determining to credit the child media session to a media publisher based on a comparison of the pause duration of the child media session to a threshold value.

6. The method of claim 1, wherein the at least one pause detection threshold includes a first threshold and a second threshold, and wherein determining the pause duration includes:

determining that the difference exceeds the first threshold;

responsive to determining that the difference exceeds the first threshold, determining that the difference is less than the second threshold; and responsive to determining that the difference is less than the second threshold, computing the pause duration based on the difference and a subtraction time.

7. The method of claim 1, further including:

determining a uniform resource locator of a web page that caused the second media segment to be requested; and sorting proxy records associated with a parent media session in chronological order.

8. The method of claim 1, further including:

storing, in a crediting database, the pause duration of the child media session and information identifying an agent that initiated the child media session.

9. A non-transitory computer readable storage medium having stored thereon instructions that, when executed by a processor of a computing system, cause the computing system to perform operations including at least:

parsing, proxy records of network data, wherein a media device is configured to route network traffic of the media device through a proxy server to thereby facilitate logging the proxy records indicative of live streaming media without dependence on one or more applications operating on the media device being instrumented for monitoring functionality;

downloading, from the proxy records, a first index file indicative of a start of a child media session of live streaming media on the media device;

determining, from the first index file, a first timestamp associated with a first media segment of the child media session;

identifying, based on the downloaded first index file, a second media segment consecutive with the first media segment and associated with a first domain that is associated with the first media segment and determining a second timestamp associated with the second media segment;

identifying, from the proxy records, a second index file indicative of a third media segment of live streaming media on the media device;

determining that the second index file and the first index file share a common identifier;

responsive to determining that the second index file and the first index file share the common identifier, accessing a third timestamp associated with the third media segment without downloading the second index file;

determining a difference between the third timestamp and the second timestamp;

determining a pause duration associated with playback of the child media session by comparing the difference between the third timestamp and the second timestamp with at least one pause detection threshold;

determining a presented duration of the child media session based on the first timestamp determined from the first index file, the third timestamp associated with the third media segment, and the pause duration; and crediting the media device with the presented duration of the child media session of live streaming media.

10. The non-transitory computer readable storage medium of claim 9, wherein the operations further include:

classifying media of the child media session as being published by a publisher associated with a domain pattern matching the first domain.

11. The non-transitory computer readable storage medium of claim 9, wherein determining the presented duration includes:

removing the pause duration from a total child media session duration spanned by the first timestamp and the third timestamp.

12. The non-transitory computer readable storage medium of claim 9, wherein the operations further include identifying a file type and a size of the first and second media segments.

13. The non-transitory computer readable storage medium of claim 9, wherein the operations further include determining to credit the child media session to a media publisher based on a comparison of the pause duration of the child media session to a threshold value.

14. The non-transitory computer readable storage medium of claim 9, wherein the at least one pause detection threshold includes a first threshold and a second threshold, and wherein determining the pause duration includes:

determining that the difference exceeds the first threshold;

responsive to determining that the difference exceeds the first threshold, determining that the difference is less than the second threshold; and responsive to determining that the difference is less than the second threshold, computing the pause duration based on the difference and a subtraction time.

15. The non-transitory computer readable storage medium of claim 9, wherein the operations further include:

determining a uniform resource locator of a web page that caused the second media segment to be requested; and sorting proxy records associated with a parent media session in chronological order.

16. The non-transitory computer readable storage medium of claim 9, wherein the operations further include storing, in a crediting database, the pause duration of the child media session and information identifying an agent that initiated the child media session.

17. An audience measurement computing system comprising:

at least one processor; and memory having stored thereon computer readable instructions that, when executed by the at least one processor, cause performance of a set of operations comprising:

parsing, proxy records of network data, wherein a media device is configured to route network traffic of the media device through a proxy server to thereby facilitate logging the proxy records indicative of live streaming media without dependence on one or more applications operating on the media device being instrumented for monitoring functionality;

downloading, from the proxy records, a first index file indicative of a start of a child media session of live streaming media on the media device;

determining, from the first index file, a first timestamp associated with a first media segment of the child media session;

identifying, based on the downloaded first index file, a second media segment consecutive with the first media segment and associated with a first domain that is associated with the first media segment and determining a second timestamp associated with the second media segment;

identifying, from the proxy records, a second index file indicative of a third media segment of live streaming media on the media device;

determining that the second index file and the first index file share a common identifier;

responsive to determining that the second index file and the first index file share the common identifier, accessing a third timestamp associated with the third media segment without downloading the second index file;

determining a difference between the third timestamp and the second timestamp;

determining a pause duration associated with playback of the child media session by comparing the difference between the third timestamp and the second timestamp with at least one pause detection threshold;

determining a presented duration of the child media session based on the first timestamp determined from the first index file, the third timestamp associated with the third media segment, and the pause duration; and crediting the media device with the presented duration of the child media session of live streaming media.

18. The audience measurement computing system of claim 17, wherein the operations further include classifying media of the child media session as being published by a publisher associated with a domain pattern matching the first domain.

19. The audience measurement computing system of claim 17, wherein determining the presented duration includes:

removing the pause duration from a total child media session duration spanned by the first timestamp and the third timestamp.

20. The audience measurement computing system of claim 17, wherein the operations further include identifying a file type and a size of the first and second media segments.

21. The audience measurement computing system of claim 17, wherein the operations further include determining to credit the child media session to a media publisher based on a comparison of the pause duration of the child media session to a threshold value.

22. The audience measurement computing system of claim 17, wherein the at least one pause detection threshold includes a first threshold and a second threshold, and wherein determining the pause duration includes:

determining that the difference exceeds the first threshold;

responsive to determining that the difference exceeds the first threshold, determining that the difference is less than the second threshold; and responsive to determining that the difference is less than the second threshold, computing the pause duration based on the difference and a subtraction time.

23. The audience measurement computing system of claim 17, wherein the operations further include:

determining a uniform resource locator of a web page that caused the second media segment to be requested; and sorting proxy records associated with a parent media session in chronological order.

24. The audience measurement computing system of claim 17, wherein the operations further include storing, in a crediting database, the pause duration of the child media session and information identifying an agent that initiated the child media session.

* * * * *